United States Patent
Ricci

(10) Patent No.: US 9,964,415 B2
(45) Date of Patent: May 8, 2018

(54) TRACKING POWER CONSUMPTION AND PAYMENT

(71) Applicant: NIO USA, Inc., San Jose, CA (US)

(72) Inventor: Christopher P. Ricci, Saratoga, CA (US)

(73) Assignee: NIO USA, Inc., San Jose, CA (US)

( * ) Notice: Subject to any disclaimer, the term of this patent is extended or adjusted under 35 U.S.C. 154(b) by 0 days. days.

(21) Appl. No.: 15/282,880

(22) Filed: Sep. 30, 2016

(65) Prior Publication Data

US 2017/0138758 A1    May 18, 2017

Related U.S. Application Data

(60) Provisional application No. 62/255,214, filed on Nov. 13, 2015, provisional application No. 62/259,536, (Continued)

(51) Int. Cl.
*G01C 21/36* (2006.01)
*G01C 21/34* (2006.01)
(Continued)

(52) U.S. Cl.
CPC ........ *G01C 21/3673* (2013.01); *B60L 11/182* (2013.01); *B60L 11/1809* (2013.01); (Continued)

(58) Field of Classification Search
CPC ............ G01C 21/3673; G01C 21/3469; G01C 21/3697; B60L 11/1809; B60L 11/182; B60L 11/1822; B60L 11/1846; B60L 11/1848; B60L 11/1864; H01G 11/12; H01G 11/22; H01G 11/78; H01M 2/1077; H01M 2/1083; H01M 2/206; H01M 10/425; H01M 10/441
See application file for complete search history.

(56) References Cited

U.S. PATENT DOCUMENTS 3,914,562 A    10/1975  Bolger
5,311,973 A     5/1994  Tseng et al.
(Continued)

FOREIGN PATENT DOCUMENTS

CN    102025184    4/2011
CN    203301194    11/2013
(Continued)

OTHER PUBLICATIONS

U.S. Appl. No. 14/954,436, filed Nov. 30, 2015, Ricci.
(Continued)

*Primary Examiner* — Leon Flores
(74) *Attorney, Agent, or Firm* — Sheridan Ross P.C.

(57) ABSTRACT

Methods, devices, and systems are provided that track details of power transfers made between power sources and electric vehicles. The power tracking system monitors the source of charges received, how much charge was provided, rates billed for the charging service and other information related to a charging transaction. The tracked power consumption may be used by the power tracking system server to anticipate future charging times, preferences, or locations, and even determine driving habits, and demand for charging in a region or area.

20 Claims, 29 Drawing Sheets

Related U.S. Application Data filed on Nov. 24, 2015, provisional application No. 62/266,452, filed on Dec. 11, 2015, provisional application No. 62/269,764, filed on Dec. 18, 2015, provisional application No. 62/300,606, filed on Feb. 26, 2016, provisional application No. 62/310,387, filed on Mar. 18, 2016.

(51) Int. Cl.

| | |
|---|---|
| *B60L 11/18* | (2006.01) |
| *H01G 11/12* | (2013.01) |
| *H01G 11/22* | (2013.01) |
| *H01G 11/78* | (2013.01) |
| *H01M 2/10* | (2006.01) |
| *H01M 2/20* | (2006.01) |
| *H01M 10/42* | (2006.01) |
| *H01M 10/44* | (2006.01) |
| *H01M 10/48* | (2006.01) |
| *H01G 11/08* | (2013.01) |

(52) U.S. Cl.
CPC ....... *B60L 11/1822* (2013.01); *B60L 11/1846* (2013.01); *B60L 11/1848* (2013.01); *B60L 11/1864* (2013.01); *G01C 21/3469* (2013.01); *G01C 21/3697* (2013.01); *H01G 11/12* (2013.01); *H01G 11/22* (2013.01); *H01G 11/78* (2013.01); *H01M 2/1077* (2013.01); *H01M 2/1083* (2013.01); *H01M 2/206* (2013.01); *H01M 10/425* (2013.01); *H01M 10/441* (2013.01); *H01M 10/48* (2013.01); *B60L 2230/16* (2013.01); *H01G 11/08* (2013.01); *H01M 2010/4278* (2013.01); *H01M 2220/20* (2013.01)

(56) References Cited

U.S. PATENT DOCUMENTS

| | | | |
|---|---|---|---|
| 5,431,264 | A | 7/1995 | Tseng et al. |
| 5,563,491 | A | 10/1996 | Tseng |
| 5,821,728 | A | 10/1998 | Schwind |
| 6,291,901 | B1 | 9/2001 | Cefo |
| 7,714,536 | B1 | 5/2010 | Silberg et al. |
| D706,212 | S | 6/2014 | Zwierstra et al. |
| 8,768,533 | B2 | 7/2014 | Ichikawa |
| 8,796,990 | B2 | 8/2014 | Paparo et al. |
| 8,841,785 | B2 | 9/2014 | Theuss et al. |
| 8,841,881 | B2 | 9/2014 | Failing |
| 8,853,999 | B2 | 10/2014 | Haddad et al. |
| 9,018,904 | B2 | 4/2015 | Seyerle et al. |
| D736,716 | S | 8/2015 | Hough et al. |
| 9,120,506 | B2 | 9/2015 | Isakiewitsch et al. |
| 9,124,124 | B2 | 9/2015 | Van Wiemeersch et al. |
| 2011/0025267 | A1* | 2/2011 | Kamen .......... B60L 8/003 320/109 |
| 2011/0204845 | A1 | 8/2011 | Paparo et al. |
| 2012/0203410 | A1 | 8/2012 | Wechlin et al. |
| 2012/0233062 | A1 | 9/2012 | Cornish |
| 2013/0033224 | A1 | 2/2013 | Raedy |
| 2013/0033228 | A1 | 2/2013 | Raedy |
| 2013/0038276 | A1 | 2/2013 | Raedy |
| 2013/0105264 | A1 | 5/2013 | Ruth et al. |
| 2013/0211988 | A1 | 8/2013 | Dorn et al. |
| 2013/0249682 | A1 | 9/2013 | Van Wiemeersch et al. |
| 2014/0012448 | A1 | 1/2014 | Tripathi et al. |
| 2014/0042752 | A1 | 2/2014 | McDermott |
| 2014/0067660 | A1 | 3/2014 | Cornish |
| 2015/0042211 | A1 | 2/2015 | Pan |
| 2015/0061592 | A1 | 3/2015 | Nakasone et al. |
| 2015/0137801 | A1 | 5/2015 | Raedy et al. |
| 2016/0023557 | A1 | 1/2016 | Dimke et al. |
| 2016/0114687 | A1 | 4/2016 | Ichikawa et al. |
| 2016/0303980 | A1 | 10/2016 | Cyr et al. |
| 2016/0355097 | A1 | 12/2016 | Konet et al. |
| 2017/0043672 | A1 | 2/2017 | Araki et al. |
| 2017/0080815 | A1 | 3/2017 | Wechsler et al. |
| 2017/0136894 | A1 | 5/2017 | Ricci |
| 2017/0225582 | A1 | 8/2017 | Augst et al. |

FOREIGN PATENT DOCUMENTS

| | | |
|---|---|---|
| EP | 2711876 | 3/2014 |
| WO | WO 2011/045883 | 4/2011 |
| WO | WO 2011/106506 | 9/2011 |

OTHER PUBLICATIONS

U.S. Appl. No. 14/954,484, filed Nov. 30, 2015, Ricci.
U.S. Appl. No. 14/979,158, filed Dec. 22, 2015, Ricci.
U.S. Appl. No. 14/981,368, filed Dec. 28, 2015, Ricci.
U.S. Appl. No. 15/010,701, filed Jan. 29, 2016, Ricci.
U.S. Appl. No. 15/010,921, filed Jan. 29, 2016, Ricci.
U.S. Appl. No. 15/044,940, filed Feb. 16, 2016, Ricci.
U.S. Appl. No. 15/048,307, filed Feb. 19, 2016, Ricci.
U.S. Appl. No. 15/055,345, filed Feb. 26, 2016, Ricci.
U.S. Appl. No. 15/074,593, filed Mar. 18, 2016, Ricci.
U.S. Appl. No. 15/074,624, filed Mar. 18, 2016, Ricci.
U.S. Appl. No. 15/143,083, filed Apr. 29, 2016, Ricci.
U.S. Appl. No. 15/145,416, filed May 3, 2016, Ricci.
U.S. Appl. No. 15/169,073, filed May 31, 2016, Ricci.
U.S. Appl. No. 15/170,406, filed Jun. 1, 2016, Ricci.
U.S. Appl. No. 15/196,898, filed Jun. 29, 2016, Ricci.
U.S. Appl. No. 15/198,034, filed Jun. 30, 2016, Ricci.
U.S. Appl. No. 15/223,814, filed Jul. 29, 2016, Ricci.
U.S. Appl. No. 15/226,446, filed Aug. 2, 2016, Ricci.
U.S. Appl. No. 15/237,937, filed Aug. 16, 2016, Ricci.
U.S. Appl. No. 15/246,867, filed Aug. 25, 2016, Ricci.
U.S. Appl. No. 15/254,915, filed Sep. 1, 2016, Ricci.
"Inductive charging," Wikipedia, 2015, retrieved from https://en.wikipedia.org/wiki/Inductive_charging, 6 pages.
"Meet the Plugless L2," Pluglesspower.com, 2014, retrieved from https://web.archive.org/web/20150920163501/https://www.pluglesspower.com/, 5 pages.
"Someday Your EV Charger May Be the Roadway Itself," MIT Technology Review, 2013, retrieved from http://www.technologyreview.com/news/521761/someday-your-ev-charger-may-be-the-roadway-itself/, 2 pages.
"Wireless Charging for Electric Vehicles," brochure, QUALCOMM HALO, 2011, 6 pages.
"Wireless Charging," PowerbyProxi, 2015, retrieved from https://powerbyproxi.com/wireless-charging/, 5 pages.
Brachmann, Wireless induction charging is coming to electric vehicles, IPWatchdog, 2015, retrieved from http://www.ipwatchdog.com/2015/06/18/wireless-induction-charging-is-coming-to-electric-vehicles/id=58756/, 6 pages.
Crawford, "UK motorway to charge electric cars on the move," E&T, 2014, retrieved from http://eandt.theiet.org/news/2014/apr/onroad-charging.cfm, 4 pages.
Gitlin. "Cutting the cord: Ars goes hands-on with Qualcomm Halo wireless car charging," Ars Technica, 2015, retrieved from http://arstechnica.com/cars/2015/04/cutting-the-cord-ars-goes-hands-on-with-qualcomm-halo-wireless-car-charging/, 5 pages.
Gordon-Bloomfield, "Infiniti Delays LE Electric Sedan Production Plans," PluginCars.com, 2013, retrieved from http://www.plugincars.com/pring/127405, 2 pages.
Greimel, "Nissan's next Evs: More mainstream, better battery," Automotive News, 2014, retrieved from http://www.autonews.com/article/20140507/OEM05/140509845?template=printart, 2 pages.
Harris, "Your questions answered: inductive charging for road vehicles," the Engineer, 2013, retrieved from http://www.theengineer.co.uk/automotive/in-depth/your-questions-answered-inductive-charging-for-road-vehicles, 8 pages.
Ivanco et al., "Wireless Charging Panel," EV Roadmap 7, 2014, 15 pages.

(56) References Cited

OTHER PUBLICATIONS

Li et al., "Energy Management and Control of Electric Vehicle Charing Stations," Electric Power Components and Systems, 2014, vol. 42(3-4), pp. 339-347.
Marks, "Wireless Charging for Electric vehicles hits the read," New Scientist, 2014, Issue 2953, retrieved from https://www.newscientist.com/article/mg22129534-900-wireless-charging-for-electric-vehicles-hits-the-road/, 2 pages.
Morris, "What's up with wireless EV charging," Charged Evs, 2013, retrieved from https://chargedevs.com/features/whats-wireless-ev-charging/, 9 pages.
Rim, "Wireless Power Transfer Systems for Roadway-powered Electric Vehicles," IEEE, 2014, retrieved from http://tec.ieee.org/2014/09/02/wireless-power-transfer-systems-roadway-powered-electric-vehicles/, 6 pages.
Stewart, "2014 Infiniti EV to Debut Wireless Inductive Charging System," Popular Mechanics, 2011, retrieved from http://www.popularmechanics.com/cars/hybrid-electric/a7331/2014-infiniti-ev-to-debut-wireless-inductive-charging-system/, 4 pages.
Szondy, "BMW developing wireless inductive charging system for electric vehicles," gizmag.com, 2014, retrieved from http://newatlas.com/bmw-induction-charging/32863/, 4 pages.
Taylor, "Unplugged: Audi Readying Wireless Induction Charging for Q7 e-tron," Car and Driver, 2015, retrieved from http://blog.caranddriver.com/unplugged-audi-readying-wireless-induction-charging-for-q7-e-tron/2 pages.
Official Action for U.S. Appl. No. 15/169,073, dated Dec. 14, 2017, 15 pages.

\* cited by examiner

| Charging Type (310A) | Compatible Vehicle Charging Panel Types (310B) | Compatible Vehicle Storage Units (310C) | Available Automation Level (310D) | Charging Service Status (310E) | Charge Rate (310F) | Cost (310G) | Other (310H) | Shielding (310I) |
|---|---|---|---|---|---|---|---|---|
| Station: manual | Roof, Side | x, z | Low | Up | Low | $100 | A, B, C | On |
| Station: manual | Roof, Side | x, z | Low | Up | Medium | $150 | A, C | On |
| Station: manual | Roof, Side | x, z | Low | Up | High | $400 | A, B, C | On |
| Station: robotic | Roof, Side | x, z | Medium | Down | Medium | $150 | A, B, D | On |
| Station: robotic | Roof, Side | x, z | High | Down | High | $500 | B, D | On |
| Station: robotic | Roof, Side | x, z | High | Down | High | $500 | B, C | On |
| Roadway | Side, Lower | x, z | Low | Up | Low | $50 | A, C, E | Off |
| Roadway | Side, Lower | x, z | Medium | Up | Low | $100 | A, C, E | Off |
| Roadway | Side, Lower | x, z | Medium | Up | Low | $100 | A, C, E | Off |
| Emergency: truck | Roof, Side, Lower | x, y | Low | Up | Low | $150 | A, B | Off |
| Emergency: truck | Roof, Side, Lower | x, y | Medium | Up | Medium | $200 | A, B | Off |
| Emergency: truck | Roof, Side, Lower | x, y | Medium | Up | High | $500 | A, D | Off |
| Emergency: UAV | Roof | x | Medium | Down | Medium | $500 | A, B, C | Off |
| Emergency: UAV | Roof | x | High | Down | High | $800 | B | Off |
| Emergency: UAV | Roof | x | High | Down | High | $800 | B | Off |
| Overhead | Roof | x, y | Low | Up | Low | $150 | B, D | Off |
| Overhead | Roof | x, y | Medium | Up | Low | $200 | B, C | Off |
| Overhead | Roof | x, y | Medium | Up | Low | $200 | B, C | Off |

*Fig. 3*

TRACKING POWER CONSUMPTION AND PAYMENT

CROSS REFERENCE TO RELATED APPLICATIONS

The present application claims the benefits of and priority, under 35 U.S.C. § 119(e), to U.S. Provisional Application Ser. No. 62/255,214, filed on Nov. 13, 2015, entitled "Electric Vehicle Systems and Operation"; 62/259,536, filed Nov. 24, 2015, entitled "Charging Transmission Line Under Roadway for Moving Electric Vehicle"; 62/266,452, filed Dec. 11, 2015, entitled "Charging Transmission Line Under Roadway for Moving Electric Vehicle"; 62/269,764, filed Dec. 18, 2015, entitled "Conditional Progressive Degradation of Electric Vehicle Power Supply System"; 62/300,606, filed Feb. 26, 2016, entitled "Charging Transmission Line Under Roadway for Moving Electric Vehicle"; and 62/310,387, filed Mar. 18, 2016, entitled "Distributed Processing Network for Rechargeable Electric Vehicle Tracking and Routing." The entire disclosures of the applications listed above are hereby incorporated by reference, in their entirety, for all that they teach and for all purposes.

This application is also related to U.S. patent application Ser. No. 14/954,436 filed Nov. 30, 2015, entitled "Electric Vehicle Roadway Charging System and Method of Use"; Ser. No. 14/954,484 filed Nov. 30, 2015, entitled "Electric Vehicle Charging Device Positioning and Method of Use"; Ser. No. 14/979,158 filed Dec. 22, 2015, entitled "Electric Vehicle Charging Device Alignment and Method of Use"; Ser. No. 14/981,368 filed Dec. 28, 2015, entitled "Electric Vehicle Charging Device Obstacle Avoidance and Warning System and Method of Use"; Ser. No. 15/010,701 filed Jan. 29, 2016, entitled "Electric Vehicle Emergency Charging System and Method of Use"; Ser. No. 15/010,921 filed Jan. 29, 2016, entitled "Electric Vehicle Aerial Vehicle Charging System and Method of Use"; Ser. No. 15/044,940 filed Feb. 16, 2016, entitled "Electric Vehicle Overhead Charging System and Method of Use"; Ser. No. 15/048,307 filed Feb. 19, 2016, entitled "Electric Vehicle Charging Station System and Method of Use"; Ser. No. 15/055,345 filed Feb. 26, 2016, entitled "Charging Transmission Line Under Roadway For Moving Electric Vehicle"; Ser. No. 15/074,593 filed Mar. 18, 2016, entitled "Multi-Mode Rechargeable Electric Vehicle"; Ser. No. 15/074,624 filed Mar. 18, 2016, entitled "Distributed Processing Network for Rechargeable Electric Vehicle Tracking and Routing"; Ser. No. 15/143,083 filed Apr. 29, 2016, entitled "Vehicle To Vehicle Charging System and Method of Use"; Ser. No. 15/145,416 filed May 3, 2016, entitled "Electric Vehicle Optical Charging System and Method of Use"; Ser. No. 15/169,073 filed May 31, 2016, entitled "Vehicle Charge Exchange System and Method of Use"; Ser. No. 15/170,406 filed Jun. 1, 2016, entitled "Vehicle Group Charging System and Method of Use"; Ser. No. 15/196,898 filed Jun. 29, 2016, entitled "Predictive Charging System and Method of Use"; Ser. No. 15/198,034 filed Jun. 30, 2016, entitled "Integrated Vehicle Charging Panel System and Method of Use"; Ser. No. 15/223,814 filed Jul. 29, 2016, entitled "Vehicle Skin Charging System and Method"; Ser. No. 15/226,446 filed Aug. 2, 2016, entitled "Vehicle Capacitive Charging System and Method of Use"; Ser. No. 15/237,937 filed Aug. 16, 2016, entitled "Smart Grid Management"; Ser. No. 15/246,867 filed Aug. 25, 2016, entitled "Electric Contact Device for Electric Vehicles and Method of Use"; and Ser. No. 15/254,915 filed Sep. 1, 2016, entitled "Multi-Vehicle Communications and Control System". The entire disclosures of the applications listed above are hereby incorporated by reference, in their entirety, for all that they teach and for all purposes.

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

BRIEF DESCRIPTION OF THE DRAWINGS

FIG. 3 is a diagram of an embodiment of a data structure for storing information about a vehicle in an environment;

DETAILED DESCRIPTION

Embodiments of the present disclosure will be described in connection with a vehicle, and in accordance with one exemplary embodiment an electric vehicle and/or hybrid-electric vehicle and associated systems.

With attention to FIGS. 1-11, embodiments of the electric vehicle system 10 and method of use are depicted.

Figure 1:
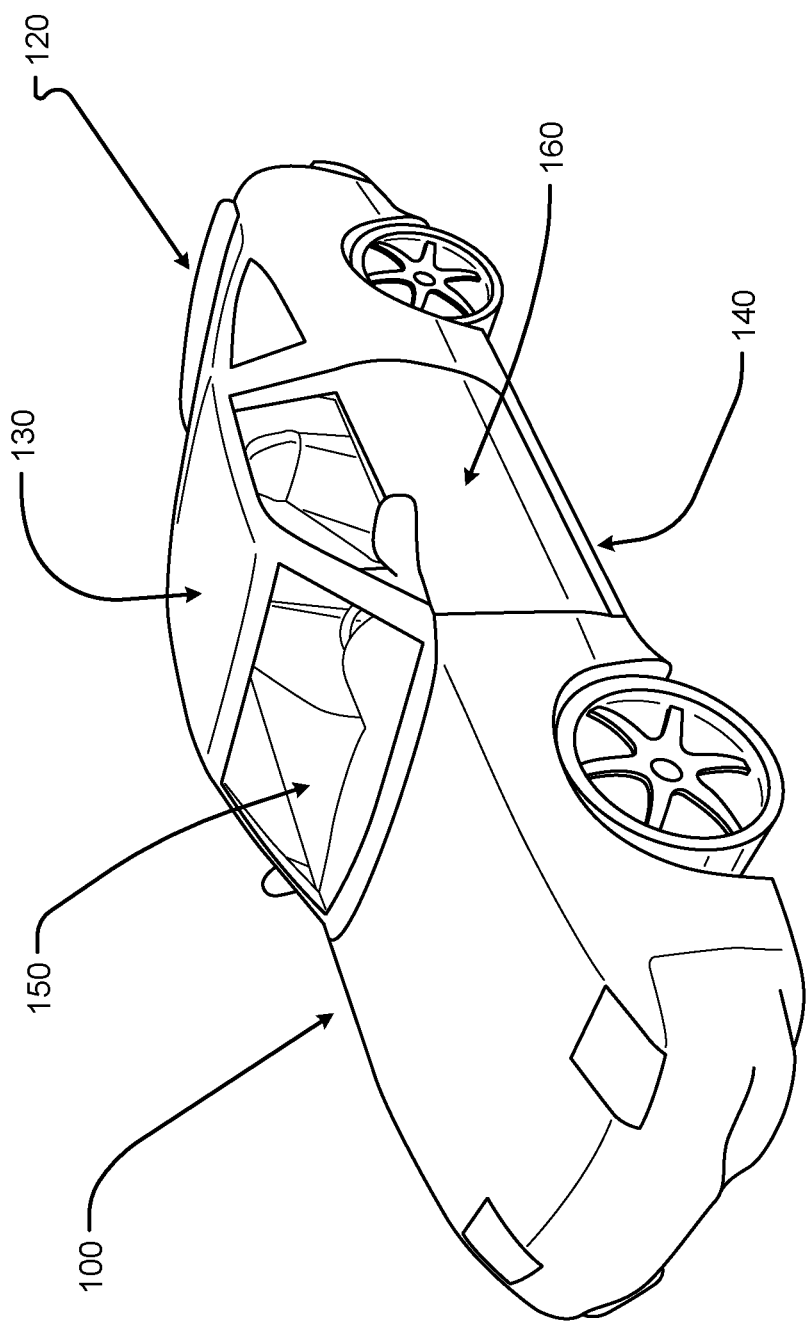
FIG. 1 shows a vehicle in accordance with embodiments of the present disclosure.

Referring to FIG. 1, the electric vehicle system comprises electric vehicle 100. The electric vehicle 100 comprises vehicle front 110, vehicle aft 120, vehicle roof 130, vehicle side 160, vehicle undercarriage 140 and vehicle interior 150.

Figure 2:
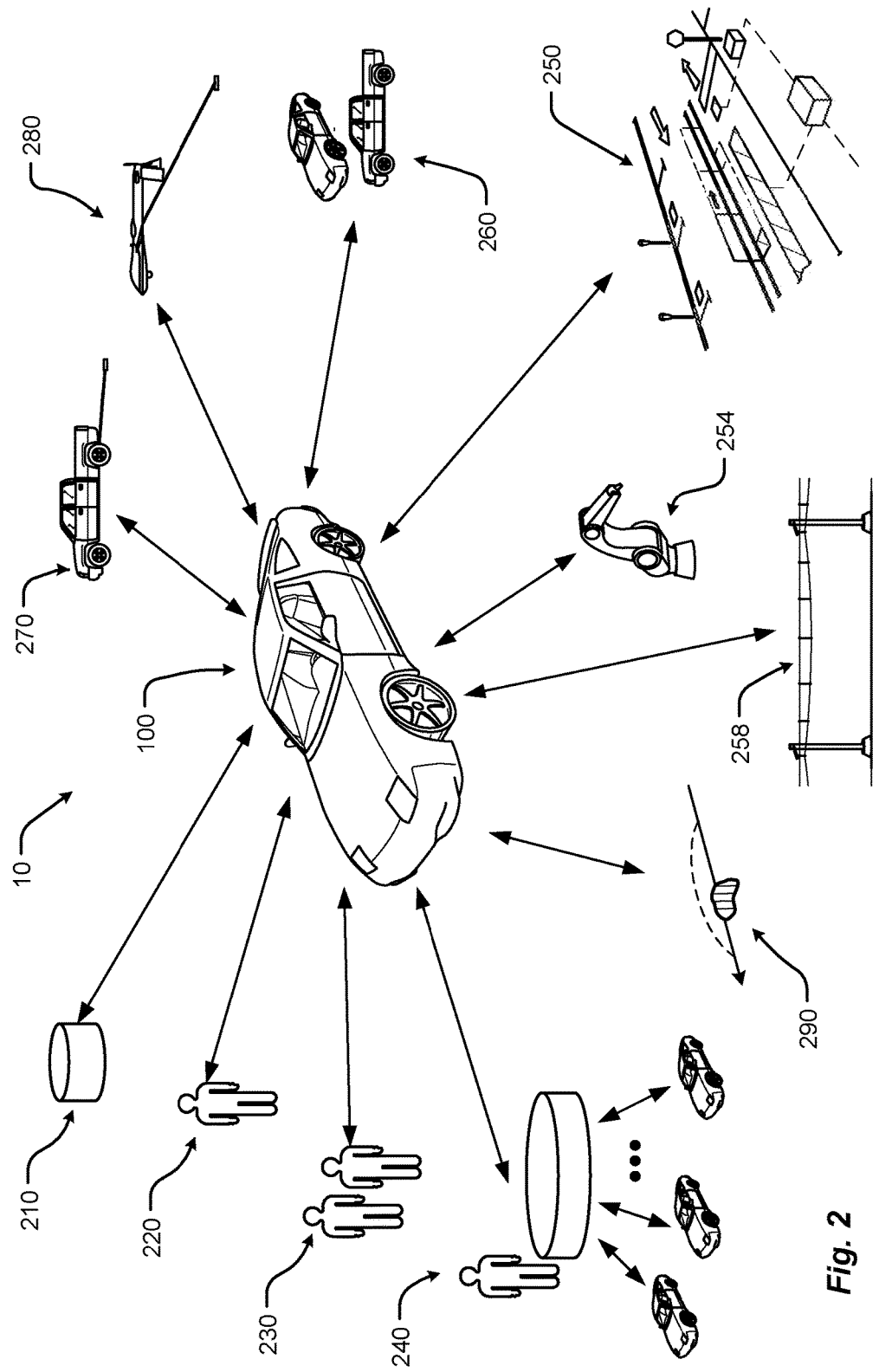
FIG. 2 shows a vehicle in an environment in accordance with embodiments of the present disclosure.

Referring to FIG. 2, the vehicle 100 is depicted in a plurality of exemplary environments. The vehicle 100 may operate in any one or more of the depicted environments in any combination. Other embodiments are possible but are not depicted in FIG. 2. Generally, the vehicle 100 may operate in environments which enable charging of the vehicle 100 and/or operation of the vehicle 100. More specifically, the vehicle 100 may receive a charge via one or more means comprising emergency charging vehicle system 270, aerial vehicle charging system 280, roadway system 250, robotic charging system 254 and overhead charging system 258. The vehicle 100 may interact and/or operate in an environment comprising one or more other roadway vehicles 260. The vehicle 100 may engage with elements within the vehicle 100 comprising vehicle driver 220, vehicle passengers 220 and vehicle database 210. In one embodiment, vehicle database 210 does not physically reside in the vehicle 100 but is instead accessed remotely, e.g. by wireless communication, and resides in another location such as a residence or business location. Vehicle 100 may operate autonomously and/or semi-autonomously in an autonomous environment 290 (here, depicted as a roadway environment presenting a roadway obstacle of which the vehicle 100 autonomously identifies and steers the vehicle 100 clear of the obstacle). Furthermore, the vehicle 100 may engage with a remote operator system 240, which may provide fleet management instructions or control.

FIG. 3 is a diagram of an embodiment of a data structure 300 for storing information about a vehicle 100 in an environment. The data structure may be stored in vehicle database 210. Generally, data structure 300 identifies operational data associated with charging types 310A. The data structures 300 may be accessible by a vehicle controller. The data contained in data structure 300 enables, among other things, for the vehicle 100 to receive a charge from a given charging type.

Data may comprise charging type 310A comprising a manual charging station 310J, robotic charging station 310K such as robotic charging system 254, a roadway charging system 310L such as those of roadway system 250, an emergency charging system 310M such as that of emergency charging vehicle system 270, an emergency charging system 310N such as that of aerial vehicle charging system 280, and overhead charging type 310O such as that of overhead charging system 258.

Compatible vehicle charging panel types 310B comprise locations on vehicle 100 wherein charging may be received, such as vehicle roof 130, vehicle side 160 and vehicle lower or undercarriage 140. Compatible vehicle storage units 310C data indicates storage units types that may receive power from a given charging type 310A. Available automation level 310D data indicates the degree of automation available for a given charging type; a high level may indicate full automation, allowing the vehicle driver 220 and/or vehicle passengers 230 to not involve themselves in charging operations, while a low level of automation may require the driver 220 and/or occupant 230 to manipulate/position a vehicle charging device to engage with a particular charging type 310A to receive charging. Charging status 310E indicates whether a charging type 310A is available for charging (i.e. is "up") or is unavailable for charging (i.e. is "down"). Charge rate 310F provides a relative value for time to charge, while Cost 310G indicates the cost to vehicle 100 to receive a given charge. The Other data element 310H may provide additional data relevant to a given charging type 310A, such as a recommended separation distance between a vehicle charging plate and the charging source. The Shielding data element 310I indicates if electromagnetic shielding is recommended for a given charging type 310A and/or charging configuration. Further data fields 310P, 310Q are possible.

Figure 4A:
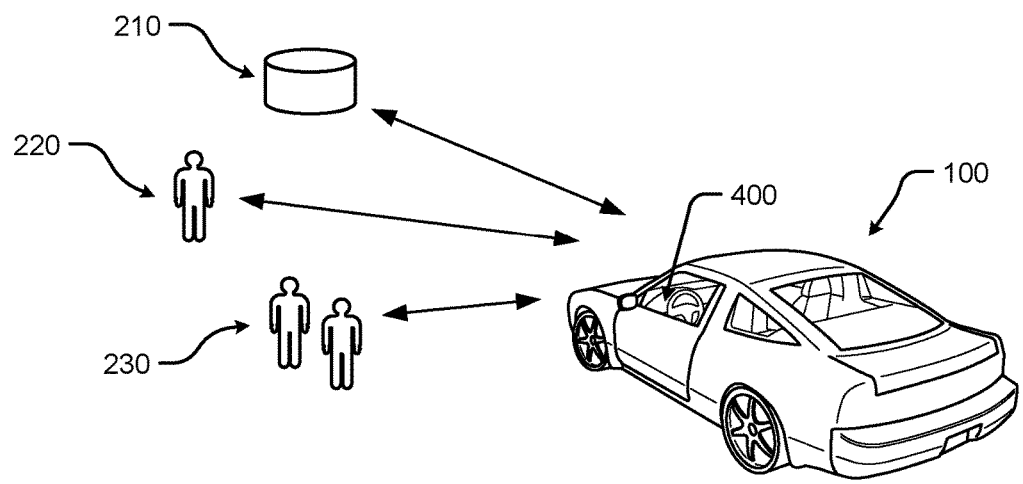
FIG. 4A shows a vehicle in a user environment in accordance with embodiments of the present disclosure.

FIG. 4A depicts the vehicle 100 in a user environment comprising vehicle database 210, vehicle driver 220 and vehicle passengers 230. Vehicle 100 further comprises vehicle instrument panel 400 to facilitate or enable interactions with one or more of vehicle database 210, vehicle driver 220 and vehicle passengers 230. In one embodiment, driver 210 interacts with instrument panel 400 to query database 210 so as to locate available charging options and to consider or weigh associated terms and conditions of the charging options. Once a charging option is selected, driver 210 may engage or operate a manual control device (e.g., a joystick) to position a vehicle charging receiver panel so as to receive a charge.

Figure 4B:
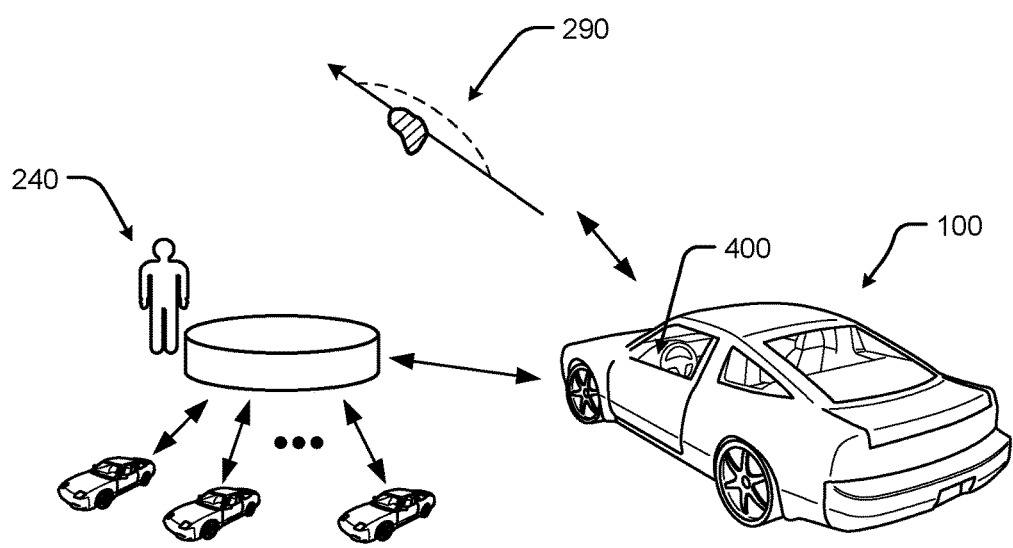
FIG. 4B shows a vehicle in a fleet management and automated operation environment in accordance with embodiments of the present disclosure.

FIG. 4B depicts the vehicle 100 in a user environment comprising a remote operator system 240 and an autonomous driving environment 290. In the remote operator system 240 environment, a fleet of electric vehicles 100 (or mixture of electric and non-electric vehicles) is managed and/or controlled remotely. For example, a human operator may dictate that only certain types of charging types are to be used, or only those charging types below a certain price point are to be used. The remote operator system 240 may comprise a database comprising operational data, such as fleet-wide operational data. In another example, the vehicle 100 may operate in an autonomous driving environment 290 wherein the vehicle 100 is operated with some degree of autonomy, ranging from complete autonomous operation to semi-automation wherein only specific driving parameters (e.g., speed control or obstacle avoidance) are maintained or controlled autonomously. In FIG. 4B, autonomous driving environment 290 depicts an oil slick roadway hazard that triggers that triggers the vehicle 100, while in an automated obstacle avoidance mode, to automatically steer around the roadway hazard.

Figure 4C:
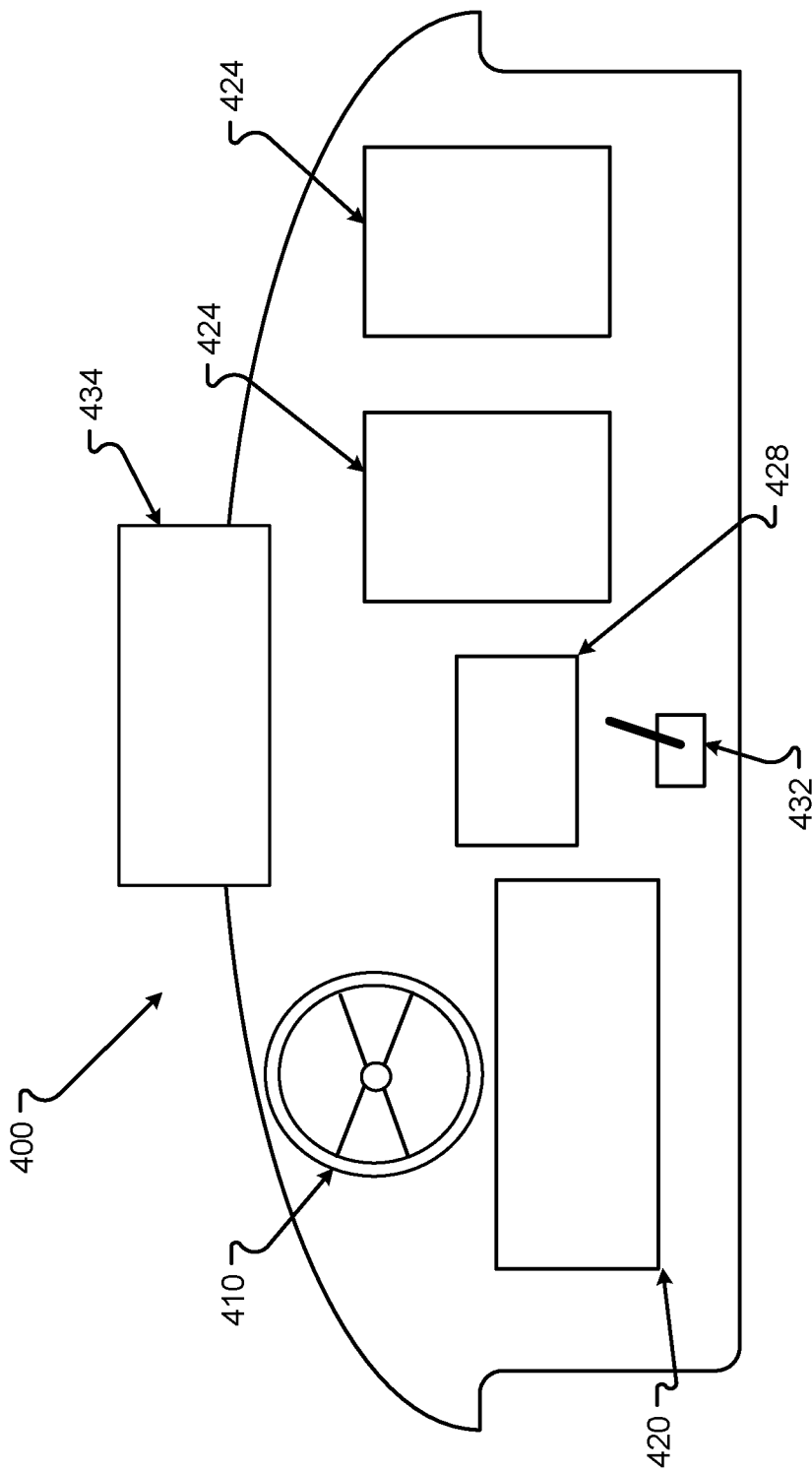
FIG. 4C shows an embodiment of the instrument panel of the vehicle according to one embodiment of the present disclosure.

FIG. 4C shows one embodiment of the vehicle instrument panel 400 of vehicle 100. Instrument panel 400 of vehicle 100 comprises steering wheel 410, vehicle operational display 420 (which would provide basic driving data such as speed), one or more auxiliary displays 424 (which may display, e.g., entertainment applications such as music or radio selections), heads-up display 434 (which may provide, e.g., guidance information such as route to destination, or obstacle warning information to warn of a potential collision, or some or all primary vehicle operational data such as speed), power management display 428 (which may provide, e.g., data as to electric power levels of vehicle 100), and charging manual controller 432 (which provides a physical input, e.g. a joystick, to manual maneuver, e.g., a vehicle charging plate to a desired separation distance). One or more of displays of instrument panel 400 may be touch-screen displays. One or more displays of instrument panel 400 may be mobile devices and/or applications residing on a mobile device such as a smart phone.

Figure 5:
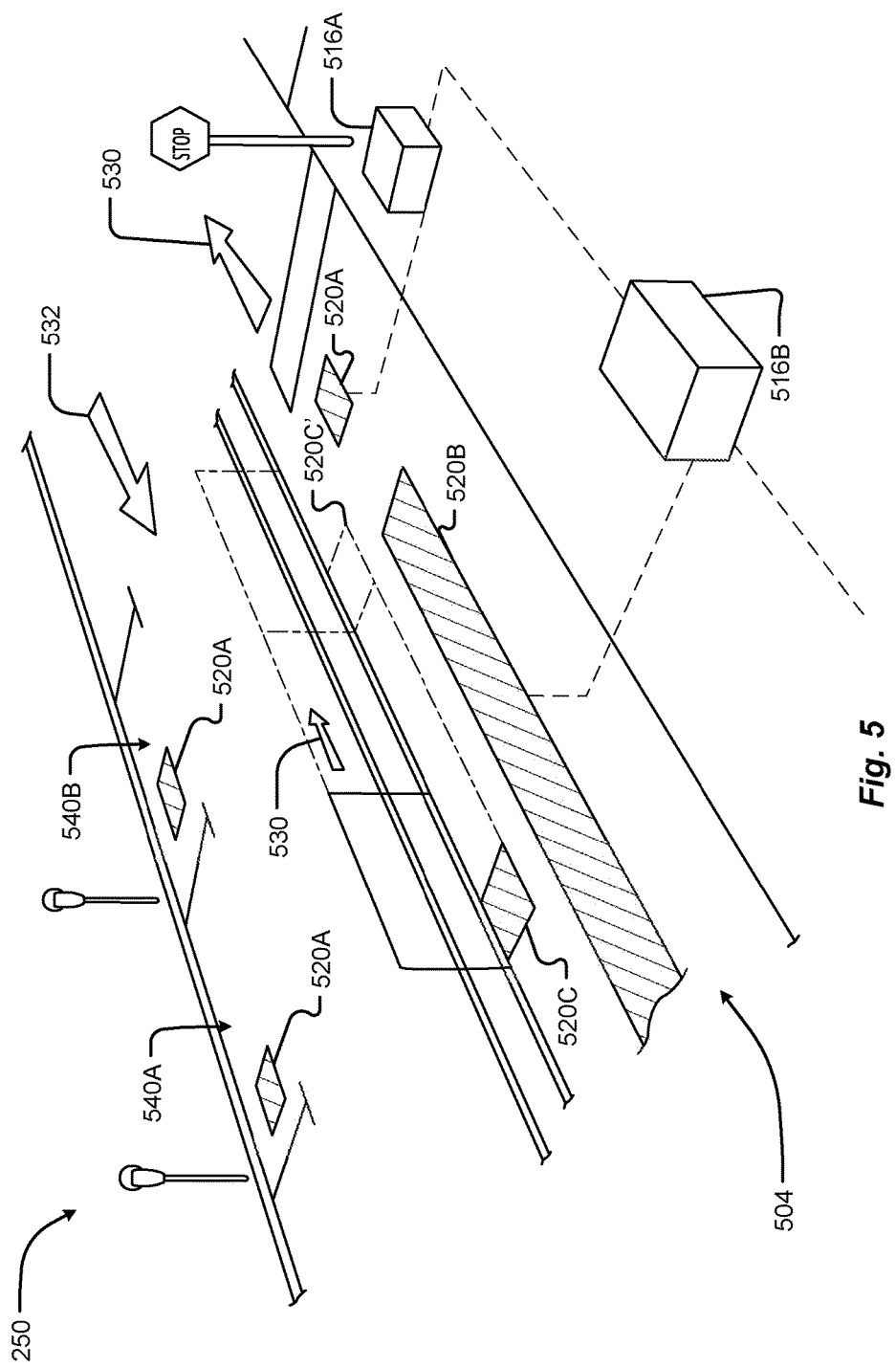
FIG. 5 shows charging areas associated with an environment in accordance with embodiments of the present disclosure.

FIG. 5 depicts a charging environment of a roadway charging system 250. The charging area may be in the roadway 504, on the roadway 504, or otherwise adjacent to the roadway 504, and/or combinations thereof. This static charging area 520B may allow a charge to be transferred even while the electrical vehicle 100 is moving. For example, the static charging area 520B may include a charging transmitter (e.g., conductor, etc.) that provides a transfer of energy when in a suitable range of a receiving unit (e.g., an inductor pick up, etc.). In this example, the receiving unit may be a part of the charging panel associated with the electrical vehicle 100.

The static charging areas 520A, 520B may be positioned a static area such as a designated spot, pad, parking space 540A, 540B, traffic controlled space (e.g., an area adjacent to a stop sign, traffic light, gate, etc.), portion of a building, portion of a structure, etc., and/or combinations thereof. Some static charging areas may require that the electric vehicle 100 is stationary before a charge, or electrical energy transfer, is initiated. The charging of vehicle 100 may occur by any of several means comprising a plug or other protruding feature. The power source 516A, 516B may include a receptacle or other receiving feature, and/or vice versa.

The charging area may be a moving charging area 520C. Moving charging areas 520C may include charging areas associated with one or more portions of a vehicle, a robotic charging device, a tracked charging device, a rail charging device, etc., and/or combinations thereof. In a moving charging area 520C, the electrical vehicle 100 may be configured to receive a charge, via a charging panel, while the vehicle 100 is moving and/or while the vehicle 100 is stationary. In some embodiments, the electrical vehicle 100 may synchronize to move at the same speed, acceleration, and/or path as the moving charging area 520C. In one embodiment, the moving charging area 520C may synchronize to move at the same speed, acceleration, and/or path as the electrical vehicle 100. In any event, the synchronization may be based on an exchange of information communicated across a communications channel between the electric vehicle 100 and the charging area 520C. Additionally or alternatively, the synchronization may be based on information associated with a movement of the electric vehicle 100 and/or the moving charging area 520C. In some embodiments, the moving charging area 520C may be configured to move along a direction or path 532 from an origin position to a destination position 520C'.

In some embodiments, a transformer may be included to convert a power setting associated with a main power supply to a power supply used by the charging areas 520A-C. For example, the transformer may increase or decrease a voltage associated with power supplied via one or more power transmission lines.

Figure 6:
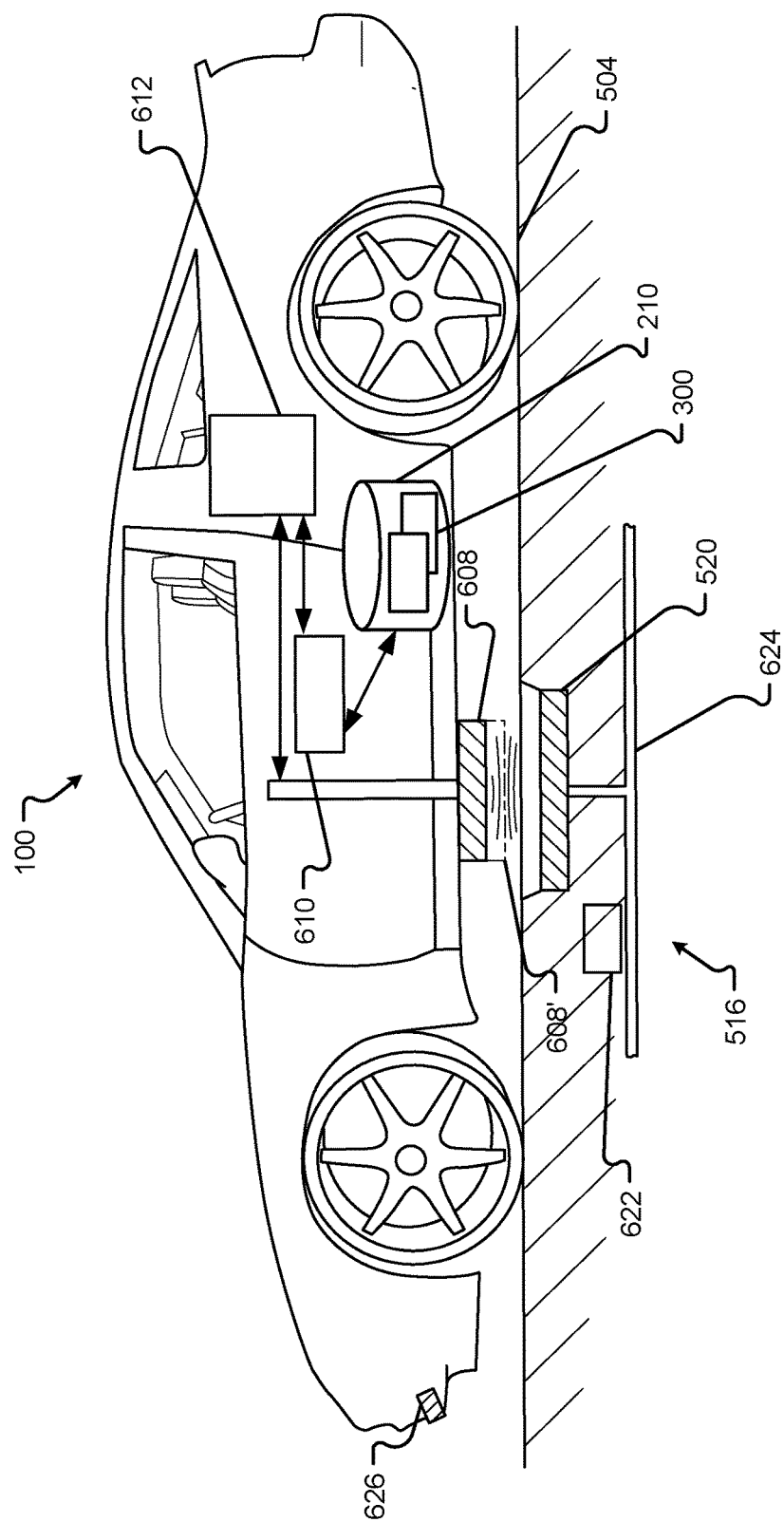
FIG. 6 shows a vehicle in a roadway charging environment in accordance with embodiments of the present disclosure.

Referring to FIG. 6, a vehicle 100 is shown in a charging environment in accordance with embodiments of the present disclosure. The system 10 comprises a vehicle 100, an electrical storage unit 612, an external power source 516 able to provide a charge to the vehicle 100, a charging panel 608 mounted on the vehicle 100 and in electrical communication with the electrical storage unit 612, and a vehicle charging panel controller 610. The charging panel controller 610 may determine if the electrical storage unit requires charging and if conditions allow for deployment of a charging panel. The vehicle charging panel 608 may operate in at least a retracted state and a deployed state (608 and 608' as shown is FIG. 6), and is movable by way of an armature.

The charging panel controller 610 may receive signals from vehicle sensors 626 to determine, for example, if a hazard is present in the path of the vehicle 100 such that deployment of the vehicle charging panel 608 is inadvisable. The charging panel controller 610 may also query vehicle database 210 comprising data structures 300 to establish other required conditions for deployment. For example, the database may provide that a particular roadway does not provide a charging service or the charging service is inactive, wherein the charging panel 108 would not be deployed.

The power source 516 may include at least one electrical transmission line 624 and at least one power transmitter or charging area 520. During a charge, the charging panel 608 may serve to transfer energy from the power source 516 to at least one energy storage unit 612 (e.g., battery, capacitor, power cell, etc.) of the electric vehicle 100.

Figure 7:
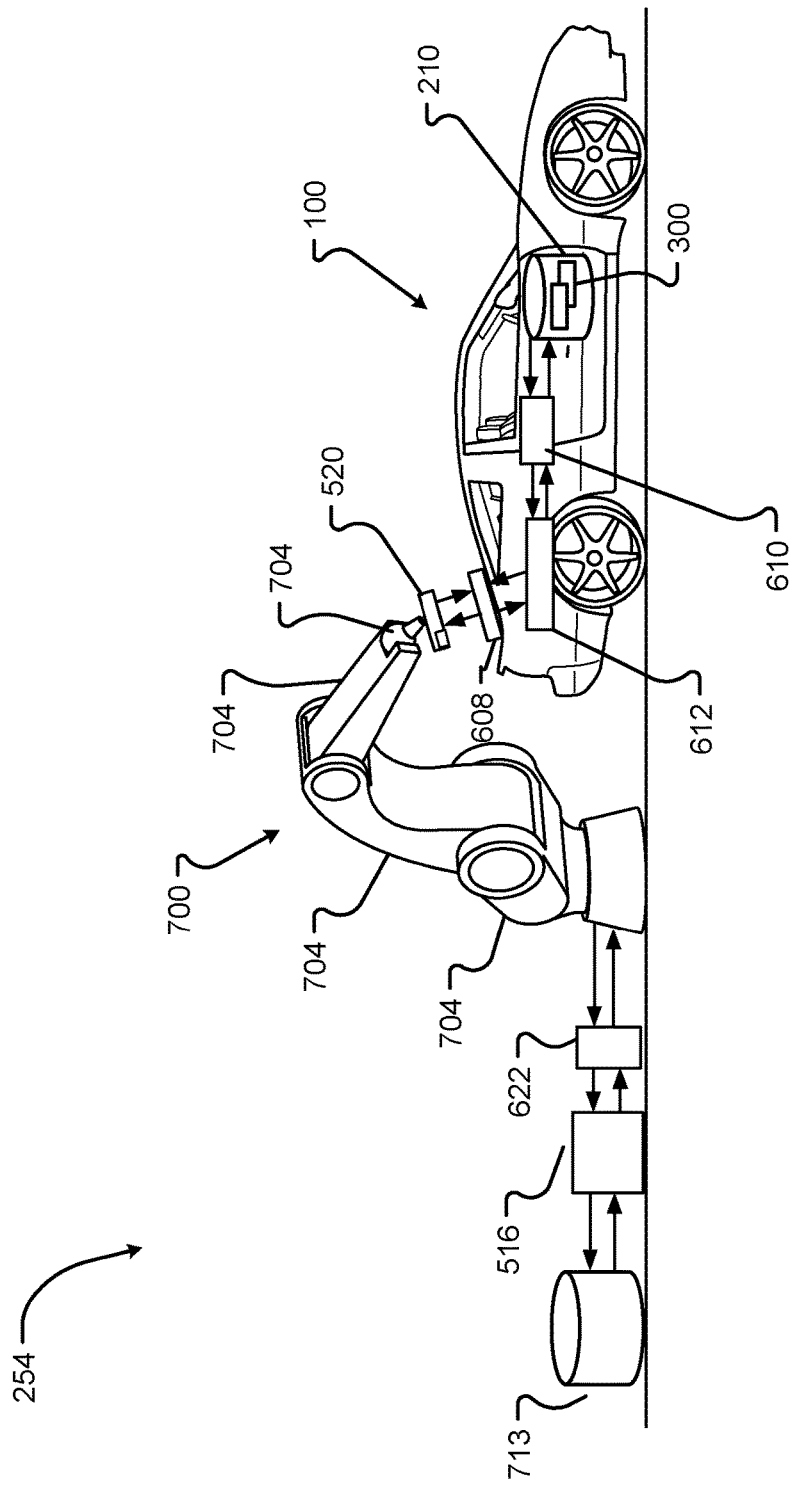
FIG. 7 shows a vehicle in a robotic charging station environment in accordance with another embodiment of the present disclosure.

FIG. 7 shows a vehicle 100 in a charging station environment 254 in accordance with another embodiment of the present disclosure. Generally, in this embodiment of the disclosure, charging occurs from a robotic unit 700.

Robotic charging unit 700 comprises one or more robotic unit arms 704, at least one robotic unit arm 704 interconnected with charging plate 520. The one or more robotic unit arms 704 manoeuver charging plate 520 relative to charging panel 608 of vehicle 100. Charging plate 520 is positioned to a desired or selectable separation distance, as assisted by a separation distance sensor disposed on charging plate 520. Charging plate 520 may remain at a finite separation distance from charging panel 608, or may directly contact charging panel (i.e. such that separation distance is zero). Charging may be by induction. In alternative embodiments, separation distance sensor is alternatively or additionally disposed on robotic arm 704. Vehicle 100 receives charging via charging panel 608 which in turn charges energy storage unit 612. Charging panel controller 610 is in communication with energy storage unit 612, charging panel 608, vehicle database 300, charge provider controller 622, and/or any one of elements of instrument panel 400.

Robotic unit further comprises, is in communication with and/or is interconnected with charge provider controller 622, power source 516 and a robotic unit database. Power source 516 supplies power, such as electrical power, to charge plate 520 to enable charging of vehicle 100 via charging panel 608. Controller 622 manoeuvers or operates robotic unit 704, either directly and/or completely or with assistance from a remote user, such as a driver or passenger in vehicle 100 by way of, in one embodiment, charging manual controller 432.

Figure 8:
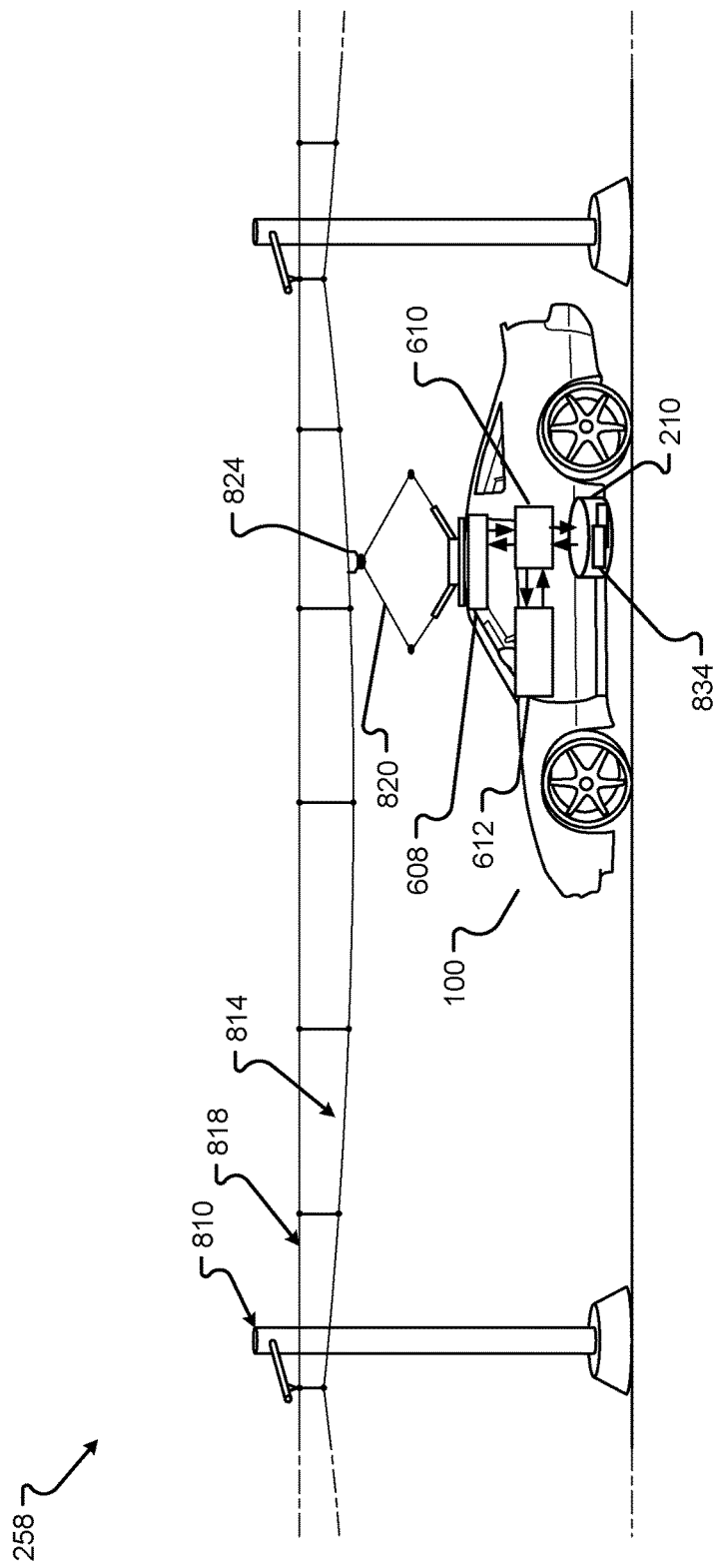
FIG. 8 shows a vehicle in an overhead charging environment in accordance with another embodiment of the present disclosure.

FIG. 8 shows a vehicle 100 in an overhead charging environment in accordance with another embodiment of the present disclosure. Generally, in this embodiment of the disclosure, charging occurs from an overhead towered charging system 258, similar to existing commuter rail systems. Such an overhead towered system 258 may be easier to build and repair compared to in-roadway systems. Generally, the disclosure includes a specially-designed overhead roadway charging system comprising an overhead charging cable or first wire 814 that is configured to engage an overhead contact 824 which provides charge to charging panel 608 which provides charge to vehicle energy storage unit 612. The overhead towered charging system 258 may further comprise second wire 818 to provide stability and structural strength to the roadway charging system 800. The first wire 814 and second wire 818 are strung between towers 810.

The overhead charging cable or first wire 814 is analogous to a contact wire used to provide charging to electric trains or other vehicles. An external source provides or supplies electrical power to the first wire 814. The charge provider comprises an energy source i.e. a provider battery and a provider charge circuit or controller in communication with the provider battery. The overhead charging cable or first wire 814 engages the overhead contact 824 which is in electrical communication with charge receiver panel 108. The overhead contact 824 may comprise any known means to connect to overhead electrical power cables, such as a pantograph 820, a bow collector, a trolley pole or any means known to those skilled in the art. Further disclosure regarding electrical power or energy transfer via overhead systems is found in US Pat. Publ. No. 2013/0105264 to Ruth entitled "Pantograph Assembly," the entire contents of which are incorporated by reference for all purposes. In one embodiment, the charging of vehicle 100 by overhead charging system 800 via overhead contact 824 is by any means know to those skilled in the art, to include those described in the above-referenced US Pat. Publ. No. 2013/0105264 to Ruth.

The overhead contact 824 presses against the underside of the lowest overhead wire of the overhead charging system, i.e. the overhead charging cable or first wire 814, aka the contact wire. The overhead contact 824 may be electrically conductive. Alternatively or additionally, the overhead contact 824 may be adapted to receive electrical power from overhead charging cable or first wire 814 by inductive charging.

In one embodiment, the receipt and/or control of the energy provided via overhead contact 824 (as connected to the energy storage unit 612) is provided by receiver charge circuit or charging panel controller 110.

Overhead contact 824 and/or charging panel 608 may be located anywhere on vehicle 100, to include, for example, the roof, side panel, trunk, hood, front or rear bumper of the charge receiver 100 vehicle, as long as the overhead contact 824 may engage the overhead charging cable or first wire 814. Charging panel 108 may be stationary (e.g. disposed on the roof of vehicle 100) or may be moveable, e.g. moveable with the pantograph 820. Pantograph 820 may be positioned in at least two states comprising retracted and extended. In the extended state pantograph 820 engages first wire 814 by way of the overhead contact 824. In the retracted state, pantograph 820 may typically reside flush with the roof of vehicle 100 and extend only when required for charging. Control of the charging and/or positioning of the charging plate 608, pantograph 820 and/or overhead contact 824 may be manual, automatic or semi-automatic (such as via controller 610); said control may be performed through a GUI engaged by driver or occupant of receiving vehicle 100 and/or driver or occupant of charging vehicle.

Figure 9:
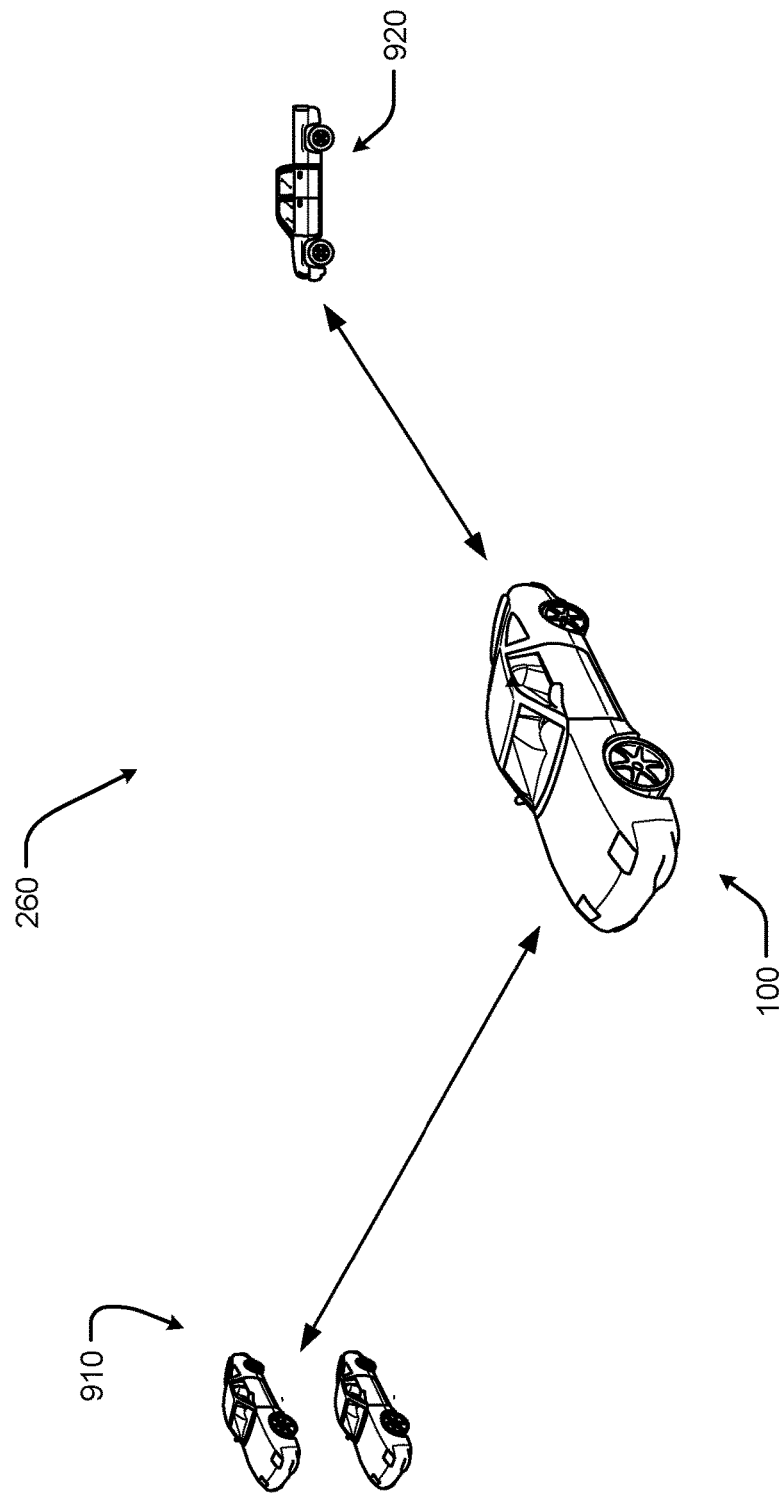
FIG. 9 shows a vehicle in a roadway environment comprising roadway vehicles in accordance with another embodiment of the present disclosure.

FIG. 9 shows a vehicle in a roadway environment comprising roadway vehicles 260 in accordance with another embodiment of the present disclosure. Roadway vehicles 260 comprise roadway passive vehicles 910 and roadway active vehicles 920. Roadway passive vehicles 910 comprise vehicles that are operating on the roadway of vehicle 100 but do no cooperatively or actively engage with vehicle 100. Stated another way, roadway passive vehicles 910 are simply other vehicles operating on the roadway with the vehicle 100 and must be, among other things, avoided (e.g., to include when vehicle 100 is operating in an autonomous or semi-autonomous manner). In contrast, roadway active vehicles 920 comprise vehicles that are operating on the roadway of vehicle 100 and have the capability to, or actually are, actively engaging with vehicle 100. For example, the emergency charging vehicle system 270 is a roadway active vehicle 920 in that it may cooperate or engage with vehicle 100 to provide charging. In some embodiments, vehicle 100 may exchange data with a roadway active vehicle 920 such as, for example, data regarding charging types available to the roadway active vehicle 920.

Figure 10:
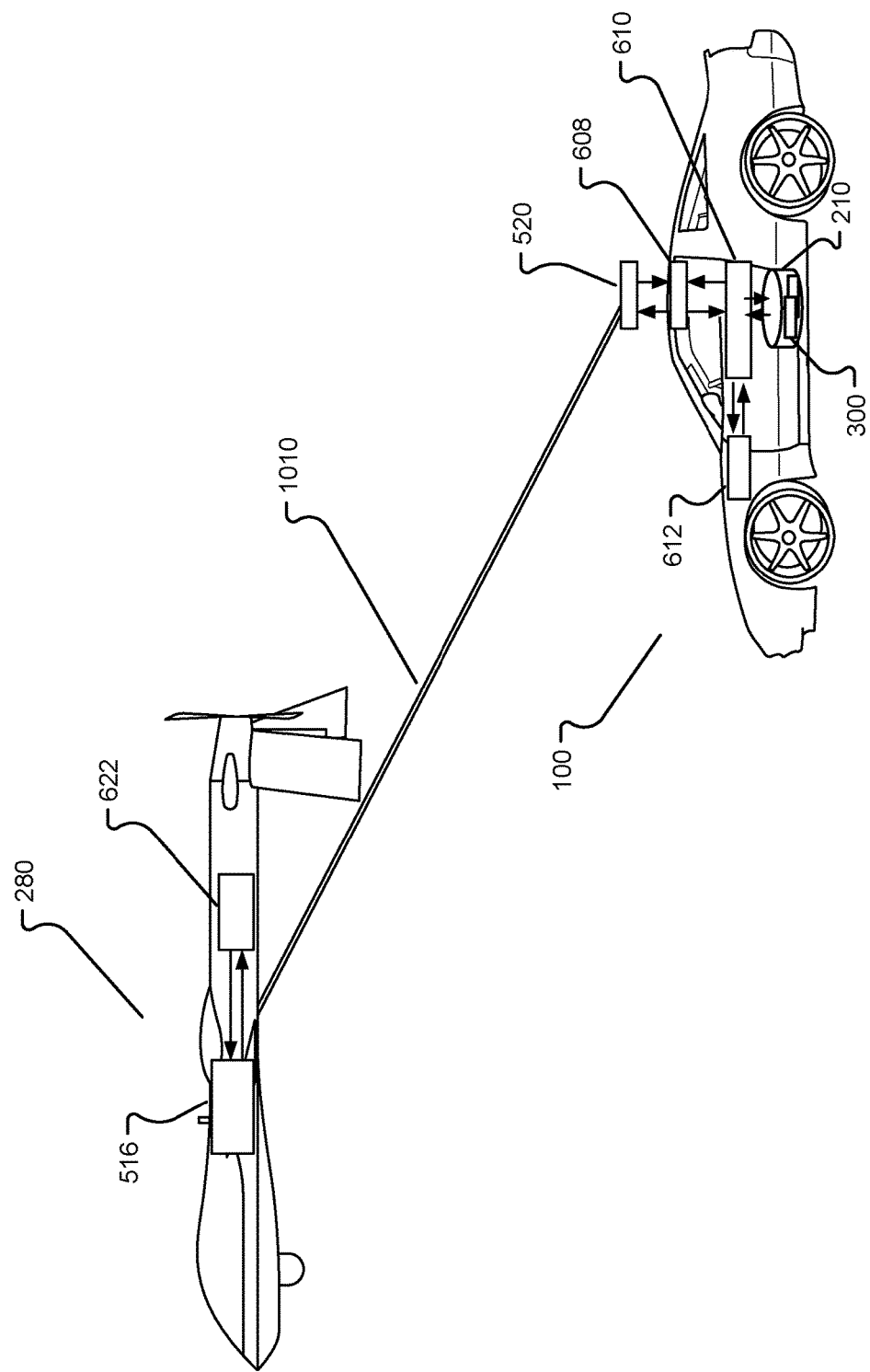
FIG. 10 shows a vehicle in an aerial vehicle charging environment in accordance with another embodiment of the present disclosure.

FIG. 10 shows a vehicle in an aerial vehicle charging environment in accordance with another embodiment of the present disclosure. Generally, this embodiment involves an aerial vehicle ("AV"), such as an Unmanned Aerial Vehicle (UAV), flying over or near a vehicle to provide a charge. The UAV may also land on the car to provide an emergency (or routine) charge. Such a charging scheme may be particularly suited for operations in remote areas, in high traffic situations, and/or when the car is moving. The AV may be a specially-designed UAV, aka RPV or drone, with a charging panel that can extend from the AV to provide a charge. The AV may include a battery pack and a charging circuit to deliver a charge to the vehicle. The AV may be a manned aerial vehicle, such as a piloted general aviation aircraft, such as a Cessna 172.

With reference to FIG. 10, an exemplar embodiment of a vehicle charging system 100 comprising a charge provider configured as an aerial vehicle 280, the aerial vehicle 280 comprising a power source 516 and charge provider controller 622. The AV may be semi-autonomous or fully autonomous. The AV may have a remote pilot/operator providing control inputs. The power source 516 is configured to provide a charge to a charging panel 608 of vehicle 100. The power source 516 is in communication with the charge provider controller 622. The aerial vehicle 280 provides a tether 1010 to deploy or extend charging plate 520 near to charging panel 608. The tether 1010 may comprise a chain, rope, rigid or semi-rigid tow bar or any means to position charging plate 520 near charging panel 608. For example, tether 1010 may be similar to a refueling probe used by airborne tanker aircraft when refueling another aircraft.

In one embodiment, the charging plate 520 is not in physical interconnection to AV 280, that is, there is no tether 1010. In this embodiment, the charging plate 520 is positioned and controlled by AV 280 by way of a controller on AV 280 or in communication with AV 280.

In one embodiment, the charging plate 520 position and/or characteristics (e.g. charging power level, flying separation distance, physical engagement on/off) are controlled by vehicle 100 and/or a user in or driver of vehicle 100.

Charge or power output of power source 516 is provided or transmitted to charger plate 620 by way of a charging cable or wire, which may be integral to tether 1010. In one embodiment, the charging cable is non-structural, that is, it provides zero or little structural support to the connection between AV 280 and charger plate 520.

Charging panel 608 of vehicle 100 receives power from charger plate 520. Charging panel 608 and charger plate 520 may be in direct physical contact (termed a "contact" charger configuration) or not in direct physical contact (termed a "flyer" charger configuration), but must be at or below a threshold (separation) distance to enable charging, such as by induction. Energy transfer or charging from the charger plate 520 to the charging panel 608 is inductive charging (i.e. use of an EM field to transfer energy between two objects). The charging panel 608 provides received power to energy storage unit 612 by way of charging panel controller 610. Charging panel controller 610 is in communication with vehicle database 210, vehicle database 210 comprising an AV charging data structure.

Charging panel 508 may be located anywhere on vehicle 100, to include, for example, the roof, side panel, trunk, hood, front or rear bumper and wheel hub of vehicle 100. Charging panel 608 is mounted on the roof of vehicle 100 in the embodiment of FIG. 10. In some embodiments, charging panel 608 may be deployable, i.e. may extend or deploy only when charging is needed. For example, charging panel 608 may typically reside flush with the roof of vehicle 100 and extend when required for charging. Similarly, charger plate 520 may, in one embodiment, not be connected to AV 280 by way of tether 1010 and may instead be mounted directly on the AV 280, to include, for example, the wing, empennage, undercarriage to include landing gear, and may be deployable or extendable when required. Tether 1010 may be configured to maneuver charging plate 520 to any position on vehicle 100 so as to enable charging. In one embodiment, the AV 280 may land on the vehicle 100 so as to enable charging through direct contact (i.e. the aforementioned contact charging configuration) between the charging plate 520 and the charging panel 608 of vehicle 100. Charging may occur while both AV 280 and vehicle 100 are moving, while both vehicle 100 and AV 280 are not moving (i.e., vehicle 100 is parked and AV 280 lands on top of vehicle 100), or while vehicle 100 is parked and AV 280 is hovering or circling above. Control of the charging and/or positioning of the charging plate 520 may be manual, automatic or semi-automatic; said control may be performed through a GUI engaged by driver or occupant of receiving vehicle 100 and/or driver or occupant of charging AV 280.

Figure 11:
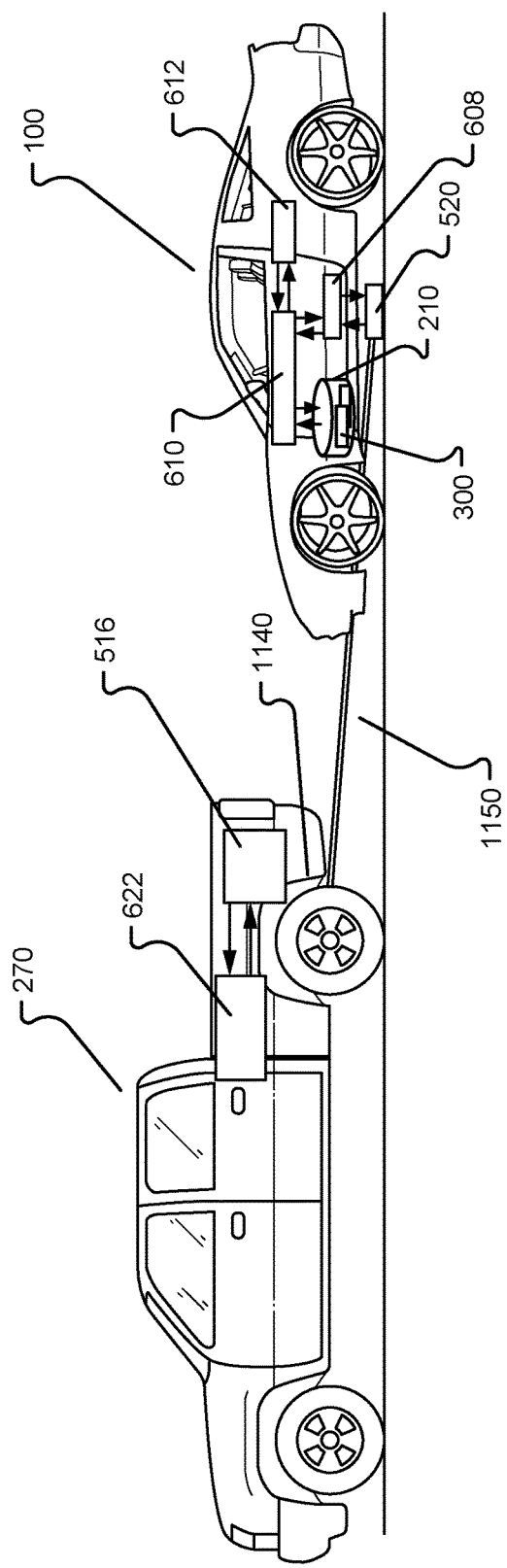
FIG. 11 shows a vehicle in an emergency charging environment in accordance with embodiments of the present disclosure.

FIG. 11 is an embodiment of a vehicle emergency charging system comprising an emergency charging vehicle 270 and charge receiver vehicle 100 is disclosed. The emergency charging vehicle 270 is a road vehicle, such as a pick-up truck, as shown in FIG. 11. The emergency charging vehicle 270 is configured to provide a charge to a charge receiver vehicle 100, such as an automobile. The emergency charging vehicle 270 comprises an energy source i.e. a charging power source 516 and a charge provider controller 622 in communication with the charging power source 516. The emergency charging vehicle 270 provides a towed and/or articulated charger plate 520, as connected to the emergency charging vehicle 270 by connector 1150. The connector 1150 may comprise a chain, rope, rigid or semi-rigid tow bar or any means to position charger plate 520 near the charging panel 608 of vehicle 100. Charge or power output of charging power source 516 is provided or transmitted to charger plate 520 by way of charging cable or wire 1140. In one embodiment, the charging cable 1140 is non-structural, that is, it provides little or no structural support to the connection between emergency charging vehicle 270 and charging panel 608. Charging panel 608 (of vehicle 100) receives power from charger plate 520. Charger plate 520 and charging panel 608 may be in direct physical contact or not in direct physical contact, but must be at or below a threshold separation distance to enable charging, such as by induction. Charger plate 520 may comprise wheels or rollers so as to roll along roadway surface. Charger plate 520 may also not contact the ground surface and instead be suspended above the ground; such a configuration may be termed a "flying" configuration. In the flying configuration, charger plate may form an aerodynamic surface to, for example, facilitate stability and control of the positioning of the charging plate 520. Energy transfer or charging from the charger plate 520 to the charge receiver panel 608 is through inductive charging (i.e. use of an EM field to transfer energy between two objects). The charging panel 608 provides received power to energy storage unit 612 directly or by way of charging panel controller 610. In one embodiment, the receipt and/or control of the energy provided via the charging panel 608 is provided by charging panel controller 610.

Charging panel controller 610 may be located anywhere on charge receiver vehicle 100, to include, for example, the roof, side panel, trunk, hood, front or rear bumper and wheel hub of charge receiver 100 vehicle. In some embodiments, charging panel 608 may be deployable, i.e. may extend or deploy only when charging is needed. For example, charging panel 608 may typically stow flush with the lower plane of vehicle 100 and extend when required for charging. Similarly, charger plate 520 may, in one embodiment, not be connected to the lower rear of the emergency charging vehicle 270 by way of connector 1150 and may instead be mounted on the emergency charging vehicle 270, to include, for example, the roof, side panel, trunk, hood, front or rear bumper and wheel hub of emergency charging vehicle 270. Connector 1150 may be configured to maneuver connector plate 520 to any position on emergency charging vehicle 270 so as to enable charging. Control of the charging and/or positioning of the charging plate may be manual, automatic or semi-automatic; said control may be performed through a GUI engaged by driver or occupant of receiving vehicle and/or driver or occupant of charging vehicle.

Figure 12:
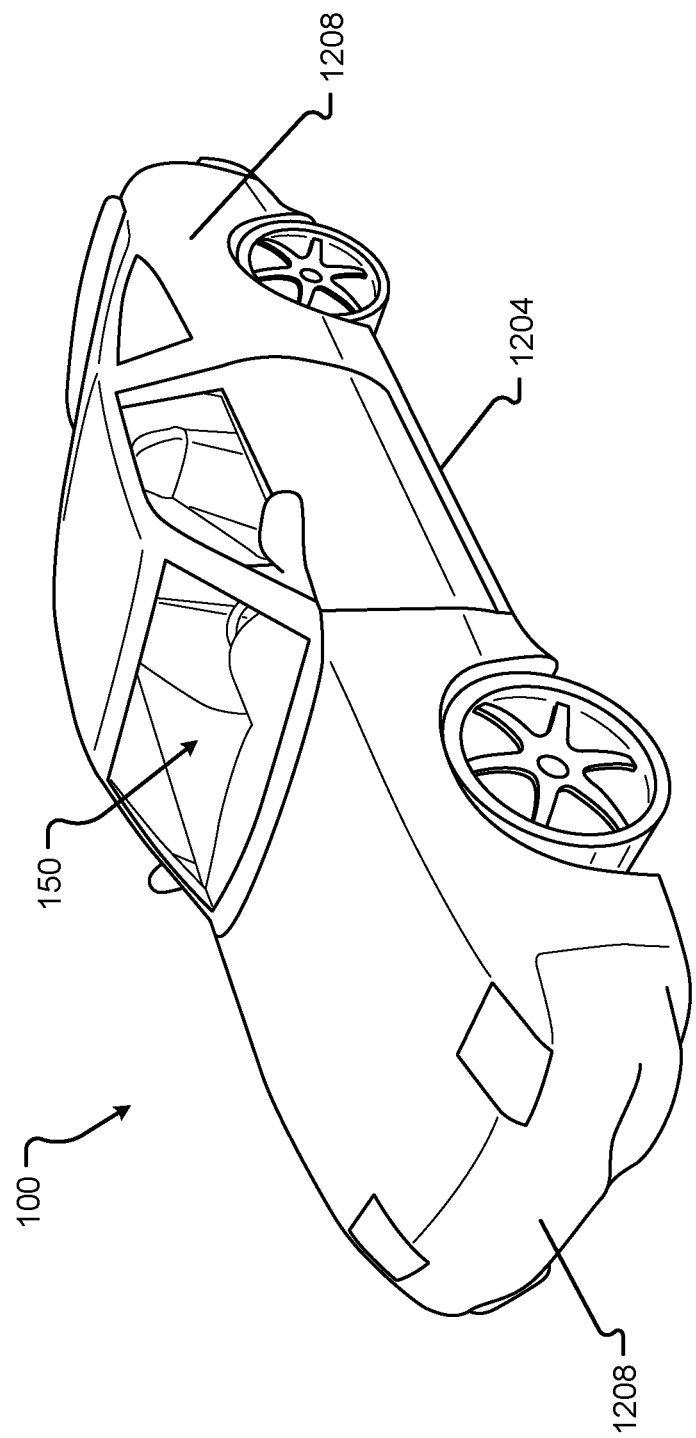
FIG. 12 is a perspective view of a vehicle in accordance with embodiments of the present disclosure.

FIG. 12 shows a perspective view of a vehicle 100 in accordance with embodiments of the present disclosure. Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like. In any event, the vehicle 100 may include a frame 1204 and one or more body panels 1208 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components.

Figure 13:
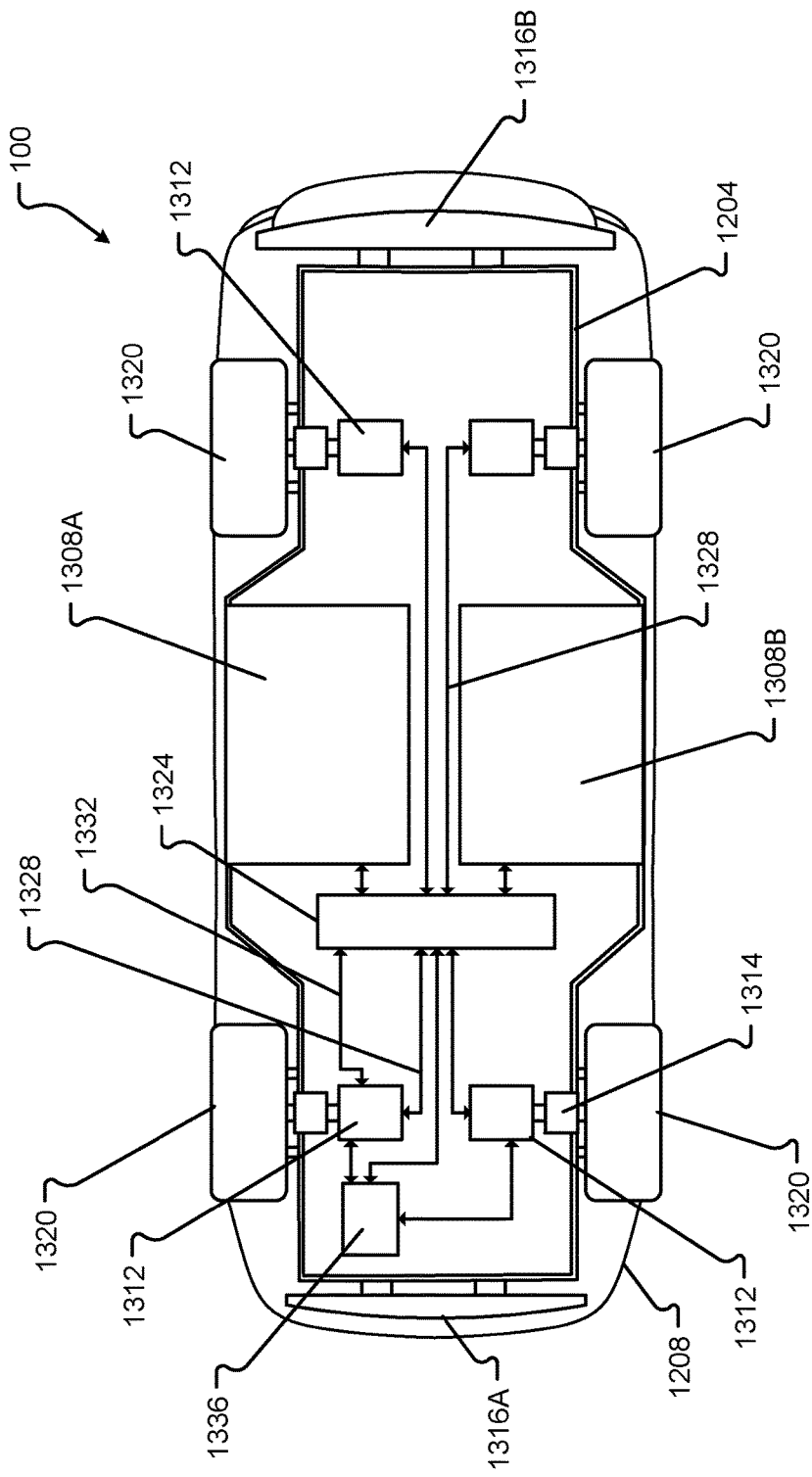
FIG. 13 is a plan view of a vehicle in accordance with at least some embodiments of the present disclosure.

Referring now to FIG. 13, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 1204 of the vehicle 100. The frame 1204 may comprise a separate frame and body construction (i.e., body-on-frame construction), a unitary frame and body construction (i.e., a unibody construction), or any other construction defining the structure of the vehicle 100. The frame 1204 may be made from one or more materials including, but in no way limited to steel, titanium, aluminum, carbon fiber, plastic, polymers, etc., and/or combinations thereof. In some embodiments, the frame 1204 may be formed, welded, fused, fastened, pressed, etc., combinations thereof, or otherwise shaped to define a physical structure and strength of the vehicle 100. In any event, the frame 1204 may comprise one or more surfaces, connections, protrusions, cavities, mounting points, tabs, slots, or other features that are configured to receive other components that make up the vehicle 100. For example, the body panels, powertrain subsystem, controls systems, interior components, communications subsystem, and safety subsystem may interconnect with, or attach to, the frame 1204 of the vehicle 100.

The frame 1204 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 1308A, 1308B, motors 1312, engines, safety equipment, controllers, user interfaces, interiors exterior components, body panels 1208, bumpers 1316, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single minute exchange principle. In some embodiments, the frame 1204 may include slides, receptacles, cavities, protrusions, and/or a number of other features that allow for quick exchange of system components. In one embodiment, the frame 1204 may include tray or ledge features, mechanical interconnection features, locking mechanisms, retaining mechanisms, etc., and/or combinations thereof. In some embodiments, it may be beneficial to quickly remove a used power source 1308A, 1308B (e.g., battery unit, capacitor unit, etc.) from the vehicle 100 and replace the used power source 1308A, 1308B with a charged power source. Continuing this example, the power source 1308A, 1308B may include selectively interchangeable features that interconnect with the frame 1204 or other portion of the vehicle 100. For instance, in a power source 1308A, 1308B replacement, the quick release features may be configured to release the power source 1308A, 1308B from an engaged position and slide or move away from the frame 1204 of a vehicle 100. Once removed, the power source 1308A, 1308B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 1204 with mechanisms and/or machines that are external or separate from the vehicle 100.

In some embodiments, the frame 1204 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 1204 and/or body of the vehicle 100. In some cases, the features may be built into the frame 1204 and/or body of the vehicle 100. In any event, the features may deploy from an unexposed position to an exposed position or may be configured to selectively engage/disengage without requiring an exposure or deployment of the mechanism from the frame 1204 and/or body. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 1312 of the vehicle 100. The electric motors 1312 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 1320 that are driven by the one or more electric motors 1312 and motor controllers 1314. In some cases, the vehicle 100 may include an electric motor 1312 configured to provide a driving force for each drive wheel 1320. In other cases, a single electric motor 1312 may be configured to share an output force between two or more drive wheels 1320 via one or more power transmission components. It is an aspect of the present disclosure that the powertrain include one or more power transmission components, motor controllers 1314, and/or power controllers that can provide a controlled output of power to one or more of the drive wheels 1320 of the vehicle 100. The power transmission components, power controllers, or motor controllers 1314 may be controlled by at least one other vehicle controller described herein.

As provided above, the powertrain of the vehicle 100 may include one or more power sources 1308A, 1308B. These one or more power sources 1308A, 1308B may be configured to provide drive power, system and/or subsystem power, accessory power, etc. While described herein as a single power source 1308 for sake of clarity, embodiments of the present disclosure are not so limited. For example, it should be appreciated that independent, different, or separate power sources 1308A, 1308B may provide power to various systems of the vehicle 100. For instance, a drive power source may be configured to provide the power for the one or more electric motors 1312 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 1308A, 1308B in this manner may provide a number of benefits over conventional vehicle systems. For example, separating the power sources 1308A, 1308B allow one power source 1308 to be removed and/or replaced independently without requiring that power be removed from all systems and/or subsystems of the vehicle 100 during a power source 1308 removal/replacement. For instance, one or more of the accessories, communications, safety equipment, and/or backup power systems, etc., may be maintained even when a particular power source 1308A, 1308B is depleted, removed, or becomes otherwise inoperable.

In some embodiments, the drive power source may be separated into two or more cells, units, sources, and/or systems. By way of example, a vehicle 100 may include a first drive power source 1308A and a second drive power source 1308B. The first drive power source 1308A may be operated independently from or in conjunction with the second drive power source 1308B and vice versa. Continuing this example, the first drive power source 1308A may be removed from a vehicle while a second drive power source 1308B can be maintained in the vehicle 100 to provide drive power. This approach allows the vehicle 100 to significantly reduce weight (e.g., of the first drive power source 1308A, etc.) and improve power consumption, even if only for a temporary period of time. In some cases, a vehicle 100 running low on power may automatically determine that pulling over to a rest area, emergency lane, and removing, or "dropping off," at least one power source 1308A, 1308B may reduce enough weight of the vehicle 100 to allow the vehicle 100 to navigate to the closest power source replacement and/or charging area. In some embodiments, the removed, or "dropped off," power source 1308A may be collected by a collection service, vehicle mechanic, tow truck, or even another vehicle or individual.

The power source 1308 may include a GPS or other geographical location system that may be configured to emit a location signal to one or more receiving entities. For instance, the signal may be broadcast or targeted to a specific receiving party. Additionally or alternatively, the power source 1308 may include a unique identifier that may be used to associate the power source 1308 with a particular vehicle 100 or vehicle user. This unique identifier may allow an efficient recovery of the power source 1308 dropped off. In some embodiments, the unique identifier may provide information for the particular vehicle 100 or vehicle user to be billed or charged with a cost of recovery for the power source 1308.

The power source 1308 may include a charge controller 1324 that may be configured to determine charge levels of the power source 1308, control a rate at which charge is drawn from the power source 1308, control a rate at which charge is added to the power source 1308, and/or monitor a health of the power source 1308 (e.g., one or more cells, portions, etc.). In some embodiments, the charge controller 1324 or the power source 1308 may include a communication interface. The communication interface can allow the charge controller 1324 to report a state of the power source 1308 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers of the vehicle 100 or a communication device that is separate and/or apart from the vehicle 100.

The powertrain includes one or more power distribution systems configured to transmit power from the power source 1308 to one or more electric motors 1312 in the vehicle 100. The power distribution system may include electrical interconnections 1328 in the form of cables, wires, traces, wireless power transmission systems, etc., and/or combinations thereof. It is an aspect of the present disclosure that the vehicle 100 include one or more redundant electrical interconnections 1332 of the power distribution system. The redundant electrical interconnections 1332 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 1332 is being used and/or damage has occurred to a particular area of the vehicle electrical system. In any event, the one or more redundant electrical interconnections 1332 may be configured along completely different routes than the electrical interconnections 1328 and/or include different modes of failure than the electrical interconnections 1328 to, among other things, prevent a total interruption power distribution in the event of a failure.

In some embodiments, the power distribution system may include an energy recovery system 1336. This energy recovery system 1336, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 1336, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 1308. For example, the recovered electrical energy may be used to charge the power source 1308 of the vehicle 100.

The vehicle 100 may include one or more safety systems. Vehicle safety systems can include a variety of mechanical and/or electrical components including, but in no way limited to, low impact or energy-absorbing bumpers 1316A, 1316B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 14:
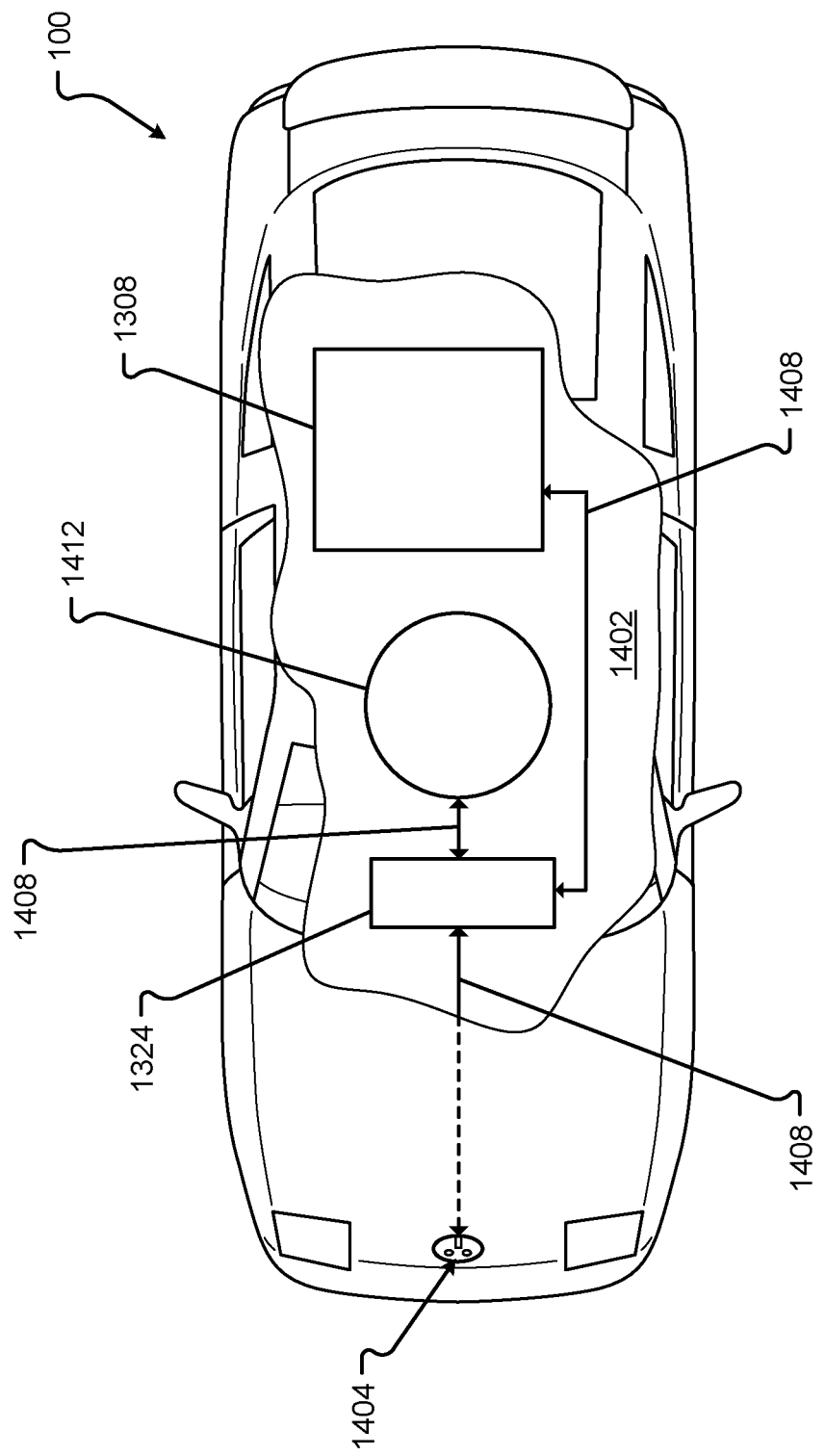
FIG. 14 is a plan view of a vehicle in accordance with embodiments of the present disclosure.

FIG. 14 shows a plan view of the vehicle 100 in accordance with embodiments of the present disclosure. In particular, FIG. 14 shows a broken section 1402 of a charging system for the vehicle 100. The charging system may include a plug or receptacle 1404 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 1404 may be transferred via at least one power transmission interconnection 1408. Similar, if not identical, to the electrical interconnections 1328 described above, the at least one power transmission interconnection 1408 may be one or more cables, wires, traces, wireless power transmission systems, etc., and/or combinations thereof. Electrical energy in the form of charge can be transferred from the external power source to the charge controller 1324. As provided above, the charge controller 1324 may regulate the addition of charge to the power source 1308 of the vehicle 100 (e.g., until the power source 1308 is full or at a capacity, etc.).

In some embodiments, the vehicle 100 may include an inductive charging system and inductive charger 1412. The inductive charger 1412 may be configured to receive electrical energy from an inductive power source external to the vehicle 100. In one embodiment, when the vehicle 100 and/or the inductive charger 1412 is positioned over an inductive power source external to the vehicle 100, electrical energy can be transferred from the inductive power source to the vehicle 100. For example, the inductive charger 1412 may receive the charge and transfer the charge via at least one power transmission interconnection 1408 to the charge controller 1324 and/or the power source 1308 of the vehicle 100. The inductive charger 1412 may be concealed in a portion of the vehicle 100 (e.g., at least partially protected by the frame 1204, one or more body panels 1208, a shroud, a shield, a protective cover, etc., and/or combinations thereof) and/or may be deployed from the vehicle 100. In some embodiments, the inductive charger 1412 may be configured to receive charge only when the inductive charger 1412 is deployed from the vehicle 100. In other embodiments, the inductive charger 1412 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 15:
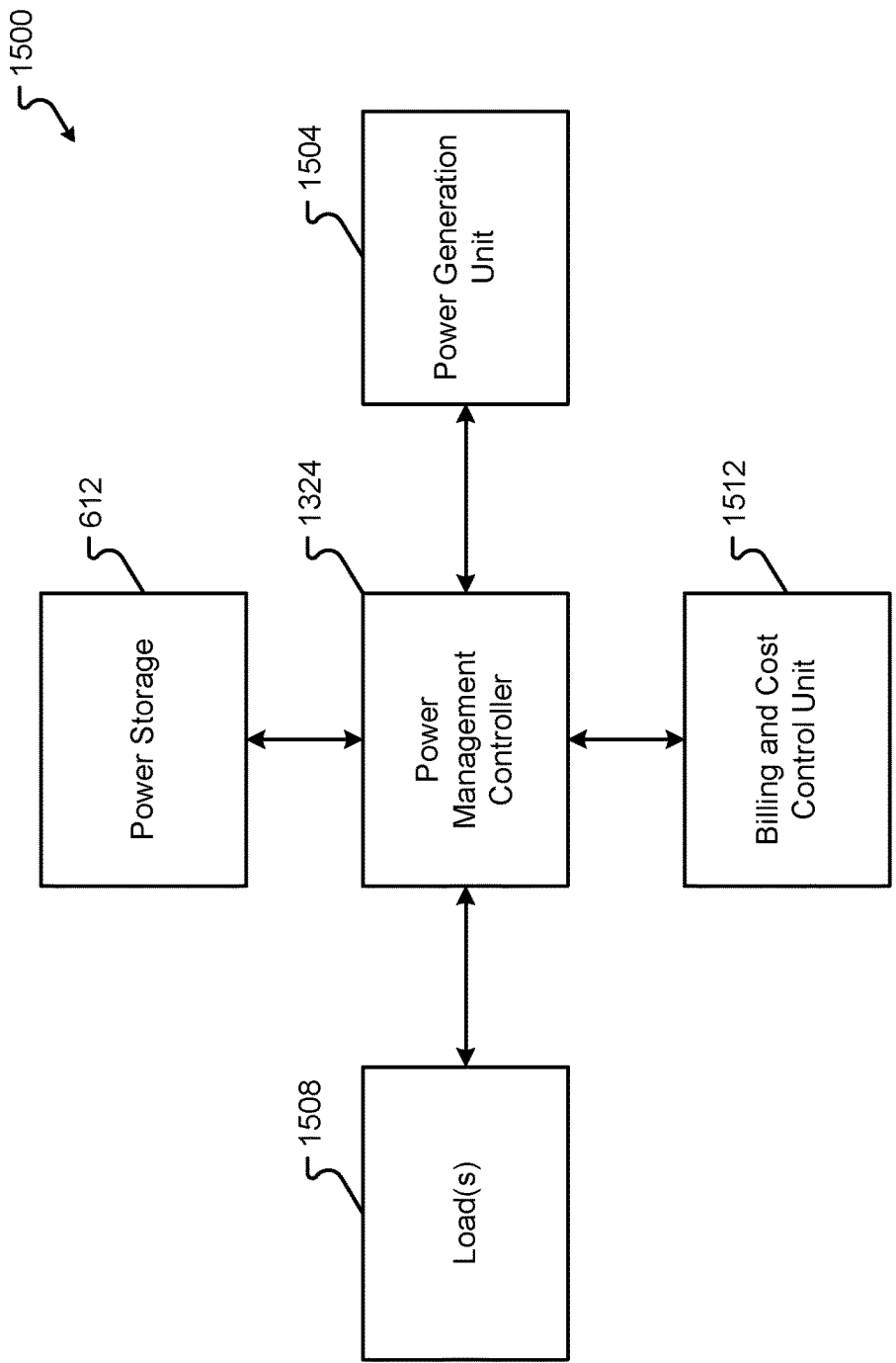
FIG. 15 is a block diagram of an embodiment of an electrical system of the vehicle.

An embodiment of the electrical system 1500 associated with the vehicle 100 may be as shown in FIG. 15. The electrical system 1500 can include power source(s) that generate power, power storage that stores power, and/or load(s) that consume power. Power sources may be associated with a power generation unit 1504. Power storage may be associated with a power storage system 612. Loads may be associated with loads 1508. The electrical system 1500 may be managed by a power management controller 1324. Further, the electrical system 1500 can include one or more other interfaces or controllers, which can include the billing and cost control unit 1512.

Figure 16:
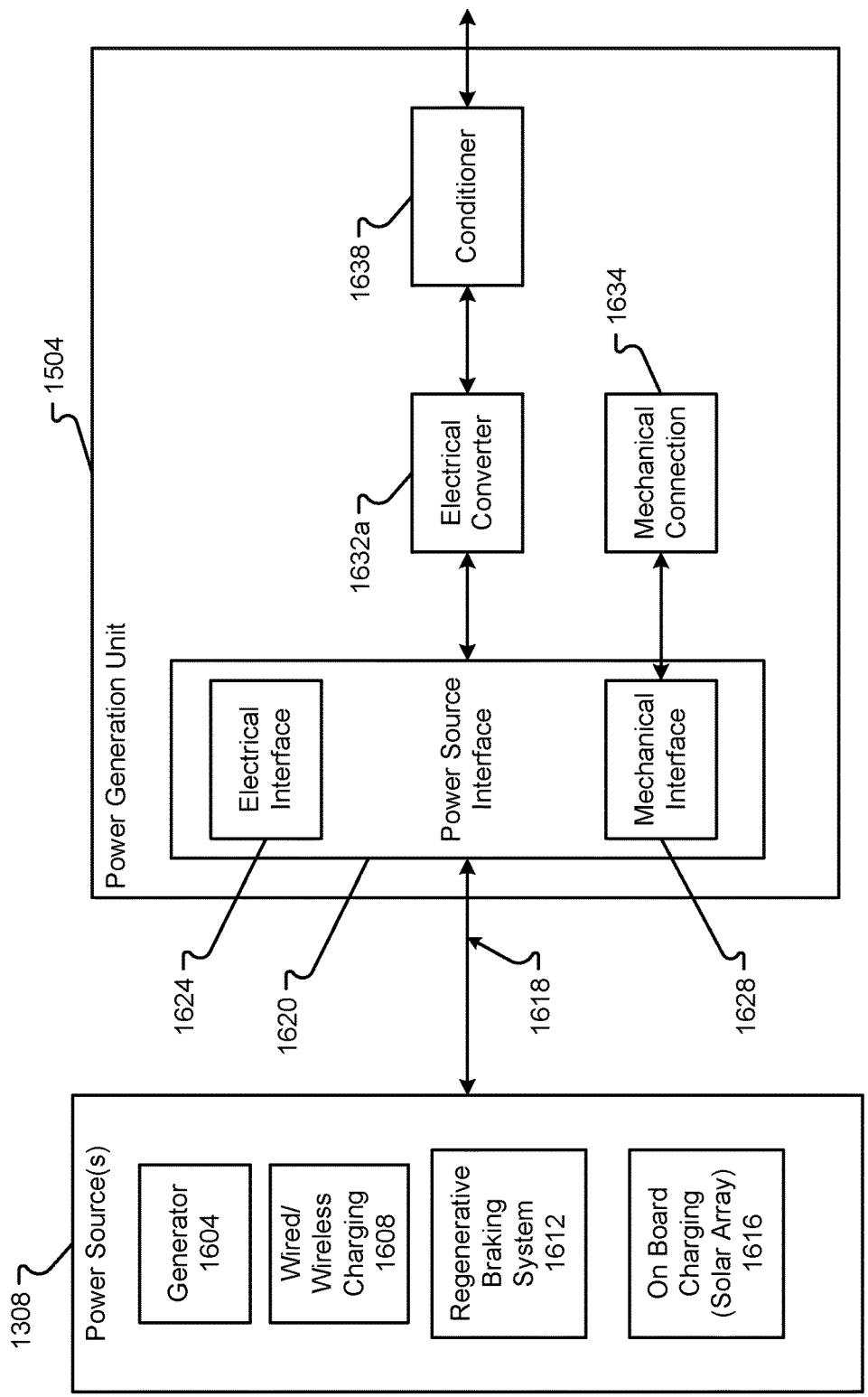
FIG. 16 is a block diagram of an embodiment of a power generation unit associated with the electrical system of the vehicle.

The power generation unit 1504 may be as described in conjunction with FIG. 16. The power storage component 612 may be as described in conjunction with FIG. 17. The loads 1508 may be as described in conjunction with FIG. 18.

The billing and cost control unit 1512 may interface with the power management controller 1324 to determine the amount of charge or power provided to the power storage 612 through the power generation unit 1504. The billing and cost control unit 1512 can then provide information for billing the vehicle owner. Thus, the billing and cost control unit 1512 can receive and/or send power information to third party system(s) regarding the received charge from an external source. The information provided can help determine an amount of money required, from the owner of the vehicle, as payment for the provided power. Alternatively, or in addition, if the owner of the vehicle provided power to another vehicle (or another device/system), that owner may be owed compensation for the provided power or energy, e.g., a credit.

The power management controller 1324 can be a computer or computing system(s) and/or electrical system with associated components, as described herein, capable of managing the power generation unit 1504 to receive power, routing the power to the power storage 612, and then providing the power from either the power generation unit 1504 and/or the power storage 612 to the loads 1508. Thus, the power management controller 1324 may execute programming that controls switches, devices, components, etc. involved in the reception, storage, and provision of the power in the electrical system 1500.

An embodiment of the power generation unit 1504 may be as shown in FIG. 16. Generally, the power generation unit 1504 may be electrically coupled to one or more power sources 1308. The power sources 1308 can include power sources internal and/or associated with the vehicle 100 and/or power sources external to the vehicle 100 to which the vehicle 100 electrically connects. One of the internal power sources can include an on board generator 1604. The generator 1604 may be an alternating current (AC) generator, a direct current (DC) generator or a self-excited generator. The AC generators can include induction generators, linear electric generators, and/or other types of generators. The DC generators can include homopolar generators and/or other types of generators. The generator 1604 can be brushless or include brush contacts and generate the electric field with permanent magnets or through induction. The generator 1604 may be mechanically coupled to a source of kinetic energy, such as an axle or some other power take-off. The generator 1604 may also have another mechanical coupling to an exterior source of kinetic energy, for example, a wind turbine.

Another power source 1308 may include wired or wireless charging 1608. The wireless charging system 1608 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system can include an connectors, wired interconnections, the controllers, etc. The wired and wireless charging systems 1608 can provide power to the power generation unit 1504 from external power sources 1308.

Internal sources for power may include a regenerative braking system 1612. The regenerative braking system 1612 can convert the kinetic energy of the moving car into electrical energy through a generation system mounted within the wheels, axle, and/or braking system of the vehicle 100. The regenerative braking system 1612 can include any coils, magnets, electrical interconnections, converters, controllers, etc. required to convert the kinetic energy into electrical energy.

Another source of power 1308, internal to or associated with the vehicle 100, may be a solar array 1616. The solar array 1616 may include any system or device of one or more solar cells mounted on the exterior of the vehicle 100 or integrated within the body panels of the vehicle 100 that provides or converts solar energy into electrical energy to provide to the power generation unit 1504.

The power sources 1308 may be connected to the power generation unit 1504 through an electrical interconnection 1618. The electrical interconnection 1618 can include any wire, interface, bus, etc. between the one or more power sources 1308 and the power generation unit 1504.

The power generation unit 1504 can also include a power source interface 1620. The power source interface 1620 can be any type of physical and/or electrical interface used to receive the electrical energy from the one or more power sources 1308; thus, the power source interface 1620 can include an electrical interface 1624 that receives the electrical energy and a mechanical interface 1628 which may include wires, connectors, or other types of devices or physical connections. The mechanical interface 1608 can also include a physical/electrical connection 1634 to the power generation unit 1504.

The electrical energy from the power source 1308 can be processed through the power source interface 1624 to an electric converter 1632. The electric converter 1632 may convert the characteristics of the power from one of the power sources into a useable form that may be used either by the power storage 612 or one or more loads 1508 within the vehicle 100. The electrical converter 1624 may include any electronics or electrical devices and/or component that can change electrical characteristics, e.g., AC frequency, amplitude, phase, etc. associated with the electrical energy provided by the power source 1308. The converted electrical energy may then be provided to an optional conditioner 1638. The conditioner 1638 may include any electronics or electrical devices and/or component that may further condition the converted electrical energy by removing harmonics, noise, etc. from the electrical energy to provide a more stable and effective form of power to the vehicle 100.

Figure 17:
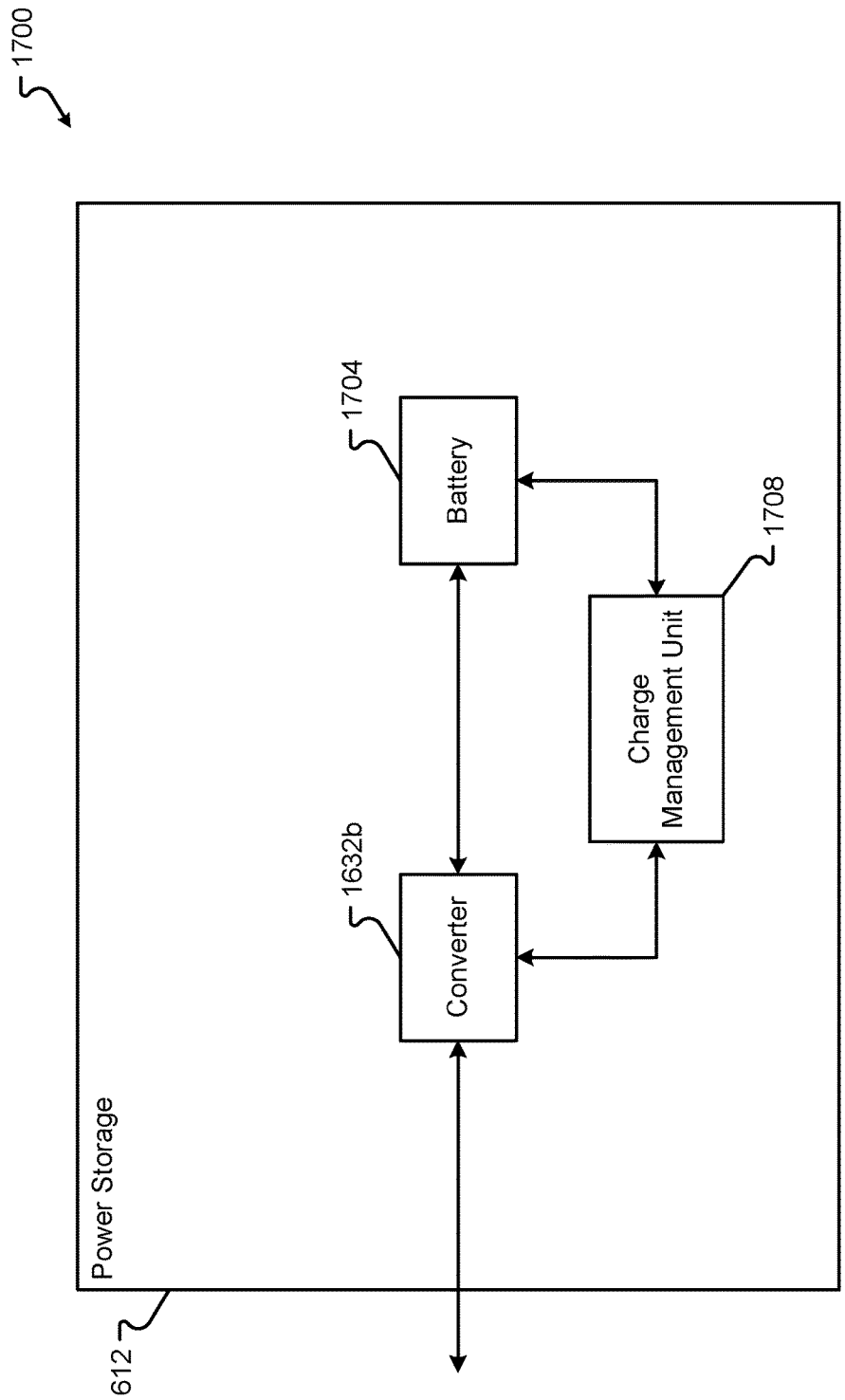
FIG. 17 is a block diagram of an embodiment of power storage associated with the electrical system of the vehicle.

An embodiment of the power storage 1612 may be as shown in FIG. 17. The power storage unit can include an electrical converter 1632*b*, one or more batteries, one or more rechargeable batteries, one or more capacitors, one or more accumulators, one or more supercapacitors, one or more ultrabatteries, and/or superconducting magnetics 1704, and/or a charge management unit 1708. The converter 1632*b* may be the same or similar to the electrical converter 1632*a* shown in FIG. 16. The converter 1632*b* may be a replacement for the electric converter 1632*a* shown in FIG. 16 and thus eliminate the need for the electrical converter 1632*a* as shown in FIG. 16. However, if the electrical converter 1632*a* is provided in the power generation unit 1504, the converter 1632*b*, as shown in the power storage unit 612, may be eliminated. The converter 1632*b* can also be redundant or different from the electrical converter 1632*a* shown in FIG. 16 and may provide a different form of energy to the battery and/or capacitors 1704. Thus, the converter 1632*b* can change the energy characteristics specifically for the battery/capacitor 1704.

The battery 1704 can be any type of battery for storing electrical energy, for example, a lithium ion battery, a lead acid battery, a nickel cadmium battery, etc. Further, the battery 1704 may include different types of power storage systems, such as, ionic fluids or other types of fuel cell systems. The energy storage 1704 may also include one or more high-capacity capacitors 1704. The capacitors 1704 may be used for long-term or short-term storage of electrical energy. The input into the battery or capacitor 1704 may be different from the output, and thus, the capacitor 1704 may be charged quickly but drain slowly. The functioning of the converter 1632 and battery capacitor 1704 may be monitored or managed by a charge management unit 1708.

The charge management unit 1708 can include any hardware (e.g., any electronics or electrical devices and/or components), software, or firmware operable to adjust the operations of the converter 1632 or batteries/capacitors 1704. The charge management unit 1708 can receive inputs or periodically monitor the converter 1632 and/or battery/capacitor 1704 from this information; the charge management unit 1708 may then adjust settings or inputs into the converter 1632 or battery/capacitor 1704 to control the operation of the power storage system 612.

Figure 18:
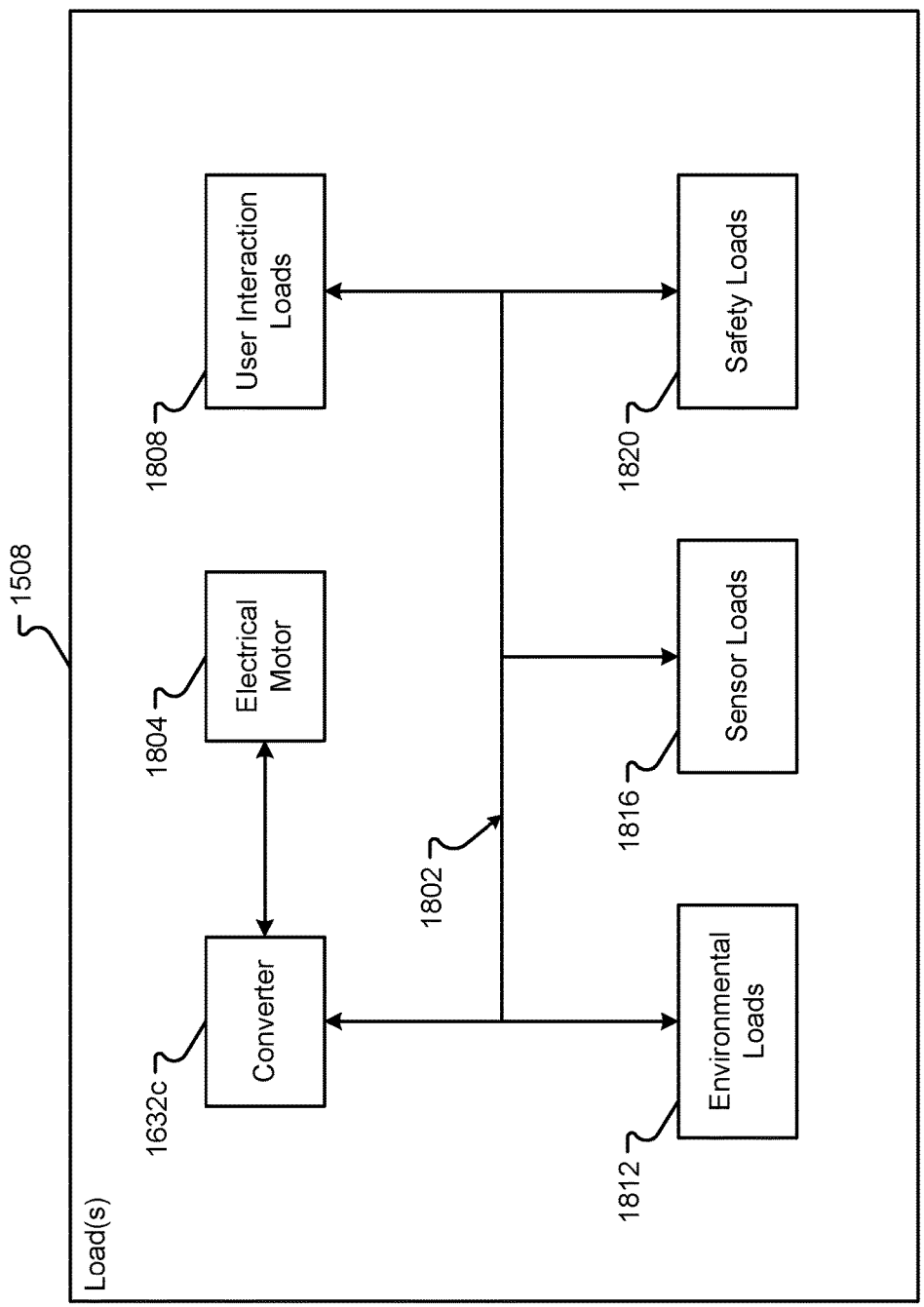
FIG. 18 is a block diagram of an embodiment of loads associated with the electrical system of the vehicle.

An embodiment of one or more loads 1508 associated with the vehicle 100 may be as shown in FIG. 18. The loads 1508 may include a bus or electrical interconnection system 1802, which provides electrical energy to one or more different loads within the vehicle 100. The bus 1802 can be any number of wires or interfaces used to connect the power generation unit 1504 and/or power storage 1612 to the one or more loads 1508. The converter 1632*c* may be an interface from the power generation unit 1504 or the power storage 612 into the loads 1508. The converter 1632*c* may be the same or similar to electric converter 1632*a* as shown in FIG. 16. Similar to the discussion of the converter 1632*b* in FIG. 17, the converter 1632*c* may be eliminated, if the electric converter 1632*a*, shown in FIG. 16, is present. However, the converter 1632*c* may further condition or change the energy characteristics for the bus 1802 for use by the loads 1508. The converter 1632*c* may also provide electrical energy to electric motor 1804, which may power the vehicle 100.

The electric motor 1804 can be any type of DC or AC electric motor. The electric motor may be a direct drive or induction motor using permanent magnets and/or winding either on the stator or rotor. The electric motor 1804 may also be wireless or include brush contacts. The electric motor 1804 may be capable of providing a torque and enough kinetic energy to move the vehicle 100 in traffic.

The different loads 1508 may also include environmental loads 1812, sensor loads 1816, safety loads 1820, user interaction loads 1808, etc. User interaction loads 1808 can be any energy used by user interfaces or systems that interact with the driver and/or passenger(s). These loads 1808 may include, for example, the heads up display, the dash display, the radio, user interfaces on the head unit, lights, radio, and/or other types of loads that provide or receive information from the occupants of the vehicle 100. The environmental loads 1812 can be any loads used to control the environment within the vehicle 100. For example, the air conditioning or heating unit of the vehicle 100 can be environmental loads 1812. Other environmental loads can include lights, fans, and/or defrosting units, etc. that may control the environment within the vehicle 100. The sensor loads 1816 can be any loads used by sensors, for example, air bag sensors, GPS, and other such sensors used to either manage or control the vehicle 100 and/or provide information or feedback to the vehicle occupants. The safety loads 1820 can include any safety equipment, for example, seat belt alarms, airbags, headlights, blinkers, etc. that may be used to manage the safety of the occupants. There may be more or fewer loads than those described herein, although they may not be shown in FIG. 18.

Figure 19A:
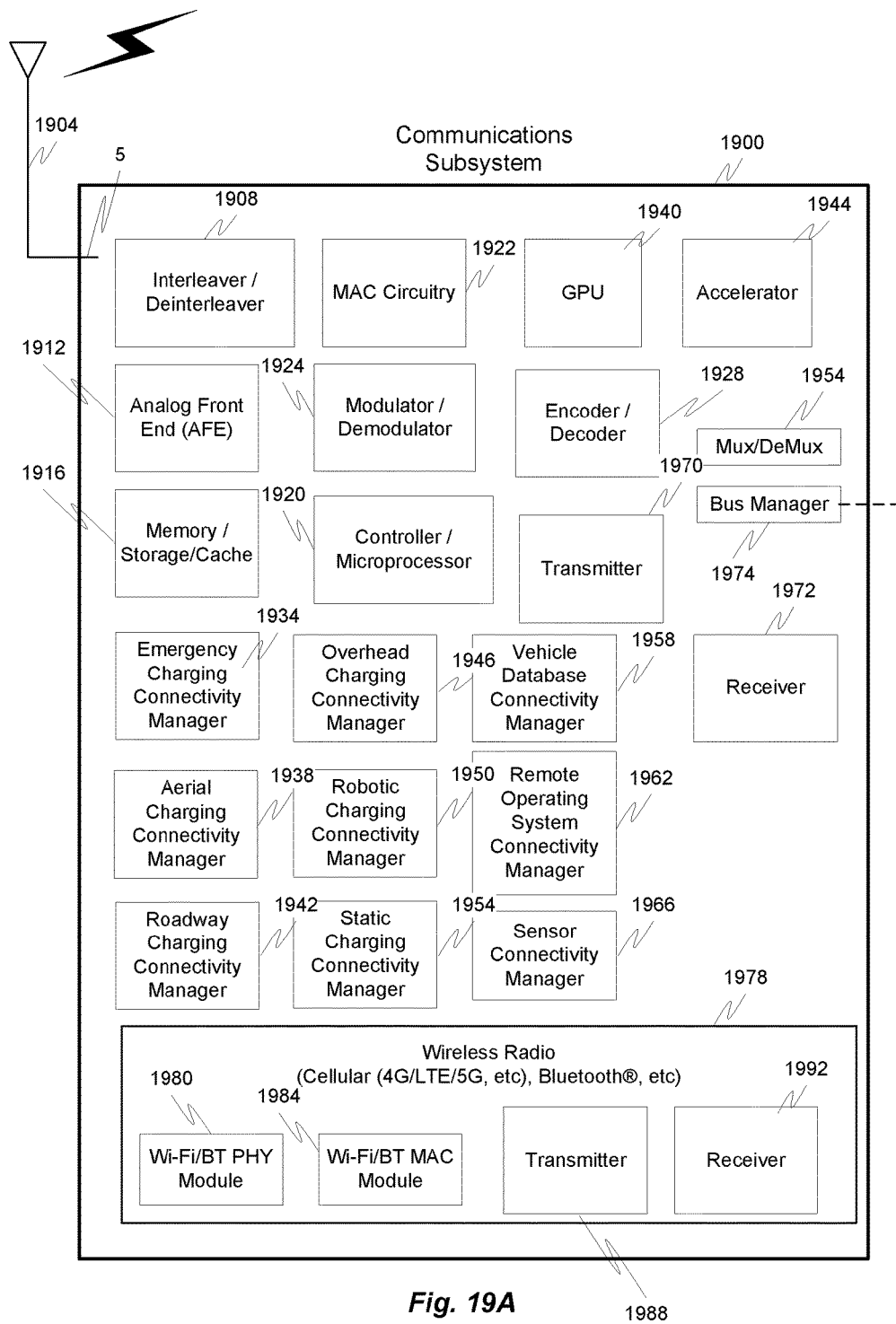
FIG. 19A is a block diagram of an exemplary embodiment of a communications subsystem of the vehicle.

FIG. 19 illustrates an exemplary hardware diagram of communications componentry that can be optionally associated with the vehicle.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud.

The communications subsystem can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem can include one or more communications links (that can be wired or wireless) and/or communications busses (managed by the bus manager 1974), including one or more of CANbus, OBD-II, ARCINC 429, Byteflight, CAN (Controller Area Network), D2B (Domestic Digital Bus), FlexRay, DC-BUS, IDB-1394, IEBus, I²C, ISO 9141-1/-2, J1708, J1587, J1850, J1939, ISO 11783, Keyword Protocol 2000, LIN (Local Interconnect Network), MOST (Media Oriended Systems Transport), Multifunction Vehicle Bus, SMARTwireX, SPI, VAN (Vehicle Area Network), and the like or in general any communications protocol and/or standard.

The various protocols and communications can be communicated one or more of wirelessly and/or over transmission media such as single wire, twisted pair, fibre optic, IEEE 1394, MIL-STD-1553, MIL-STD-1773, power-line communication, or the like. (All of the above standards and protocols are incorporated herein by reference in their entirety)

As discussed, the communications subsystem enables communications between any if the inter-vehicle systems and subsystems as well as communications with non-collocated resources, such as those reachable over a network such as the Internet.

The communications subsystem, in addition to well-known componentry (which has been omitted for clarity), the device communications subsystem 1900 includes interconnected elements including one or more of: one or more antennas 1904, an interleaver/deinterleaver 1908, an analog front end (AFE) 1912, memory/storage/cache 1916, controller/microprocessor 1920, MAC circuitry 1922, modulator/demodulator 1924, encoder/decoder 1928, a plurality of connectivity managers 1934-1966, GPU 1940, accelerator 1944, a multiplexer/demultiplexer 1954, transmitter 1970, receiver 1972 and wireless radio 1978 components such as a Wi-Fi PHY/Bluetooth® module 1980, a Wi-Fi/BT MAC module 1984, transmitter 1988 and receiver 1992. The various elements in the device 1900 are connected by one or more links/busses 5 (not shown, again for sake of clarity).

The device 400 can have one more antennas 1904, for use in wireless communications such as multi-input multi-output (MIMO) communications, multi-user multi-input multi-output (MU-MIMO) communications Bluetooth®, LTE, 4G, 5G, Near-Field Communication (NFC), etc. The antenna(s) 1904 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle and/or in another vehicle.

Antenna(s) 1904 generally interact with the Analog Front End (AFE) 1912, which is needed to enable the correct processing of the received modulated signal and signal conditioning for a transmitted signal. The AFE 1912 can be functionally located between the antenna and a digital baseband system in order to convert the analog signal into a digital signal for processing and vice-versa.

The subsystem 1900 can also include a controller/microprocessor 1920 and a memory/storage/cache 1916. The subsystem 1900 can interact with the memory/storage/cache 1916 which may store information and operations necessary for configuring and transmitting or receiving the information described herein. The memory/storage/cache 1916 may also be used in connection with the execution of application programming or instructions by the controller/microprocessor 1920, and for temporary or long term storage of program instructions and/or data. As examples, the memory/storage/cache 1920 may comprise a computer-readable device, RAM, ROM, DRAM, SDRAM, and/or other storage device (s) and media.

The controller/microprocessor 1920 may comprise a general purpose programmable processor or controller for executing application programming or instructions related to the subsystem 1900. Furthermore, the controller/microprocessor 1920 can perform operations for configuring and transmitting/receiving information as described herein. The controller/microprocessor 1920 may include multiple processor cores, and/or implement multiple virtual processors. Optionally, the controller/microprocessor 1920 may include multiple physical processors. By way of example, the controller/microprocessor 1920 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 1900 can further include a transmitter 1970 and receiver 1972 which can transmit and receive signals, respectively, to and from other devices, subsystems and/or other destinations using the one or more antennas 1904 and/or links/busses. Included in the subsystem 1900 circuitry is the medium access control or MAC Circuitry 1922. MAC circuitry 1922 provides for controlling access to the wireless medium. In an exemplary embodiment, the MAC circuitry 1922 may be arranged to contend for the wireless medium and configure frames or packets for communicating over the wireless medium.

The subsystem 1900 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

The exemplary subsystem 1900 also includes a GPU 1940, an accelerator 1944, a Wi-Fi/BT/BLE PHY module 1980 and a Wi-Fi/BT/BLE MAC module 1984 and wireless transmitter 1988 and receiver 1992. In some embodiments, the GPU 1940 may be a graphics processing unit, or visual processing unit, comprising at least one circuit and/or chip that manipulates and changes memory to accelerate the creation of images in a frame buffer for output to at least one display device. The GPU 1940 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 1934-1966 (even) manage and/or coordinate communications between the subsystem 1900 and one or more of the systems disclosed herein and one or more other devices/systems. The connectivity managers include an emergency charging connectivity manager 1934, an aerial charging connectivity manager 1938, a roadway charging connectivity manager 1942, an overhead charging connectivity manager 1946, a robotic charging connectivity manager 1950, a static charging connectivity manager 1954, a vehicle database connectivity manager 1958, a remote operating system connectivity manager 1962 and a sensor connectivity manager 1966.

The emergency charging connectivity manager 1934 can coordinate not only the physical connectivity between the vehicle and the emergency charging device/vehicle, but can also communicate with one or more of the power management controller, one or more third parties and optionally a billing system(s). As an example, the vehicle can establish communications with the emergency charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the emergency charging connectivity manager 1934 can also communicate information, such as billing information to the emergency charging vehicle and/or a third party. This billing information could be, for example, the owner of the vehicle, the driver of the vehicle, company information, or in general any information usable to charge the appropriate entity for the power received.

The aerial charging connectivity manager 1938 can coordinate not only the physical connectivity between the vehicle and the aerial charging device/vehicle, but can also communicate with one or more of the power management controller, one or more third parties and optionally a billing system(s). As an example, the vehicle can establish communications with the aerial charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the aerial charging connectivity manager 1938 can similarly communicate information, such as billing information to the aerial charging vehicle and/or a third party. This billing information could be, for example, the owner of the vehicle, the driver of the vehicle, company information, or in general any information usable to charge the appropriate entity for the power received etc., as discussed.

The roadway charging connectivity manager 1942 and overhead charging connectivity manager 1946 can coordinate not only the physical connectivity between the vehicle and the charging device/system, but can also communicate with one or more of the power management controller, one or more third parties and optionally a billing system(s). As one example, the vehicle can request a charge from the charging system when, for example, the vehicle needs or is predicted to need power. As an example, the vehicle can establish communications with the charging device/vehicle to one or more of coordinate interconnectivity between the two for charging and share information for billing. Once charging is complete, the amount of charge provided can be tracked and optionally forwarded to, for example, a third party for billing. This billing information could be, for example, the owner of the vehicle, the driver of the vehicle, company information, or in general any information usable to charge the appropriate entity for the power received etc., as discussed. The person responsible for paying for the charge could also receive a copy of the billing information as is customary. The robotic charging connectivity manager 1950 and static charging connectivity manager 1954 can operate in a similar manner to that described herein.

The vehicle database connectivity manager 1958 allows the subsystem to receive and/or share information stored in the vehicle database. This information can be shared with other vehicle components/subsystems and/or other entities, such as third parties and/or charging systems. The information can also be shared with one or more vehicle occupant devices, such as an app on a mobile device the driver uses to track information about the vehicle and/or a dealer or service/maintenance provider. In general any information stored in the vehicle database can optionally be shared with any one or more other devices optionally subject to any privacy or confidentiality restrictions.

The remote operating system connectivity manager 1962 facilitates communications between the vehicle and any one or more autonomous vehicle systems. These communications can include one or more of navigation information, vehicle information, occupant information, or in general any information related to the remote operation of the vehicle.

The sensor connectivity manager 1966 facilitates communications between any one or more of the vehicle sensors and any one or more of the other vehicle systems. The sensor connectivity manager 1966 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 19B:
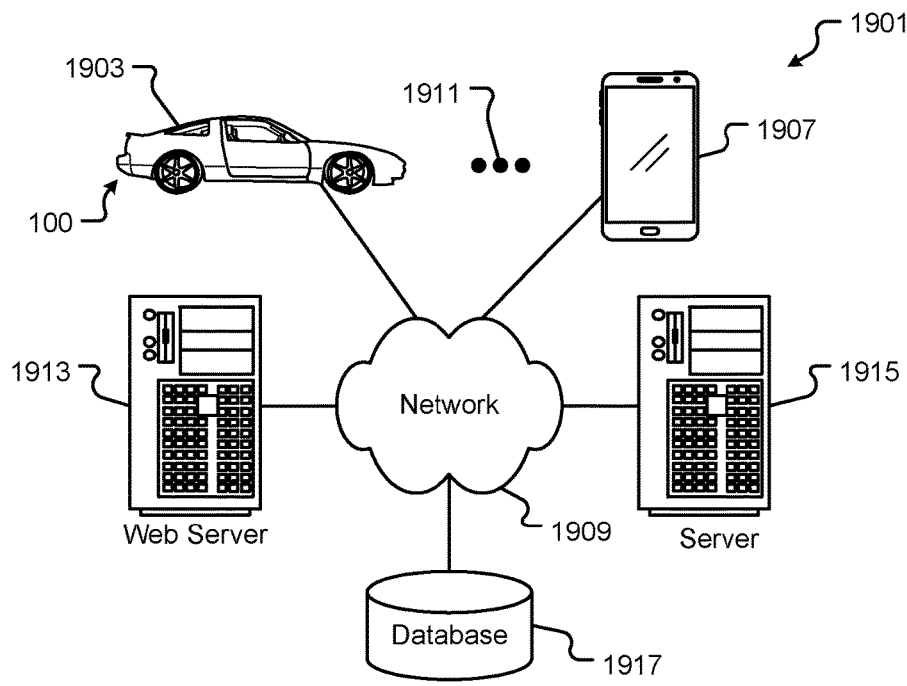
FIG. 19B is a block diagram of a computing environment associated with the embodiments presented herein.

FIG. 19B illustrates a block diagram of a computing environment 1901 that may function as the servers, user computers, or other systems provided and described above. The environment 1901 includes one or more user computers, or computing devices, such as a vehicle computing device 1903, a communication device 1907, and/or more 1911. The computing devices 1903, 1907, 1911 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 1903, 1907, 1911 may also have any of a variety of applications, including for example, database client and/or server applications, and web browser applications. Alternatively, the computing devices 1903, 1907, 1911 may be any other electronic device, such as a thin-client computer, Internet-enabled mobile telephone, and/or personal digital assistant, capable of communicating via a network 1909 and/or displaying and navigating web pages or other types of electronic documents. Although the exemplary computer environment 1901 is shown with two computing devices, any number of user computers or computing devices may be supported.

Environment 1901 further includes a network 1909. The network 1909 may can be any type of network familiar to those skilled in the art that can support data communications using any of a variety of commercially-available protocols, including without limitation SIP, TCP/IP, SNA, IPX, Apple-Talk, and the like. Merely by way of example, the network 1909 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 1913, 1915. In this example, server 1913 is shown as a web server and server 1915 is shown as an application server. The web server 1913, which may be used to process requests for web pages or other electronic documents from computing devices 1903, 1907, 1911. The web server 1913 can be running an operating system including any of those discussed above, as well as any commercially-available server operating systems. The web server 1913 can also run a variety of server applications, including SIP servers, HTTP servers, FTP servers, CGI servers, database servers, Java servers, and the like. In some instances, the web server 1913 may publish operations available operations as one or more web services.

The environment 1901 may also include one or more file and or/application servers 1915, which can, in addition to an operating system, include one or more applications accessible by a client running on one or more of the computing devices 1903, 1907, 1911. The server(s) 1915 and/or 1913 may be one or more general purpose computers capable of executing programs or scripts in response to the computing devices 1903, 1907, 1911. As one example, the server 1915, 1913 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 1915 may also include database servers, including without limitation those commercially available from Oracle, Microsoft, Sybase™, IBM™ and the like, which can process requests from database clients running on a computing device 1903, 1907, 1911.

The web pages created by the server 1913 and/or 1915 may be forwarded to a computing device 1903, 1907, 1911 via a web (file) server 1913, 1915. Similarly, the web server 1913 may be able to receive web page requests, web services invocations, and/or input data from a computing device 1903, 1907, 1911 (e.g., a user computer, etc.) and can forward the web page requests and/or input data to the web (application) server 1915. In further embodiments, the server 1915 may function as a file server. Although for ease of description, FIG. 19B illustrates a separate web server 1913 and file/application server 1915, those skilled in the art will recognize that the functions described with respect to servers 1913, 1915 may be performed by a single server and/or a plurality of specialized servers, depending on implementation-specific needs and parameters. The computer systems 1903, 1907, 1911, web (file) server 1913 and/or web (application) server 1915 may function as the system, devices, or components described in FIGS. 1-19A.

The environment 1901 may also include a database 1917. The database 1917 may reside in a variety of locations. By way of example, database 1917 may reside on a storage medium local to (and/or resident in) one or more of the computers 1903, 1907, 1911, 1913, 1915. Alternatively, it may be remote from any or all of the computers 1903, 1907, 1911, 1913, 1915, and in communication (e.g., via the network 1909) with one or more of these. The database 1917 may reside in a storage-area network ("SAN") familiar to those skilled in the art. Similarly, any necessary files for performing the functions attributed to the computers 1903, 1907, 1911, 1913, 1915 may be stored locally on the respective computer and/or remotely, as appropriate. The database 1917 may be a relational database, such as Oracle 20i®, that is adapted to store, update, and retrieve data in response to SQL-formatted commands.

Figure 19C:
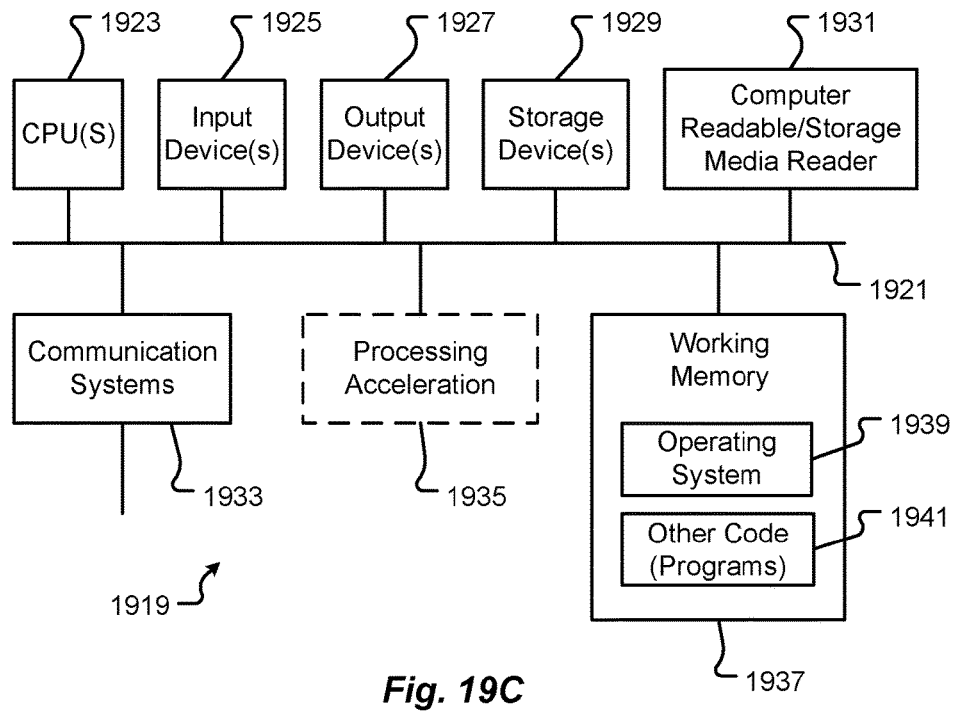
FIG. 19C is a block diagram of a computing device associated with one or more components described herein.

FIG. 19C illustrates one embodiment of a computer system 1919 upon which the servers, user computers, computing devices, or other systems or components described above may be deployed or executed. The computer system 1919 is shown comprising hardware elements that may be electrically coupled via a bus 1921. The hardware elements may include one or more central processing units (CPUs) 1923; one or more input devices 1925 (e.g., a mouse, a keyboard, etc.); and one or more output devices 1927 (e.g., a display device, a printer, etc.). The computer system 1919 may also include one or more storage devices 1929. By way of example, storage device(s) 1929 may be disk drives, optical storage devices, solid-state storage devices such as a random access memory ("RAM") and/or a read-only memory ("ROM"), which can be programmable, flash-updateable and/or the like.

The computer system 1919 may additionally include a computer-readable storage media reader 1931; a communications system 1933 (e.g., a modem, a network card (wireless or wired), an infra-red communication device, etc.); and working memory 1937, which may include RAM and ROM devices as described above. The computer system 1919 may also include a processing acceleration unit 1935, which can include a DSP, a special-purpose processor, and/or the like.

The computer-readable storage media reader 1931 can further be connected to a computer-readable storage medium, together (and, optionally, in combination with storage device(s) 1929) comprehensively representing remote, local, fixed, and/or removable storage devices plus storage media for temporarily and/or more permanently containing computer-readable information. The communications system 1933 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1919 may also comprise software elements, shown as being currently located within a working memory 1937, including an operating system 1939 and/or other code 1941. It should be appreciated that alternate embodiments of a computer system 1919 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 1923 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 20:
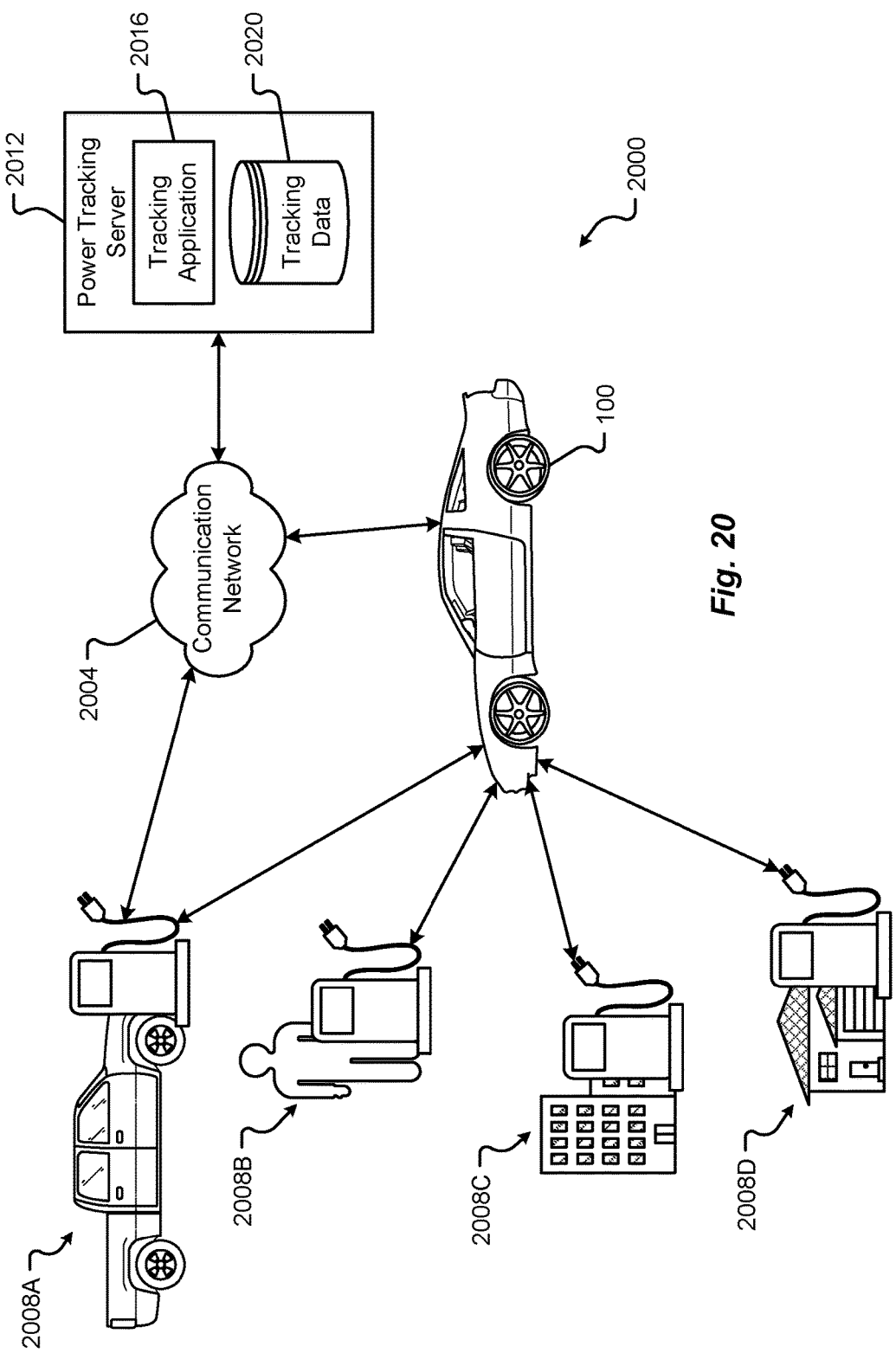
FIG. 20 is a block diagram of a power transfer and tracking system in accordance with embodiments of the present disclosure.

FIG. 20 is a block diagram of a power transfer and tracking system 2000 in accordance with embodiments of the present disclosure. The power transfer and tracking system 2000 may include at least one vehicle 100, one or more power, or charging, sources 2008A-D, and a power management tracking server 2012 communicatively connected via a communication network 2004. The server 2012 may monitor charging and/or power transfer transactions for a vehicle 100. For instance, the server 2012 may determine a source of a charge provided to the vehicle 100, an amount of charge provided to the vehicle 100 from the source, a cost or rate associated with the transfer of power/energy, etc., and/or combinations thereof. In some embodiments, the server 2012 may be located remotely and/or locally to a vehicle 100.

As shown in FIG. 20, the vehicle 100 may be configured to receive power (e.g., in the form of charging energy, etc.) from one or more power sources 2008A-D. Each power source 2008A-D may be associated with a particular owner or controlling entity. While at least some of these power sources 2008A-D may be owned and/or controlled by a user of the vehicle 100 (e.g., a home charging system, another vehicle owned by the user, etc.), it is anticipated that the vehicle 100 may receive a charge from one or more power sources 2008A-D that are owned and/or controlled by an entity or other user different from the user of the vehicle 100.

By way of example, the first power source 2008A may correspond to a mobile power source such as another vehicle (e.g., car, truck, train, etc.), a moving charging system, and/or some other system configured to provide power while the system is moving. Examples of mobile and/or moving power sources may include, but are in no way limited to, the emergency charging vehicle system 270, the aerial vehicle charging system 280, the moving charging area 520C, etc., described in conjunction with FIGS. 2, 5, 10, and 11. As provided above, the first power source 2008A may be associated with one or more owners or controlling entities. In some embodiments, the owners/entities described in conjunction with the one or more sources 2008A-D may include an owner, an operator, an organization, a group, and/or individual that is responsible for payment (e.g., the payer, etc.) for the power provided by and/or consumed by the power source 2008A-D. For example, the first power source 2008A may be part of a mobile charging fleet that provides power to vehicles requiring or requesting charge. The mobile charging fleet entity may be the controlling entity for the power provided by one or more mobile power sources in the fleet. As another example, the first power source 2008A may be a vehicle belonging to an individual. In accordance with at least some embodiments, the individual may allow, or authorize, the vehicle to provide charging power to one or more vehicles 100 in the system 2000. This authorization may be based on particular charging transaction information, such as, the receiving vehicle information, time of day, available source vehicle power, negotiated amounts, travel time, emergency context, etc., and/or combinations thereof.

In some embodiments, a vehicle 100 may be traveling along a path and receive charge from one or more power sources 2008A-D during the route traveled. For instance, the vehicle 100 may be traveling along a highway where multiple first power sources 2008A are entering and exiting the highway. First power sources 2008A (e.g., mobile power source vehicles) that are in proximity to the vehicle 100 can provide power to the vehicle 100 for a period of time, such as, a time the power source 2008A is traveling in proximity to the vehicle 100, a time until the vehicle 100 has been charged, a time agreed to in a pre-charge negotiation, a time until the power source 2008A is no longer capable of providing charging power, etc. Continuing the example above, the vehicle 100 traveling along the route may not be completely charged when a charging first power source 2008A providing charging power to the vehicle 100 may need to deviate from the route (e.g., change direction, speed, lane etc.). In this case, the charging role may be shifted or transferred from the first power source 2008A to another available charging source 2008A-D (e.g., another mobile power source traveling in proximity to the vehicle, etc.).

In some embodiments, the second power source 2008B may be associated with an individual. For example, the second power source 2008B may correspond to a charging station or other charging system that is a standalone unit operated, owned, or otherwise controlled by the individual. In some cases, the charging station may be a personal charging station or system.

The third power source 2008C may be associated with a company, enterprise, organization, or other group. The group may correspond to an electric company, a business, a public utility company, and/or the like. The third power source 2008C may provide charge to vehicles 100 of the business or those vehicles engaging in commerce with the business. In any event, one or more vehicles 100 may receive a charge from the third power source 2008C based on a contractual arrangement between an owner or operator of the vehicle 100 and the group in control of the third power source 2008C.

The fourth power source 2008D may be associated with a home or personal distribution power system. In some cases, the fourth power source 2008D may provide power via one or more components associated with a home. For example, the power providing components may be built into a portion of a home, building, driveway, lot, etc. The power providing components may provide power wirelessly (e.g., induction, non-contact coupling, etc.) and/or directly (e.g., via direct coupling, plug-and-receptacle, contact coupling, etc.).

It is an aspect of the present disclosure that at least one power source 2008A-D may communicate with the vehicle 100 and/or a power tracking server 2012. Among other things, these communications may be configured to organize a charge transaction between the power source 2008A-D and the vehicle 100. In some embodiments, the communications may be made wirelessly across a communication network 2004.

In accordance with at least some embodiments of the present disclosure, the communication network 2004 may comprise any type of known communication medium or collection of communication media and may use any type of protocols to transport messages between endpoints. The communication network 2004 may include wired and/or wireless communication technologies. The Internet is an example of the communication network 2004 that constitutes an Internet Protocol (IP) network consisting of many computers, computing networks, and other communication devices located all over the world, which are connected through many telephone systems and other means. Other examples of the communication network 2004 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 2004 need not be limited to any one network type, and instead may be comprised of a number of different networks and/or network types. The communication network 2004 may comprise a number of different communication media such as coaxial cable, copper cable/wire, fiber-optic cable, antennas for transmitting/receiving wireless messages, and combinations thereof.

The power tracking server 2012 may include a processor, a memory, and one or more inputs/outputs. The memory of the power tracking server 2012 may be used in connection with the execution of application programming or instructions by the processor, and for the temporary or long term storage of program instructions and/or data. The instructions may be configured in the form of a tracking application 2016 executed by the processor of the server 2012. As examples, the memory may comprise RAM, DRAM, SDRAM, or other solid state memory. The power tracking server 2012 may include hardware and/or software resources that, among other things, provides the ability to facilitate, track, and/or monitor a charging transaction between a charging source 2008A-D and a vehicle 100. As provided above, the power tracking server 2012 may be a part of the vehicle 100 and/or may be remotely located from the vehicle 100 across a communication network 2004.

In some embodiments, the power tracking server 2012 may receive communications from a power source 2008A-D prior to, during, and after providing a charge to a vehicle 100. For instance, prior to establishing a charging transaction, the power tracking server 2012 may receive details about the power source 2008A-D. These details may include, but are in no way limited to, a power source identification, the capabilities of a power source 2008A-D, and the rate for providing a charge to a vehicle 100. In exchange, the power tracking server 2012 may generate a message including select information and details (e.g., terms, etc.) for presentation to a display associated with the vehicle 100. The message may include one or more options for a user of the vehicle 100 to accept the terms of the proposed charging transaction or alter one or more terms of the transaction. Alteration may include the user of the vehicle 100, or the vehicle 100 automatically, providing a counteroffer or alternative to the proposed charging transaction in response to the message. This response message may be sent to the power tracking server 2012 and the server 2012 may relay or send the message to the power source 2008A-D for acceptance, denial, and/or alteration. As can be appreciated, these messages may be sent back and forth between the power source 2008A-D and the vehicle 100 (e.g., by way of the power tracking server 2012) until a negotiated charging transaction agreement is reached or the transaction is canceled.

Additionally or alternatively, the power tracking server 2012 may communicate with a tracking data memory 2020. The tracking data memory 2020 may comprise a solid state memory or devices. The tracking data memory 2020 may comprise a hard disk drive or other random access memory. In some embodiments, the tracking data memory may store information associated with a charging transaction including, but in no way limited to, charging transaction data, user preferences, account information, historical charging transaction data, power source type, power source identification, owners, transfer types, transfer amounts, transfer times, etc., and/or combinations thereof.

Figure 21A:
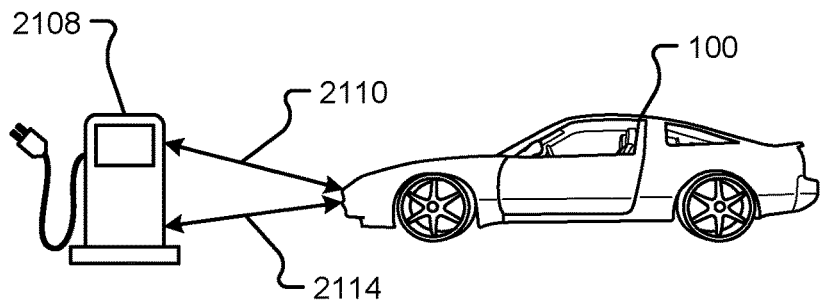
FIG. 21A is a block diagram of a first power transfer and communication exchange in accordance with embodiments of the present disclosure.
Figure 21B:
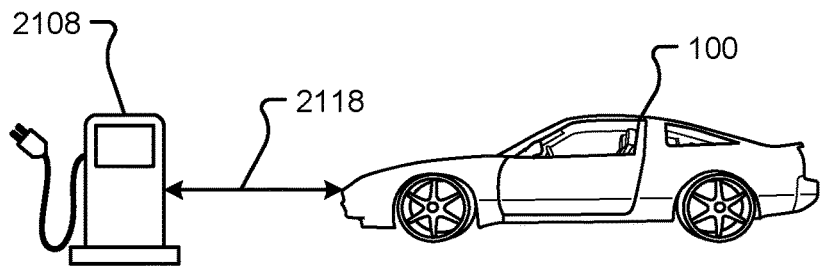
FIG. 21B is a block diagram of a second power transfer and communication exchange in accordance with embodiments of the present disclosure.
Figure 21C:
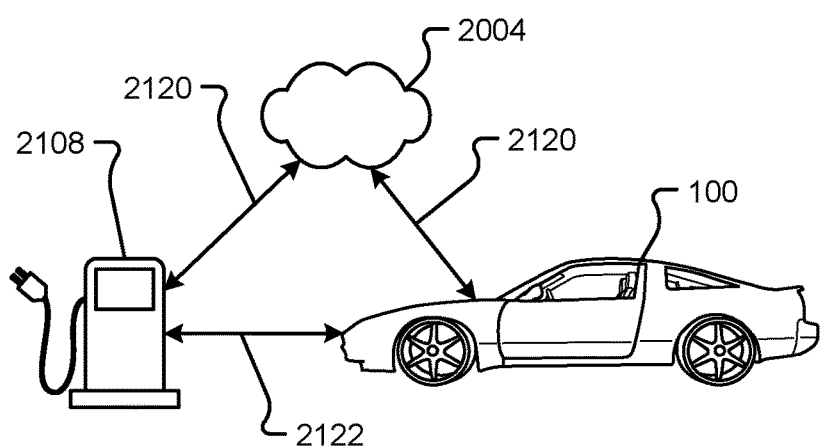
FIG. 21C is a block diagram of a third transfer and communication exchange in accordance with embodiments of the present disclosure.

FIGS. 21A-21C show block diagrams of various power transfer and communication exchanges in accordance with embodiments of the present disclosure. Each figure includes a power source 2108 that is configured to provide a charge to a receiving vehicle 100. In FIG. 21A, the power source 2108 may communicate with a vehicle 100 or a power tracking server 2012 of the vehicle 100 via a direct communication 2110. This direct communication embodiment may correspond to a direct communications connection between the power source 2108 and the vehicle 100. Direct communications connections may include any type of physical (e.g., plug-and-receptacle, cable connection, etc., and/or other direct electrical contact connection between the power source 2108 and the vehicle 100) and/or nonphysical electrical interconnection (e.g., radio frequency, Wi-Fi, Bluetooth®, or other nonphysical connection.). The communications provided via the direct communication may provide power source 2108 details, transaction details, and/or other charging messages (e.g., including broadcast messages, specific end-to-end messages, etc.).

In addition to communications, the power source 2108 may provide charging power to the vehicle 100 via a power connection 2114. The power connection 2114 may be direct (e.g., via physical contact electrical interconnection, etc.) or indirect (e.g., via noncontact electrical interconnection, induction, etc.). In some embodiments, the power source 2108 may be connected to the vehicle 100 via an electrical cable, or umbilical, configured to contain electrical and communications lines. These lines may be separate from one another in the electrical cable.

In FIG. 21B, the power source 2108 may provide power as well as communications across a single, or unified, electrical interconnection 2118. This single electrical interconnection 2118 may be configured as a charging connection. In some embodiments, the charging connection may provide power to a vehicle having a particular power transmission characteristic. For instance, during a normal power transfer, the power source 2108 may provide power to a vehicle 100 in accordance with a defined waveform (e.g., sinusoidal, square wave, clipped waves, smoothed or reduced ripple waves, etc.). The power source 2108 may provide communications during the power transfer by increasing and/or decreasing the power emitted over time and altering the defined waveform to match communications signal patterns. In one embodiment, the charging power source 2108 may utilize pulse-width modulation (PWM), or pulse-duration modulation (PDM) techniques to encode a message or communication into a pulsing charge signal. Similar to the communications described above, the communications signal patterns may provide power source 2108 details, transaction details, and/or other charging messages (e.g., including broadcast messages, specific end-to-end messages, etc.).

In FIG. 21C, the communications may be exchanged between the power source 2108 and the vehicle 100 by way of a communication network 2004, and the power may be transferred from the power source 2108 to the vehicle 100 via a separate power connection 2122. The communications may be sent via one or more wireless channels 2120 across the communication network 2004 to the vehicle 100. These communications may provide power source 2108 details, transaction details, and/or other charging messages (e.g., including broadcast messages, specific end-to-end messages, etc.). Similar to the other power connections described above, the power connection 2122 shown in FIG. 21C may be direct (e.g., via physical contact electrical interconnection, etc.) or indirect (e.g., via noncontact electrical interconnection, induction, etc.). In some embodiments, the power source 2108 may be connected to the vehicle 100 via an electrical cable.

Figure 22:
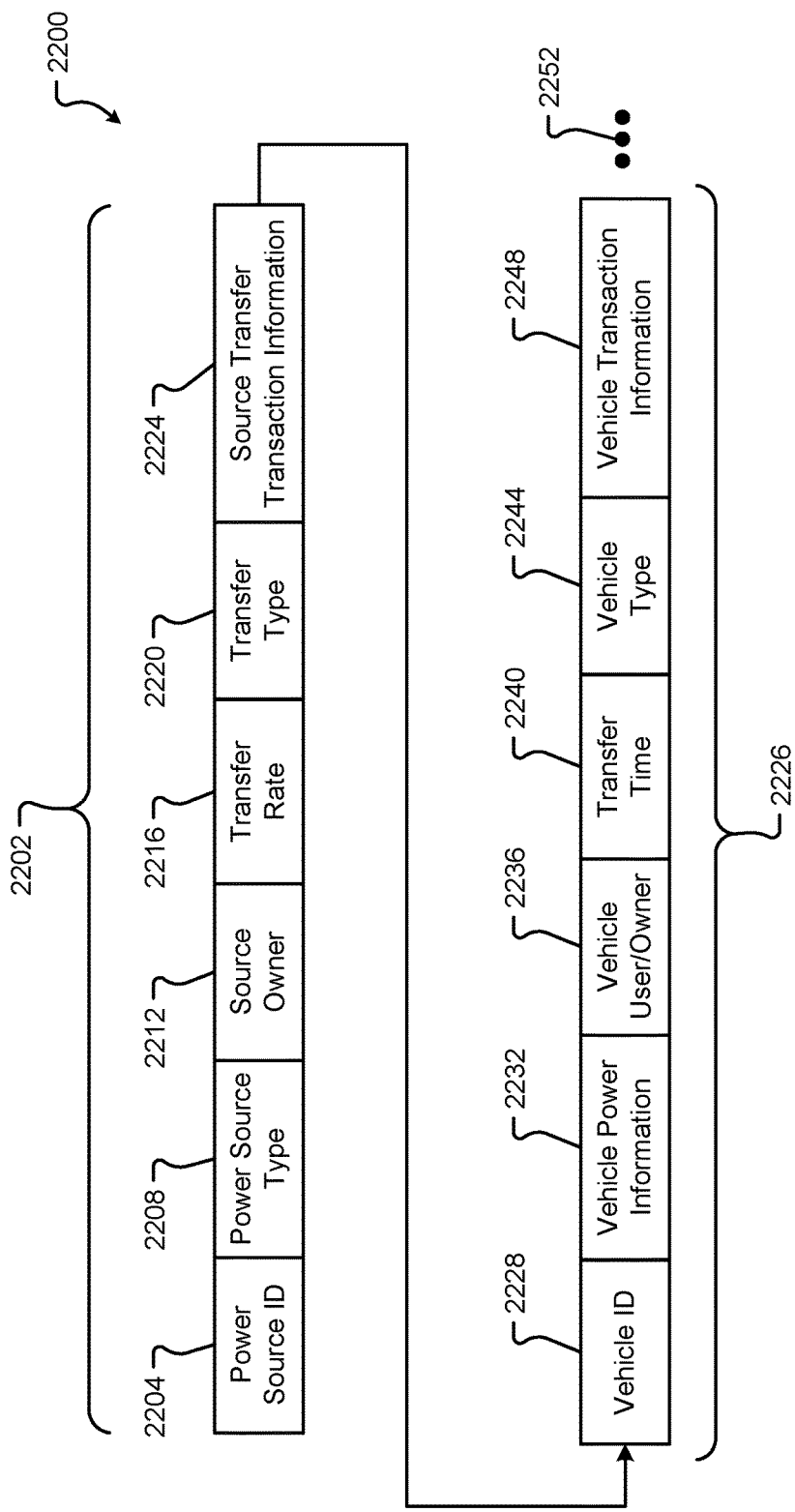
FIG. 22 is a diagram of an embodiment of a data structure for storing information about a power transfer and tracking exchange in accordance with embodiments of the present disclosure.

FIG. 22 is a diagram of an embodiment of a data structure 2200 for storing information about a power transfer and tracking exchange in accordance with embodiments of the present disclosure. The data structure 2200 may be manipulated, changed, and/or otherwise altered via on or more components of the electrical system 1500 as described in conjunction with FIG. 15. For example, the billing and cost control unit 1512 may provide the billing information for billing an owner, or a responsible operator, of the vehicle 100. In some embodiments, the information stored in the data structure 2200 may correspond to charging transaction data. The charging transaction data may be split into power source data 2202 and vehicle data 2226. While the power source data 2202 and the vehicle data 2226 may be stored together in a single data structure and/or storage location, it should be appreciated that other embodiments should not be so limited. For instance, the power source data 2202 may be contained in a data structure that is separate and apart from another data structure including the vehicle data 2226. In some cases, these separate data structures may be stored in separate different locations. In any event, the power tracking server 2012 may receive data structures (e.g., separate data structures, etc.) from one or more sources (e.g., vehicle 100, power source 2108, etc.) and determine to extract pertinent transaction data and/or combine the data for storage in a new tracked transaction data structure. The power source data 2202 may include a power source ID field 2204, a power source type field 2208, a source owner field 2212, a transfer rate field 2216, a transfer type field 2220, and a source transfer transaction information field 2224, to name a few. The vehicle data 2226 may include a vehicle ID field 2228, a vehicle power information field 2232, a vehicle user/owner field 2236, a transfer time field 2240, a vehicle type field 2244, and a vehicle transaction information field 2248. The data structure 2200 may include additional data fields 2252 or fewer data fields than shown for tracking and storage in memory. The data structure 2200 may be stored by the power tracking server 2012, for instance, in the tracking data memory 2020.

The power source ID field 2204 may include information corresponding to an identification of a power source. The identification may be a unique character string, hardware identification, billing number, or other identifier of the power source. In some embodiments, the power source ID field 2204 may be used to uniquely identify a power source for charging transactions, payments, and/or other tracking functions. For example, the power source ID field 2204 may be used by the power tracking server 2012 to monitor and track charges and/or route payments from a vehicle owner/user to the power source owner/operator, or vice versa (e.g., refunds, discounts, etc.).

The power source type field 2208 may include information identifying power output characteristics of a power source. Examples of power output characteristics may include, but are in no way limited to, current type (e.g., AC, DC, etc.), voltage, power output (e.g., watts, kilowatts, etc.), etc., and/or combinations thereof. In some cases, the power source type field 2208 may identify whether the power source is configured to provide a type of charge for a particular energy storage medium (e.g., battery, capacitor, or other energy storage system). Additionally or alternatively, the power source type field 2208 may include information corresponding to a type of power provided by the power source. For example, the power source type field 2208 may describe an origin of the power provided to the power source. Continuing this example, the power source type field 2208 may serve to communicate whether the origin of the power comes from wind energy, solar energy, geothermal energy, hydroelectric energy, ocean energy and/or other hydropower energy, hydrogen energy, biomass energy, coal energy, nuclear energy, etc. This information may be communicated to a user of a vehicle 100 via a display device, smartphone, vehicle display device, etc. Among other things, the user of the vehicle 100 may wish to support a particular energy type or group of energy types and only agree to receive charge from those types. For example, a coal miner may wish to only receive charge from coal energy power sources, while an environmentalist may wish to only receive charge from wind, solar, and/or geothermal energy power sources. In any event, a user may be presented with options (e.g., via a GUI displayed to a display device, etc.) listing available power sources according to type. These options may be shown graphically on a map and may display a proximity and/or location (e.g., relative distance to the vehicle 100, etc.) of each power source listed with details about the power source (e.g., power source ID, power source type, source owner, estimated charging amounts, etc.).

The source owner data field 2212 may include information about an owner or controlling entity of a power source. The owner data field 2212 may generally describe whether the owner or controlling entity is a public entity, private entity, individual, non-profit organization, etc. In some embodiments, the owner data field 2212 may include specific information about the owner or controlling entity including, but in no way limited to, name, picture, rating, reliability, social networking link, biography, established date, and/or other owner information. In any event, the specific and/or general information may be presented to a user (e.g., via a display device, etc.) before, during, or after a charging transaction is made. By way of example, a power source may be owned by an individual named John Smith. John may be connected to one or more social networking and/or group review sites. Information from these sites may be associated with the power source and presented to a user for review before the user agrees to a transaction. Continuing this example, in his group review site, John and/or John's power source may have been rated by various users who are socially connected to him. A social connection may exist based on past transactions and/or friendship relationships. In any event, John may have a rating of four out of five stars. Reviews may be presented that state reasons for the rating and whether the rating applies to John, John's power source, and/or combinations thereof.

The transfer rate data field 2216 may include information corresponding to typical charge times associated with the power source. This field 2216 may include identification of whether the transfer rate qualifies as a fast charge, a slow charge, a trickle charge, etc. The information may include specific timing or ranges of timing for each charge type. As can be appreciated, charge times may be affected by one or more electrical energy transfer or flow characteristics. For instance, the charge time may be based at least partially on system impedance, conductor materials used, cable cross-section, cable length, cable and/or system damage, charging demand, power source power output, etc. In some embodiments, the charge time may change based on one or more changes to the energy transfer or flow characteristics of the power source. Other factors affecting transfer rate may include environmental temperature (e.g., around or outside of the power source), power source system temperature, and/or temperature of the receiving vehicle (e.g., battery, capacitor, etc., and/or other energy storage medium), noise in output, output current, and the like. In some cases, this information may be presented to a user for review before the user agrees to a transaction. For example, a user who parks a vehicle 100 overnight may agree to a slow or trickle charge. On the other hand, a user who is traveling across country may not have time to wait for slow charging (e.g., overnight, greater than one hour, etc.) and may only accept charge from fast charging power sources (e.g., 90-second charge or less, one-hour charging or less, or variations thereof).

The transfer type field 2220 may include information identifying the type of power transfer provided by a power source. In general, power transfer types may include direct contact power transfer and indirect, or wireless, power transfer types. Direct contact may include a physical interconnection between the power source and a vehicle 100. Indirect power transfer types may not require a physical interconnection between the power source and the vehicle 100. Examples of indirect power transfer types may include, but are in no way limited to, electromagnetic radiation, inductive coupling, capacitive coupling, microwave transfer, etc., and/or combinations thereof.

The source transfer transaction information field 2224 may include information corresponding to the details of a charging transaction. These details may include charging costs, negotiated rates, source owner account name(s), source owner account address(es), routing numbers, usernames, passwords, authentication tokens, and/or other payment account information. Additionally or alternatively, the source transfer transaction information field 2224 may include details regarding a charging rendered including, but not limited to, power provided, time to charge, time of charge, charging transaction amounts, and/or other data that may be linked to a vehicle 100 receiving a charge. Among other things, the information in the source transfer transaction information field 2224 may be used to record, track, and/or process payments surrounding a charging transaction between a power source and a vehicle 100. In some embodiments, the vehicle ID field 2228 may include billing and cost information sent or received from the billing and cost control unit 1512 described in conjunction with FIG. 15.

The vehicle ID field 2228 may include information corresponding to an identification of a vehicle 100. This identification may be a unique character string, hardware identification, billing number, name, or other identifier of the vehicle 100. In some embodiments, the vehicle ID field 2228 may be used to uniquely identify a vehicle for charging transactions, payments, and/or other tracking functions. For example, the vehicle ID field 2228 may be used by the power tracking server 2012 to monitor and track charges and/or route payments from a vehicle owner/user to the power source owner/operator, or vice versa.

The vehicle power information field 2232 may include information identifying charging and/or power input characteristics of a vehicle 100. Examples of power input characteristics may include, but are in no way limited to, current type (e.g., AC, DC, etc.), voltage, power output (e.g., watts, kilowatts, etc.), etc., and/or combinations thereof. In some cases, the vehicle power information field 2232 may identify whether the vehicle is configured to receive a type of charge for a particular energy storage medium (e.g., battery, capacitor, or other energy storage system).

The vehicle user/owner field 2236 may include information about an owner or controlling entity/operator of a vehicle 100. The vehicle user/owner field 2236 may include specific information about the owner, operator, or controlling entity including, but in no way limited to, name, picture, rating, reliability, social networking link, biography, and/or other owner information. In some embodiments, the user/owner of the vehicle 100 may correspond to an entity (e.g., individual, group, organization, etc.) that is responsible for payment of charging transaction and/or other transactions for the vehicle 100. For example, Jane Doe may be a user/owner who is associated with a particular vehicle. When engaging in transactions using the vehicle, Jane Doe may be charged or billed for the transactions. In some embodiments, this payment responsibility may be maintained with the vehicle or shifted based on an identification of the user currently operating the vehicle. For instance, if a subordinate or family member is identified by the vehicle as driving or otherwise operating the vehicle, the payment responsibility may be shifted to the identified subordinate or family member.

The transfer time data field 2240 may include data corresponding to an amount of time that is associated with a power transfer or charge. The amount of time may be the time that is allotted to the charge for the vehicle. This allotted time may be set by preference (e.g., by a user of the vehicle, administrator, organization, etc.), determined based on a trip itinerary, set by a scheduled meeting or appointment, combinations thereof, and the like. In some cases, the transfer time in the transfer time data field 2240 may be communicated to a power source, power tracking server 2012, or other entity in determining whether a power source is capable of providing the power transfer or charge in the allotted transfer time. In the event that a particular power source is not capable of providing the power according to the transfer time, that power source may be removed from available options for charging (e.g., removed from a list displayed to a display device, etc.) and/or the charging transaction may be terminated.

The vehicle type data field 2244 may include information about the manufacturer, make, style, model, vehicle identification number (VIN), and other information associated with the type of vehicle 100. This information may be stored to determine vehicle 100 capabilities, energy storage medium types, capacity, maintenance issues, charging issues, and/or other information that may be useful in determining a transaction requirement for the vehicle 100. By way of example, a full-electric truck developed by XYZ motor company may be capable of receiving a greater amount of charge than a hybrid-electric compact car manufactured by ABC corporation. In this instance, the power source may be included or excluded from a list or display of available power sources based on the determined charge requirement and power source capabilities. Additionally or alternatively, the power source may report that, due in part to the determined vehicle requirements, the power source may only be capable of providing a partial charge.

The vehicle transaction information field 2248 may include information corresponding to the details of a charging transaction for a vehicle 100. These details may include charging costs, negotiated rates, vehicle owner account name(s), vehicle owner account address(es), routing numbers, usernames, passwords, authentication tokens, and/or other vehicle payment account information. Additionally or alternatively, the vehicle transaction information field 2248 may include details regarding a charging received from a power source including, but not limited to, power received, time to charge the vehicle 100, time of the vehicle 100 charging (e.g., time of day, etc.), charging transaction amounts, and/or other data that may be linked to a power source providing a charge. Among other things, the information in the vehicle transaction information field 2248 may be used to record, track, and/or process payments surrounding a charging transaction between a power source and a vehicle 100. In some embodiments, at least some of the data from the vehicle transaction information field 2248 may be combined with at least some of the data from the source transfer transaction information data field 2224, or vice versa. This combined data may fully define the financial and/or payment details surrounding a charging transaction.

Figure 23:
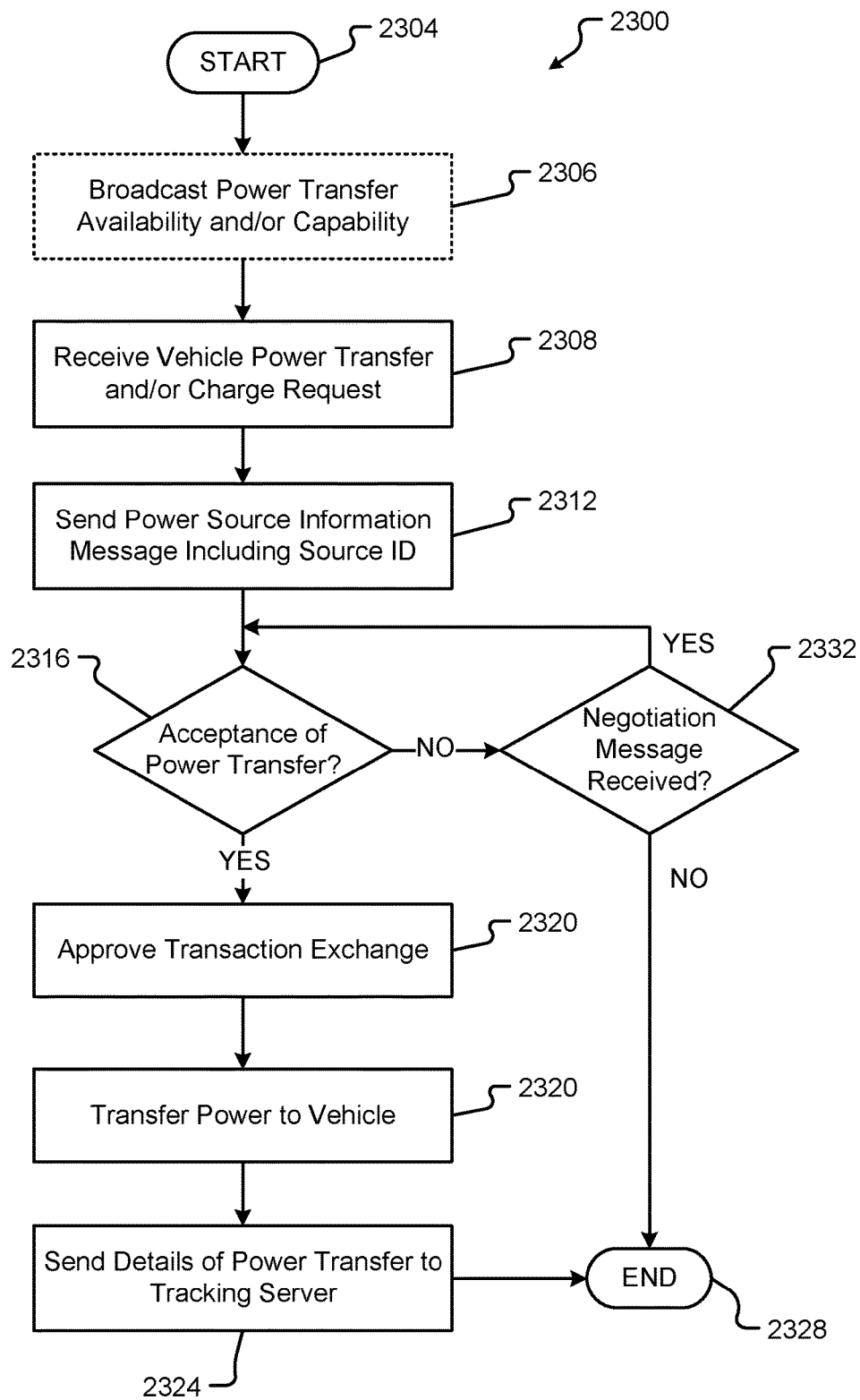
FIG. 23 is a flow chart depicting a method of tracking power transfer and payment in accordance with embodiments of the present disclosure.

FIG. 23 is a flow chart depicting a method 2300 of tracking power transfer and payment in accordance with embodiments of the present disclosure. While a general order for the steps of the method 2300 is shown in FIG. 23, the method 2300 can include more or fewer steps or can arrange the order of the steps differently than those shown in FIG. 23. Generally, the method 2300 starts with a start operation 2304 and ends with an end operation 2328. The method 2300 can be executed as a set of computer-executable instructions executed by a computer system and encoded or stored on a computer readable medium. Hereinafter, the method 2300 shall be explained with reference to the systems, components, data structures, user interfaces, environments, software, etc. described in conjunction with FIGS. 1-22.

The method 2300 begins at step 2304 and may optionally proceed by a broadcasting a power transfer availability and/or capability of a power source (step 2306). The broadcast signal may be sent by a power source or a communication module associated with a power tracking server 2012. In some embodiments, the power source may be communicatively connected with the power tracking server 2012 (e.g., via a communication network 2004, etc.). In this case, the power source may report an availability or state associated with the power source. In turn, the power tracking server 2012 may communicate this availability or state to a vehicle 100 in the system 2000. In one embodiment, the signal may be sent to a vehicle 100 in proximity, or scheduled to be in proximity (e.g., via a planned route, etc.), to the power source.

Next, the method 2300 may proceed when a vehicle power transfer or charge request is received (step 2308). In some embodiments, the request may be received by the power tracking server 2012 and/or a power source. The charge request may be sent by a vehicle 100 in response to a user input or based on a determined level of charge associated with the vehicle 100. For example, a vehicle 100 may automatically determine that a user is traveling along a route (e.g., a planned route, a repeat or habit route, a restricted route (e.g., a route with no exits or waypoints along a specific distance, etc.) and/or some route previously traveled by the user of the vehicle 100 and/or some other user. In response to determining that the user is traveling along the specific route, the vehicle 100 and/or the power tracking server 2012 may determine that a charge of the vehicle 100 may be necessary. This determination may be based on a rate of travel, a distance traveled, a length of the route, state of charge associated with the vehicle energy storage system (e.g., batteries, capacitors, etc.), and/or other factors.

The method 2300 continues by the power source sending an information message including the power source ID 2204 (step 2312). Depending on the communication arrangement, the information message may be sent directly to a vehicle 100 and/or indirectly to a vehicle 100 via a communication network 2004. In some embodiments, the information message may include other power source data 2202, as described in conjunction with FIG. 22. Among other things, this information may be configured for presentation to a display device associated with the user of the vehicle 100 and/or the vehicle 100.

The information message sent to the vehicle 100 may include rate information and/or payment information offered for the charging transaction. In response to receiving this information, the vehicle 100 may provide an acceptance or non-acceptance (e.g., rejection or denial, etc.) of the power transfer or charge offer based on the transaction particulars (e.g., cost, rate of charge, etc.)(step 2316). The acceptance may be provided automatically, via the vehicle 100 and/or power tracking server 2012. An automatic acceptance may be made in certain situations (e.g., emergency situations, etc.), if rates and charging particulars of the power source message match predefined particulars stored in a memory of the vehicle 100 and/or in tracking data memory 2020.

If the offer is not accepted in step 2316, the method 2300 may proceed by determining whether a negotiation message is received from the user and/or the vehicle 100 (step 2332). The negotiation message may include an alteration to at least one of the charging transaction particulars provided by the power source. The negotiation message may be forwarded to the power source for approval, denial, and/or counter-offer. In the event that no negotiation message is received, the method 2300 may end at step 2328.

In the event that the offer is accepted in step 2316, the method 2300 may proceed by approving the charging transaction (step 2320). Approval may include verifying an authenticity of the power source offer. In some embodiments, the payment method and particulars provided by the vehicle 100 may be verified. In any event, once the charging transaction is approved, the method 2300 may proceed by the power source transferring power (e.g., in the form of a charge, etc.) to the vehicle 100 (step 2320). The transfer of power may be provided by any of the power transfer methods described above.

The method 2300 may continue by sending the details of the power transfer to the power tracking server 2012 (step 2324). The details may include at least some of the data included in the data structure 2200 described in conjunction with FIG. 22. In some cases, the details may include whether the charge was completed, interrupted, or otherwise terminated. An interrupted charge may be subject to reduced rates (e.g., based on actual energy transferred, etc.). In some embodiments, the power transfer details may be associated with a user account and stored in a memory location associated with the user. These details may be used to track power consumption of a user, vehicle, or group of users and vehicles. In one embodiment, the tracked power consumption may be used by the power tracking server 2012 to anticipate future charging times, preferences, or locations. In some embodiments, the tracked power consumption may be used by the power tracking server 2012 to determine driving habits, demand, etc. The method 2300 ends at step 2328.

In some embodiments, at least one of the charging systems 250, 254, 258, 270, 280 and/or devices described herein may communicate with the vehicle 100, and/or vice versa, via a charging communication protocol. The charging communication protocol may leverage one or more communication devices and/or systems described herein (e.g., the communications subsystem 1900, and/or the components thereof, etc.) or utilize other systems of the vehicle 100 that are specific to charging communications. In some embodiments, the charging communication protocol may be separate and apart from other communication protocols used by the various systems of the vehicle 100. In any event, the devices used for the charging communications may be interconnected via one or more links/busses 5, as described in conjunction with FIG. 19A. For example, the various chargers and charging arrangements, especially moving charging systems, as described herein may require specific communications or messages to be exchanged to, among other things, determine billing details, orientation of a vehicle 100 (e.g., relative to charging system, etc.), alignment of the vehicle 100 and/or charging element (e.g., prior to and/or during a charging session, etc.), and/or other charging specific details for a vehicle 100 in a charging arrangement or receiving a charge. The present disclosure describes a charging communication protocol for these messages. It is an aspect of the present disclosure that the charging communication protocol can handle the unique charging requirements of various charging arrangements and systems.

Figure 24:
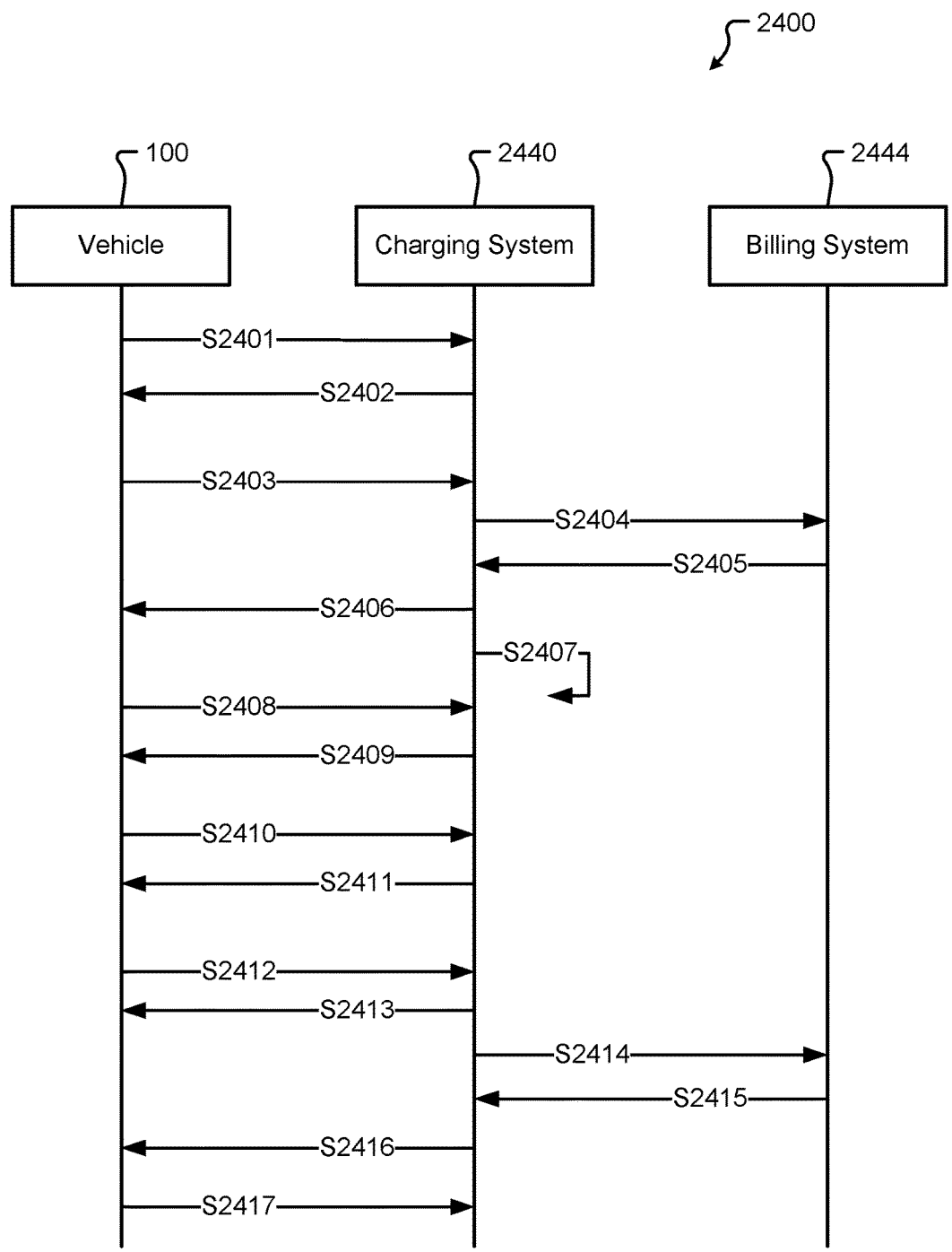
FIG. 24 is a diagram depicting a set of communication flows in accordance with at least some embodiments of the present disclosure.

FIG. 24 is a diagram depicting a set of communication flows 2400 in accordance with at least some embodiments of the present disclosure. The communication flows 2400 may describe a series of communications between a vehicle 100 and a charging system 2440. The charging system 2440 may correspond to any of the charging systems 250, 254, 258, 270, 280 described herein. The charging system 2440 may be a computing device as described in conjunction with FIGS. 19B-C. For instance, the charging system 2440 may include a processor, communications module, and memory. In some embodiments, the vehicle 100, or one or more components thereof (e.g., communications subsystems 1900, etc.) may communicate with the charging system 2440. In any event, the communications regarding a charge may initiate from the vehicle 100.

In any event, the communications may begin when a vehicle 100 requests a charge from a charging station 2440 in step S2401. The request may be made in response to the vehicle 100 determining that a charge of one or more power storage systems (e.g., batteries, capacitors, etc.) requires energy or charging. The request S2401 may include a query message configured to illicit a response from at least one available charging station 2440. The query message S2401 may include charging specifics for the vehicle 100 as provided herein. In response to receiving the query message, the charging station 2440 may respond with an acknowledgement message S2402. The acknowledgement message S2402 may include information to the vehicle 100 that the charging station 2440 has received the query and may be capable of providing a charge to the vehicle 100.

The vehicle 100 may provide an enrollment message S2403 to the charging system 2440. The enrollment message S2403 may include vehicle 100 information, billing information, and/or other information configured to enroll the vehicle 100 for charging with the charging system 2440. In some cases, the enrollment message S2403 may include vehicle identification, user identification, owner identification, billing information, and/or other enrollment and/or billing information. In one embodiment, the charging system 2440 may verify this information with a billing system 2444 via an enrollment and/or billing verification request message S2404 sent from the charging system 2440 to a billing system 2444. The verification request message S2404 may include a username, password, and/or an account number associated with a responsible user, or owner, of the vehicle 100. In one embodiment, the billing system may verify the enrollment information and respond with a verification response message S2405. The verification response message S2405 may include an authorization amount, a limit, and/or some other enrollment information for the charging system 2440. Acknowledgement of the enrollment and/or verification response message 2405 may be communicated to the vehicle 100 via the charging system 2440 and an acknowledgement verification message S2406.

Next, the charging system 2440 may determine to provide power or electrical charging energy to the vehicle 100 at step S2407. Power may be provided to the vehicle 100 as described in any of the charging scenarios described above.

In the event that a vehicle 100 is moving while receiving a charge, the vehicle 100 may provide position information to the charging system 2440 in the form of a position information message S2408. The position information message S2408 may inform the charging system 2440 of any deviation from an initial charging location, or expected charging location. Upon receiving the position information message S2408, the charging system 2440 may respond with an acknowledgment message S2409 that, among other things, may acknowledge that the position of the vehicle 100 has been received by the charging system 2440.

In some embodiments, the vehicle 100 may provide a charging status message S2410 to the charging system 2440. The charging status message S2410 may indicate an amount of charge the vehicle 100 has received, an amount of charge remaining for the vehicle 100, and/or an amount of charge until the vehicle 100 is fully charged, etc. The charging system 2440 may respond with an acknowledgement message S2411 that acknowledges the charging system 2440 has received the charging status message 2410.

Once the charging has reached, or is nearing, completion the vehicle 100 may provide an end-of-charge message S2412 to the charging system 2440. The end-of-charge message S2412 may indicate a remaining amount of charge to be transferred by the charging system 2440, a charge completion amount for the vehicle 100, a time until the vehicle is fully charged, and/or the like. The charging system 2440 may respond with an acknowledgement message S2413 acknowledging the same.

Upon receiving the end-of-charge message S2412, the charging system 2440 may complete the charge for a vehicle 100 and send a finalize charge message S2414 to the billing system 2444. The billing system 2444 may then determine an amount of total charge provided to the vehicle 100 via the charging system 2440. This amount and final receipt of charge may be communicated from the billing system 2444 to the charging system 2440 via a final charge message S2415. Next, the charging system 2440 may send an end of transaction message S2416 to the vehicle 100. The end of transaction message S2416 may signal to the vehicle 100 that the charging between the vehicle 100 and the charging system 2440 is complete. Additionally or alternatively, the end of transaction message may provide the final receipt of charge to the vehicle 100 (e.g., for presentation to a display device of the vehicle 100, etc.). In some embodiments, the message S2416 may signal that the communications between the charging system 2440 and the vehicle 100 have ended. The vehicle 100 may terminate the communications in a final goodbye message S2417 sent to the charging system 2440.

Figure 25:
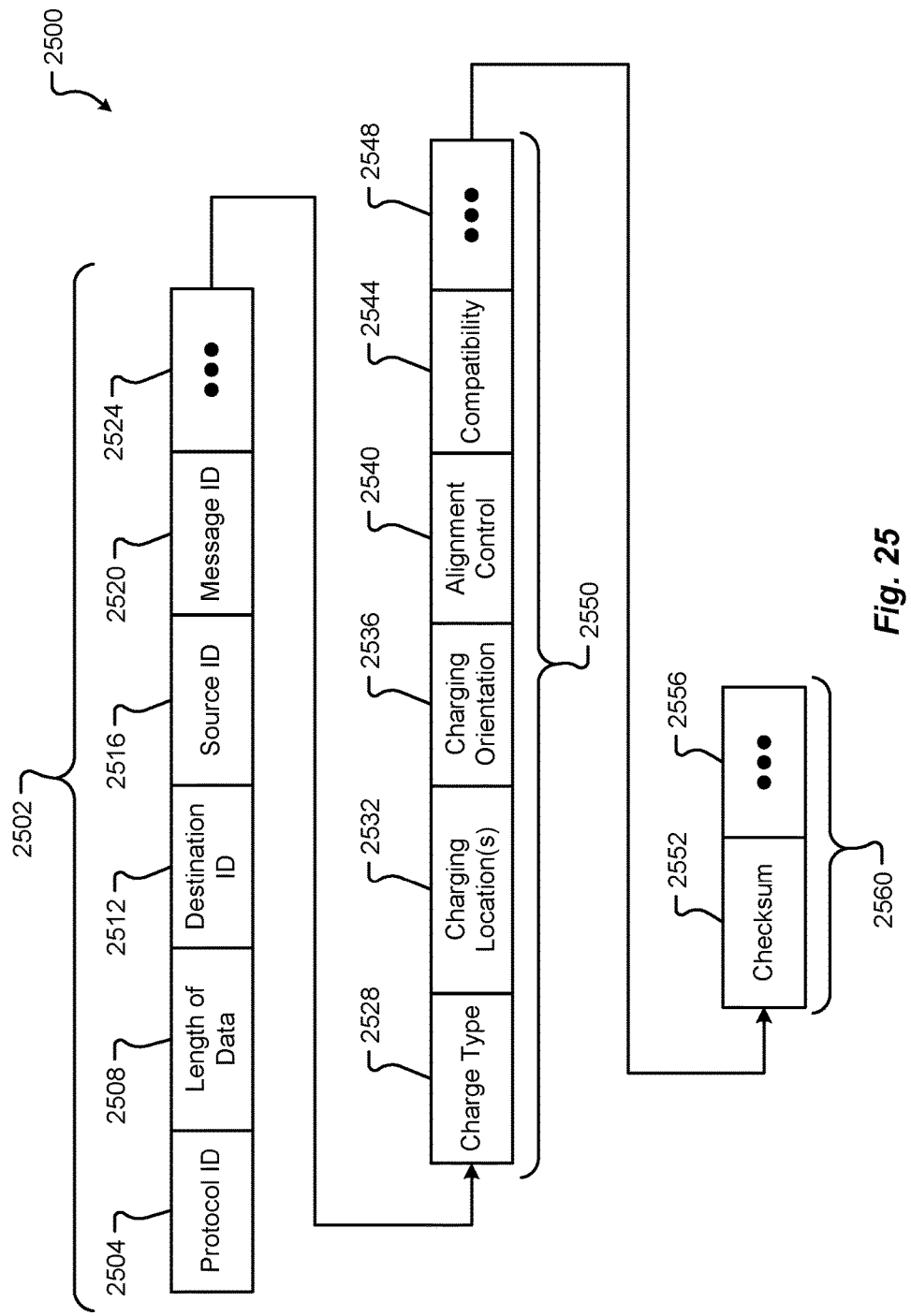
FIG. 25 is a diagram of a charging communications packet in accordance with embodiments of the present disclosure.

FIG. 25 is a diagram of a charging communications packet or data structure 2500 in accordance with embodiments of the present disclosure. The packet 2500 may include a header portion 2502, a payload portion 2550, and a footer portion 2560. In some embodiments, the header portion 2502 may include a protocol ID field 2504, a length of data field 2508, a destination ID 2512, a source ID 2516, message ID 2520, and more 2524. The payload portion 2550 may include a charge type field 2528, charging location(s) field 2532, charging orientation field 2536, alignment control field 2540, compatibility field 2544, and more 2548. The footer portion 2560 may include a checksum field 2552 and/or other data 2556.

The header portion 2502 may define which protocol is used in the charging communication between the vehicle 100 and a charging system 2440 via a protocol ID field 2504. The protocol ID field 2504 may identify a particular protocol to be used in charging the vehicle 100. In some embodiments, the vehicle 100 may use a number of different protocols depending on the state of the vehicle 100, communications, and/or available charging systems 2440. In any event, the protocol ID field 2504 may identify the protocol to be used in exchanging communications between the vehicle 100 and the charging system 2440.

The length of data may specify a length or size of the packet 2500. This length of data field 2508 may define the appropriate and/or expected length of the packet 2500 for charging communications between the vehicle 100 and the charging system 2440.

The destination ID field 2512 may identify a destination for a charging communication message. When sent from a vehicle 100 to a charging system 2440, the destination ID field 2512 may include an address for the charging system 2440. When sent from a charging system 2440 to a vehicle 100, the destination ID field 2512 may include an address for the vehicle 100. In any event, the address may be a specific address or a general address for a type of destination. For instance, vehicles 100 or charging systems 2440 may include a general address or portion of an address for receiving messages.

The source ID field 2516 may identify a source of a charging communication message. When sent from a vehicle 100 to a charging system 2440, the source ID field 2516 may include an address for the vehicle 100. When sent from a charging system 2440 to a vehicle 100, the source ID field 2516 may include an address for the vehicle charging system. In any event, the address may be a specific address or a general address for a type of source. For instance, each vehicle 100 and/or charging system 2440 may include a specific address uniquely identifying the source of charging messages.

The message ID field 2524 may include an identification of the charging communication message. This identification may include an ordered number of the message relating to previous and/or subsequent messages sent. In some embodiments, the message ID may include a unique identification of each message in a communication.

The payload portion 2550 may include a charge type field 2528 indicating a type of charge required. In the event the message and packet 2500 is sent from a vehicle 100 to a charging system 2440, the charge type field 2528 may include the type of charge the vehicle is capable of receiving. For example, the vehicle 100 may be capable of receiving a static charge, moving charge, plug-in charge, inductive charge, etc., and/or combinations thereof. In some cases, this field 2528 may be reviewed by a charging system 2440 in determining whether the vehicle 100 can receive a charge from the system 2440.

The charging location(s) field 2532 may include one or more locations on a vehicle 100 that are capable of receiving a charge. These locations may include one or more sides of a vehicle 100, a portion of an outside of the vehicle 100, or other area of the vehicle 100 that is configured to interface with a charging system 2440. For instance, a vehicle 100 may include an inductive charging area disposed on an undercarriage of the vehicle 100 in the center of the vehicle 100 body. This information may be provided in the packet 2500 to aid the charging system 2440 in determining whether a charge can be provided at this location.

In some embodiments, the packet 2500 may include a charging orientation field 2536 identifying an orientation of the vehicle 100 and/or charger of the charging system 2440 to enable a charge. This charging orientation may include a relative orientation of the vehicle 100 and/or charging area to a portion of the charging system 2440. The orientation may require vehicle 100 to maintain a position in a specific area (e.g., of the roadway, parking area, etc.) while receiving a charge from the charging system 2440.

The packet 2500 may include an alignment control field 2540. The alignment control field 2540 may comprise information that determines whether a charging system 2440 or a vehicle 100 controls an alignment of the vehicle 100 to the charging system 2440 during a charge. In some cases, this alignment may change depending on the charging type, whether the vehicle is moving or static, and/or whether the vehicle 100 is in autonomous or manual operation mode. In some embodiments, the charging system 2440 may control an alignment of a vehicle 100 while the vehicle 100 is receiving a charge (e.g., while the vehicle is in a charging system zone receiving charge, etc.).

The compatibility field 2544 may correspond to information for compatibility between one or more charging systems 2440 and vehicles 100. For example, a first charging system may only be compatible with a select group of vehicles while a second charging system may be compatible with an expanded group of vehicles. In any event, the compatibility field 2544 may include information for use in making a compatibility determination for charging.

The checksum field 2552 may comprise information to verify and/or check the integrity of a received packet 2500. The checksum field 2552 may be used by a charging system 2440 and/or receiving device to determine whether the packet 2500 is valid, whole, or incomplete, etc.

Figure 26:
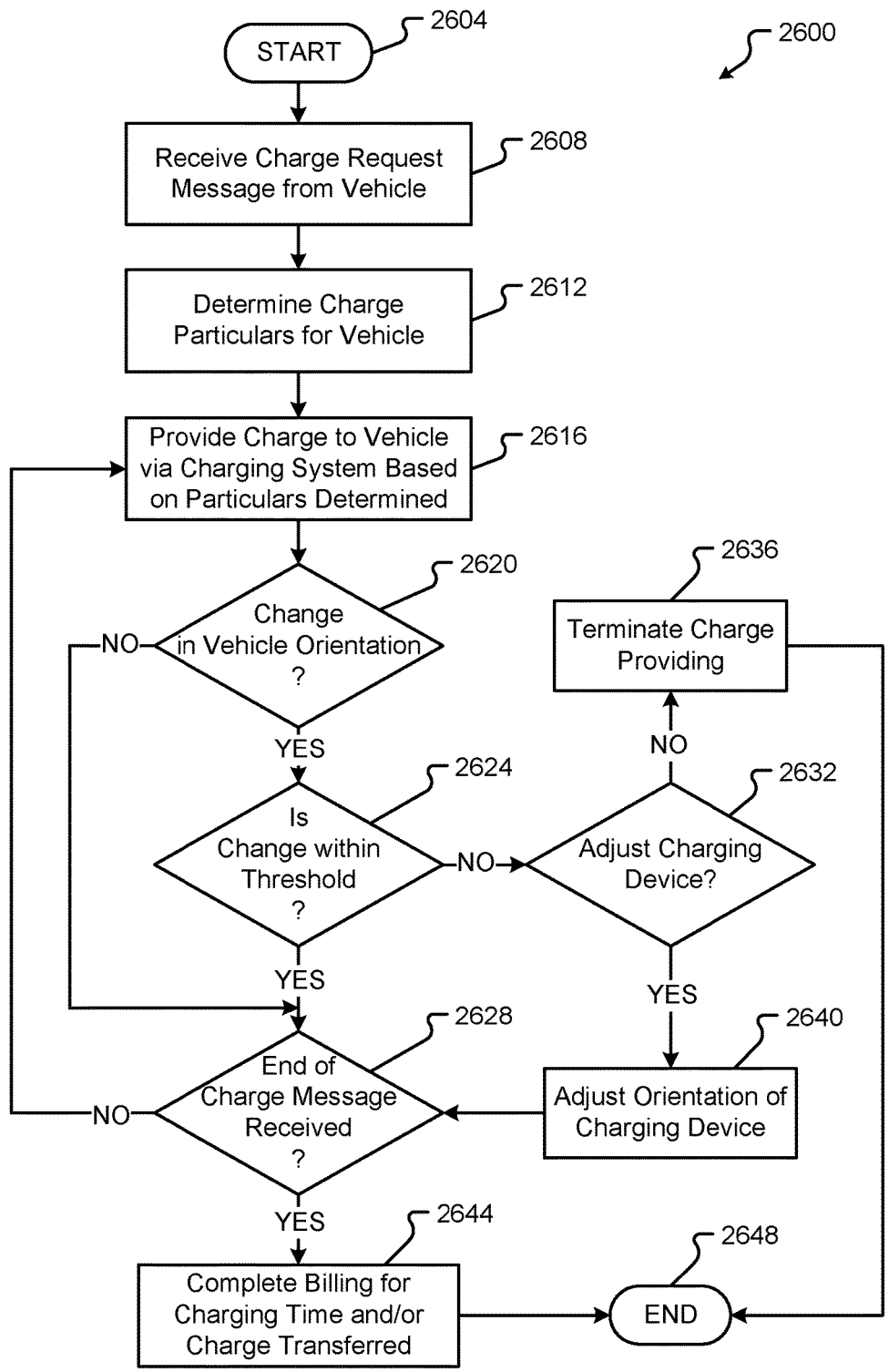
FIG. 26 is a flow chart depicting a method of providing charge based on a charging communication received at a charging system in accordance with embodiments of the present disclosure.

FIG. 26 is a flow chart depicting a method 2600 of providing charge based on a charging communication received at a charging system 2440 in accordance with embodiments of the present disclosure. While a general order for the steps of the method 2600 is shown in FIG. 26, the method 2600 can include more or fewer steps or can arrange the order of the steps differently than those shown in FIG. 26. Generally, the method 2600 starts with a start operation 2604 and ends with an end operation 2648. The method 2600 can be executed as a set of computer-executable instructions executed by a computer system and encoded or stored on a computer readable medium. Hereinafter, the method 2600 shall be explained with reference to the systems, components, data structures, user interfaces, environments, software, etc. described in conjunction with FIGS. 1-25.

The method 2600 begins at step 2604 and proceeds when a charge request message is received from a vehicle 100

(step 2608). The charge request message may include information corresponding to the vehicle 100 making the request, a charge type requested, and/or any other data described in conjunction with FIG. 25 above.

Next, the charging system 2400 may determine the charge particulars for the vehicle 100 based on the charge request received (step 2612). As provided above, the charge particulars may include the charge types, charging locations, charging orientations, alignment controls, compatibilities, and/or more associated with a vehicle 100. The charging particulars may include information transmitted in a request message sent from the vehicle 100 to a charging system 2440 (e.g., in the form or one or more packets 2500, etc.).

Once the communications are established between the vehicle 100 and the charging system 2440, the method 2600 continues by providing a charge to the vehicle 100 based on the determined particulars (step 2616). Providing charge may include any transfer of energy to the vehicle 100 from the charging system 2440 as described above. The charge may be provided via direct coupling, indirect coupling, and/or combinations thereof. In some embodiments, the method 2600 may provide charge from the charging system 2440 to the vehicle 100 in a particular orientation as defined in the charge particulars of step 2612.

Next, the method 2600 may determine whether any change to the orientation of the vehicle 100 has occurred (step 2620). As can be appreciated, as a vehicle 100 travels during a moving charge, the orientation of the vehicle 100 and/or the charging location for a vehicle 100 may change relative to a charging system 2440. In the event a change in orientation is detected, the method 2600 may determine whether the change in orientation is within an acceptable threshold (step 2624). The threshold may be predefined and allow for a variation in orientation alignment between the vehicle 100 and a charging system 2440. The acceptable threshold allows charging of the vehicle 100 although the vehicle may not be perfectly oriented with the charging system 2440.

In the event that the change in orientation is not within the threshold, the method 2600 may determine whether to adjust an orientation of the charging device or vehicle 100 (step 2632). If the vehicle 100 has moved outside of an acceptable adjustment threshold, the method 2600 may determine to terminate any providing of charge (step 2636). For instance, when a vehicle 100 leaves a charging area, there may be no ability to adjust the charging orientation. However, if the change is within a threshold, the method 2600 may determine to adjust an orientation of the charging device (step 2640). This adjustment may include moving a charging component of the charging system 2440. Additionally or alternatively, the adjustment may include repositioning the vehicle 100 relative to the charging system 2440.

The method 2600 proceeds by determining whether the charging of the vehicle 100 is complete or if an end-of-charge message is received (step 2628). If not, the vehicle 100 continues to charge via the charging system 2440. However, if the message is received, the charging system 2440 may complete the billing for the charging time and/or amount of charge transferred to the vehicle 100 via the charging system 2440 (step 2644). The method 2600 ends at step 2648.

Figure 27:
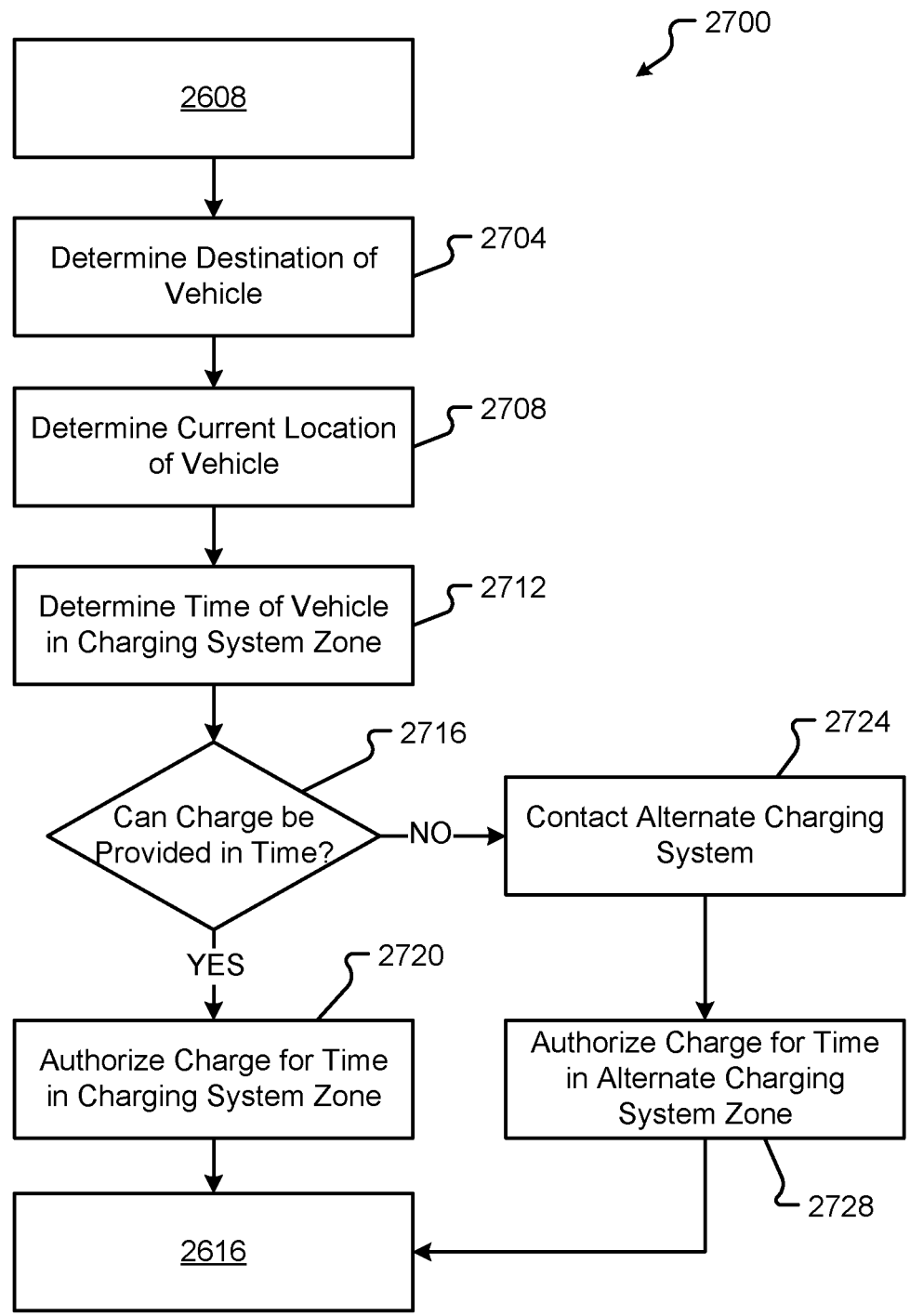
FIG. 27 is a flow chart depicting a method of authorizing a charge for a particular time in accordance with embodiments of the present disclosure.

FIG. 27 is a flow chart depicting a method 2700 of authorizing a charge for a particular time in accordance with embodiments of the present disclosure. While a general order for the steps of the method 2700 is shown in FIG. 27, the method 2700 can include more or fewer steps or can arrange the order of the steps differently than those shown in FIG. 27. Generally, the method 2700 starts with a start operation (e.g., step 2608 of FIG. 26) and ends with an end operation (e.g., step 2616 of FIG. 26). The method 2700 can be executed as a set of computer-executable instructions executed by a computer system and encoded or stored on a computer readable medium. Hereinafter, the method 2700 shall be explained with reference to the systems, components, data structures, user interfaces, environments, software, etc. described in conjunction with FIGS. 1-26.

In some embodiments, the method 2700 may determine whether an adequate amount of charge can be provided to a vehicle 100 during a time the vehicle 100 is in a charging zone. If the vehicle 100 cannot be adequately charged (e.g., more than 1%, etc.), the method 2700 may determine to prevent authorizing charging of the vehicle 100. Among other things, this method 2700 may prevent minimal charging to the vehicle 100 while preventing repetitive billing to an account for the vehicle 100 with little to no benefit.

The method 2700 may begin after step 2608 of FIG. 26 and/or in response to determining the charge particulars for a vehicle. Next, the method 2700 may proceed by determining a destination of the vehicle 100. The destination may be programmed into a navigation application of the vehicle 100, determined by a travel path of the vehicle 100, and/or otherwise entered into a memory of the vehicle 100. In any event, the charging system 2440 may refer to the destination of the vehicle travel in step 2704.

Next, the method 2700 determines the current location of the vehicle 100 (step 2708). The current location may be based on a GPS or current position of the vehicle 100 along a trip or route. Similar to the destination, the current location of the vehicle 100 may be stored in a navigation application memory for the vehicle 100. Using the current location of the vehicle 100 and the destination for the vehicle 100, the charging system 2440 may determine one or more appropriate chargers for the vehicle 100.

The method 2700 may proceed by determining a time the vehicle 100 is in one or more of the charging system zones (step 2712). The charging system zone may correspond to an area that the charging system 2440 may be capable of providing a charge to the vehicle 100. The time may be based on a current speed of the vehicle 100, a location of the vehicle 100 along a route, a destination for the vehicle, etc., and/or combinations thereof.

The method 2700 continues by determining whether the charge can be provided to the vehicle 100 via the charging system 2440 in the time the vehicle 100 is in the charging system zone (step 2716). In the event that the charge cannot be provided to the vehicle 100 in the time the vehicle 100 is in the charging system zone, the method 2700 may proceed by contacting and/or determining any available alternate charging systems for the vehicle 100 along the route for the vehicle 100 to the destination (step 2724). The charging system 2440 may negotiate and/or authorize a charge time for the vehicle 100 when in the alternate charging system zone (step 2728).

In any event, the vehicle 100 may be authorized for charging during a time the vehicle 100 is in a selected charging system zone (step 2720). The method 2700 may continue by proceeding to step 2616 of FIG. 26.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a server, comprising: a processor; and a computer-readable storage medium having instructions stored thereon that, when executed by the processor, cause the processor to: receive a charging request for a vehicle; determine a power source that is available to provide charging power to the vehicle based on the charging request; send a power source message to the vehicle, wherein the power source message includes information describing charging capabilities of the determined power source; receive an acceptance message from the vehicle, the acceptance message authorizing a power transfer from the determined power source to the vehicle; and receive a transaction report from at least one of the vehicle or the power source, wherein the report includes details corresponding to the power transfer.

Aspects of the above server include wherein prior to determining the power source that is available, the processor is further caused to receive an availability signal from one or more power sources in proximity to a position of the vehicle along a route. Aspects of the above server include, wherein the route is a planned route stored in a navigation system associated with the vehicle. Aspects of the above server include wherein the charging request includes a first geographical location of the vehicle at a first point in time, and wherein the position of the vehicle along the route is a different second geographical location of the vehicle at a second point in time after the first point in time. Aspects of the above server include wherein the charging request includes at least one of a state of charge of the vehicle, a required charge characteristic associated with the vehicle, or a requested time to charge the vehicle. Aspects of the above server include wherein prior to sending the power source message to the vehicle, the processor is further caused to receive an estimated charging cost from the determined power source corresponding to an estimated cost for charging the vehicle based on the charging request. Aspects of the above server include wherein the power source message is configured for display to graphical user interface associated with the vehicle. Aspects of the above server include wherein the power source message is configured to display a list of each power source on a graphical user interface map along with a relative distance from each power source to the vehicle, and wherein each power source displayed includes details about the power source. Aspects of the above server wherein prior to receiving the acceptance message the processor is further caused to: receive, from the vehicle, a selection of one power source from the list of each power source displayed on the graphical user interface map. Aspects of the above server wherein the transaction report includes an amount of charge provided in the power transfer from the power source to the vehicle, a time of charge associated with the power transfer, a cost associated with the power transfer, an identification of the power source providing the power transfer, and an identification of the vehicle.

Embodiments include a method, comprising: receiving, via a processor, a charging request for a vehicle; determining, via the processor, a power source that is available to provide charging power to the vehicle based on the charging request; sending, via the processor, a power source message to the vehicle, wherein the power source message includes information describing charging capabilities of the determined power source; receiving, via the processor, an acceptance message from the vehicle, the acceptance message authorizing a power transfer from the determined power source to the vehicle; and receiving, via the processor, a transaction report from at least one of the vehicle or the power source, wherein the report includes details corresponding to the power transfer.

Aspects of the above method include wherein prior to determining the power source that is available, the method further comprises: receiving an availability signal from one or more power sources in proximity to a position of the vehicle along a route. Aspects of the above method include wherein the route is a planned route stored in a navigation system associated with the vehicle. Aspects of the above method include wherein the charging request includes a first geographical location of the vehicle at a first point in time, and wherein the position of the vehicle along the route is a different second geographical location of the vehicle at a second point in time after the first point in time. Aspects of the above method include wherein the charging request includes at least one of a state of charge of the vehicle, a required charge characteristic associated with the vehicle, or a requested time to charge the vehicle. Aspects of the above method include wherein prior to sending the power source message to the vehicle, the method further comprises: receiving an estimated charging cost from the determined power source corresponding to an estimated cost for charging the vehicle based on the charging request. Aspects of the above method include wherein the power source message is configured for display to graphical user interface associated with the vehicle, wherein the power source message is configured to display a list of each power source on a graphical user interface map along with a relative distance from each power source to the vehicle, and wherein each power source displayed includes details about the power source. Aspects of the above method include wherein prior to receiving the acceptance message the method further comprises: receiving, from the vehicle, a selection of one power source from the list of each power source displayed on the graphical user interface map.

Embodiments include an electric vehicle, comprising: a communication connectivity device communicating with one or more power sources across a communication network; a rechargeable energy storage; a display device; a power tracking server, comprising: a processor; and a computer-readable storage medium having instructions stored thereon that, when executed by the processor, cause the processor to: determine the vehicle requires a charge; determine at least one power source in the one or more power sources that is available to provide charging power to the vehicle based on the determined charge; present a graphical user interface to the display device, the graphical user interface displaying information describing charging capabilities of the determined at least one power source; receive a selection of the at least one power source via the display device, wherein the selection authorizes a power transfer from the at least one power source to the vehicle; storing charging energy transferred in the power transfer to the rechargeable energy storage; and receive a transaction report from at least one of the vehicle or the at least one power source, wherein the report includes details corresponding to the power transfer.

Aspects of the above electric vehicle include wherein the processor is further caused to: send, via the communication connectivity device, the transaction report to a tracking data memory remotely located from the vehicle across a wireless communication network.

Embodiments include a method for charging an electric vehicle, comprising: receiving, at a charging system, a charge request message from a vehicle; determining, via a processor of the charging system, charging information contained in the charge request message, wherein the charging information includes charging requirements for charging the vehicle; determining, via the processor of the charging system, to provide electrical charge to the vehicle via an electrical interconnection between the vehicle and the charging system in accordance with the charging requirements; and providing electrical charge to a power storage system of the vehicle via the charging system.

Aspects of the above method include wherein the charge request message includes a header portion and a payload portion and wherein the charging information is included in the payload portion. Aspects of the above method include wherein the electrical charge is provided while the vehicle is moving. Aspects of the above method include wherein the charging information includes orientation information identifying a required orientation of the vehicle relative to the charging system when receiving the electrical charge while the vehicle is moving. Aspects of the above method include wherein the charging information includes alignment control information identifying a vehicle control protocol for maintaining the required orientation of the vehicle relative to the charging system when receiving the electrical charge while the vehicle is moving. Aspects of the above method further comprise: controlling, via the processor of the charging system, a position of the vehicle on a roadway while receiving the electrical charge and based on information in the vehicle control protocol. Aspects of the above method further comprise: receiving, via the processor of the charging system, an end-of-charge message including a time when the power storage system of the vehicle is full. Aspects of the above method include, wherein the charging information includes charging location information identifying a location on a portion of the vehicle for receiving the electrical charge from the charging system.

Embodiments include a charging system server, comprising: a processor; and a computer-readable storage medium having instructions stored thereon that, when executed by the processor, cause the processor to: receive, at the charging system server, a charge request message from a vehicle; determine charging information contained in the charge request message, wherein the charging information includes charging requirements for charging the vehicle; and determine to provide electrical charge to the vehicle via an electrical interconnection between the vehicle and the charging system in accordance with the charging requirements and while the vehicle is moving.

Aspects of the above charging system server include wherein the charge request message includes a header portion and a payload portion and wherein the charging information is included in the payload portion. Aspects of the above charging system server include wherein the charging information includes orientation information identifying a required orientation of the vehicle relative to the charging system when receiving the electrical charge while the vehicle is moving. Aspects of the above charging system server include wherein the charging information includes alignment control information identifying a vehicle control protocol for maintaining the required orientation of the vehicle relative to the charging system when receiving the electrical charge while the vehicle is moving. Aspects of the above charging system server include wherein the processor is further caused to control a position of the vehicle on a roadway while receiving the electrical charge and based on information in the vehicle control protocol. Aspects of the above charging system server include wherein the processor is further caused to receive an end-of-charge message including a time when a power storage system of the vehicle is full or nearing full charge. Aspects of the above charging system server include wherein the charging information includes charging location information identifying a location on a portion of the vehicle for receiving the electrical charge from the charging system.

Embodiments include a charging system, comprising: a charging system server, comprising: a processor; and a computer-readable storage medium having instructions stored thereon that, when executed by the processor, cause the processor to: receive, at the charging system server, a charge request message from a vehicle; determine charging information contained in the charge request message, wherein the charging information includes charging requirements for charging the vehicle; and determine to provide electrical charge to the vehicle via an electrical interconnection between the vehicle and the charging system in accordance with the charging requirements and while the vehicle is moving; and a charging device, wherein the charging device provides the electrical charge to a power storage system of the vehicle via the electrical interconnection.

Aspects of the above charging system include wherein the charge request message includes a header portion and a payload portion and wherein the charging information is included in the payload portion. Aspects of the above charging system include wherein the charging information includes orientation information identifying a required orientation of the vehicle relative to the charging system when receiving the electrical charge while the vehicle is moving. Aspects of the above charging system include wherein the charging information includes alignment control information identifying a vehicle control protocol for maintaining the required orientation of the vehicle relative to the charging system when receiving the electrical charge while the vehicle is moving, and wherein the processor is further caused to control a position of the vehicle on a roadway while receiving the electrical charge based on information in the vehicle control protocol. Aspects of the above charging system include wherein the processor is further caused to receive an end-of-charge message including a time when a power storage system of the vehicle is full or nearing full charge, and wherein the charging device ceases providing the electrical charge to the power storage system of the vehicle via the electrical interconnection when the power storage system of the vehicle is full.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A server, comprising:
   a processor; and
   a computer-readable storage medium having instructions stored thereon that, when executed by the processor, cause the processor to:
      send, in response to a charging request, a power source message to a vehicle, wherein the power source message is configured for display to a graphical user interface of a vehicle display device, wherein the power source message includes information describing charging capabilities of a determined at least one power source that is available to provide charging power to the vehicle based on the charging request; and
      receive, based on a selection of the determined at least one power source made at the graphical user interface of the vehicle display device, an acceptance message from the vehicle, the acceptance message authorizing a power transfer from the determined and selected at least one power source to the vehicle.

2. The server of claim 1, wherein prior to determining the power source that is available, the processor is further caused to receive an availability signal from one or more power sources in proximity to a position of the vehicle along a route.

3. The server of claim 2, wherein the route is a planned route stored in a navigation system associated with the vehicle.

4. The server of claim 3, wherein the charging request includes a first geographical location of the vehicle at a first point in time, and wherein the position of the vehicle along the route is a different second geographical location of the vehicle at a second point in time after the first point in time.

5. The server of claim 1, wherein the charging request includes at least one of a state of charge of the vehicle, a required charge characteristic associated with the vehicle, or a requested time to charge the vehicle.

6. The server of claim 5, wherein prior to sending the power source message to the vehicle, the processor is further caused to receive an estimated charging cost from the determined power source corresponding to an estimated cost for charging the vehicle based on the charging request.

7. The server of claim 6, wherein each power source displayed includes details about the power source.

8. The server of claim 7, wherein the power source message is configured to display a list of each power source on a graphical user interface map along with a relative distance from each power source to the vehicle.

9. The server of claim 8, wherein prior to receiving the acceptance message the processor is further caused to:
receive, from the vehicle, a selection of one power source from the list of each power source displayed on the graphical user interface map.

10. The server of claim 1, wherein the processor receives a transaction report from at least one of the vehicle or the determined power source, wherein the report includes details corresponding to the power transfer, and wherein the transaction report includes an amount of charge provided in the power transfer from the power source to the vehicle, a time of charge associated with the power transfer, a cost associated with the power transfer, an identification of the power source providing the power transfer, and an identification of the vehicle.

11. A method, comprising:
sending, via a processor and in response to a charging request, a power source message to a vehicle, wherein the power source message is configured for display to a graphical user interface associated with the vehicle and wherein the power source message includes information describing charging capabilities of a determined power source that is available to provide charging power to the vehicle based on the charging request; and
receiving, via the processor and based on a selection of the determined power source made at the graphical user interface of the vehicle display device, an acceptance message from the vehicle, the acceptance message authorizing a power transfer from the determined and selected power source to the vehicle.

12. The method of claim 11, wherein prior to determining the power source that is available, the method further comprises:
receiving an availability signal from one or more power sources in proximity to a position of the vehicle along a route and wherein, after receiving the acceptance message, the method further comprises:
receiving, via the processor, a transaction report from at least one of the vehicle or the determined power source, wherein the report includes details corresponding to the power transfer.

13. The method of claim 12, wherein the route is a planned route stored in a navigation system associated with the vehicle.

14. The method of claim 13, wherein the charging request includes a first geographical location of the vehicle at a first point in time, and wherein the position of the vehicle along the route is a different second geographical location of the vehicle at a second point in time after the first point in time.

15. The method of claim 11, wherein the charging request includes at least one of a state of charge of the vehicle, a required charge characteristic associated with the vehicle, or a requested time to charge the vehicle.

16. The method of claim 15, wherein prior to sending the power source message to the vehicle, the method further comprises:
receiving an estimated charging cost from the determined power source corresponding to an estimated cost for charging the vehicle based on the charging request.

17. The method of claim 16, wherein the power source message is configured to display a list of each power source on a graphical user interface map along with a relative distance from each power source to the vehicle, and wherein each power source displayed includes details about the power source.

18. The method of claim 17, wherein prior to receiving the acceptance message the method further comprises:
receiving, from the vehicle, a selection of one power source from the list of each power source displayed on the graphical user interface map.

19. An electric vehicle, comprising:
a communication connectivity device communicating with one or more power sources across a communication network;
a rechargeable energy storage;
a display device;
a power tracking server, comprising:
a processor; and
a computer-readable storage medium having instructions stored thereon that, when executed by the processor, cause the processor to:
present a graphical user interface to the display device, the graphical user interface displaying information describing charging capabilities of a determined at least one power source, the determined at least one power source in the one or more power sources being available to provide charging power to the vehicle based on a determined charge required by the vehicle; and
receive a selection of the at least one power source via the display device, wherein the selection authorizes a power transfer from the at least one power source to the vehicle.

20. The electric vehicle of claim 19, wherein the processor is further caused to:
determine that the vehicle requires the determined charge;
determine, from among the one or more power sources, that the at least one power source is available to provide charging power to the vehicle based on the determined charge;
enable storage of charging energy transferred in the power transfer to the rechargeable energy storage;
receive a transaction report from at least one of the vehicle or the determined at least one power source, wherein the report includes details corresponding to the power transfer; and
send, via the communication connectivity device, the transaction report to a tracking data memory remotely located from the vehicle across a wireless communication network.

* * * * *